(12) United States Patent
Vered et al.

(10) Patent No.: US 10,591,575 B2
(45) Date of Patent: Mar. 17, 2020

(54) DIRECTION FINDING SYSTEM DEVICE AND METHOD

(71) Applicant: HISEP TECHNOLOGY LTD.

(72) Inventors: Uri Vered, Rishon LeZion (IL); Yariv Erad, Kidron (IL); Gad Vered, Be'er Ya'acov (IL); Menachem Erad, Ashdod (IL)

(73) Assignee: HISEP TECHNOLOGY LTD., Yavne (IL)

( * ) Notice: Subject to any disclaimer, the term of this patent is extended or adjusted under 35 U.S.C. 154(b) by 146 days.

(21) Appl. No.: 15/560,966

(22) PCT Filed: Apr. 19, 2016

(86) PCT No.: PCT/IL2016/050411
§ 371 (c)(1),
(2) Date: Sep. 22, 2017

(87) PCT Pub. No.: WO2016/170533
PCT Pub. Date: Oct. 27, 2016

(65) Prior Publication Data
US 2018/0052216 A1 Feb. 22, 2018

Related U.S. Application Data

(60) Provisional application No. 62/150,850, filed on Apr. 22, 2015, provisional application No. 62/186,375, (Continued)

(51) Int. Cl.
*G01S 3/14* (2006.01)
*G01S 3/22* (2006.01)
(Continued)

(52) U.S. Cl.
CPC ............. *G01S 3/22* (2013.01); *G01S 3/143* (2013.01); *G01S 5/0072* (2013.01); *G01S 5/0247* (2013.01)

(58) Field of Classification Search
CPC ..... G01S 3/14; G01S 3/22; G01S 3/26; G01S 3/143; G01S 5/0072; G01S 5/0247
(Continued)

(56) References Cited

U.S. PATENT DOCUMENTS 2,252,699 A 8/1941 Byrne
2,931,032 A 3/1960 Grant
(Continued)

FOREIGN PATENT DOCUMENTS

WO 2015027118 A1 2/2015

OTHER PUBLICATIONS

International Search Report of PCT/IL2016/050411, dated Jul. 26, 2016.

*Primary Examiner* — Dao L Phan
(74) *Attorney, Agent, or Firm* — Alphapatent Associates, Ltd.; Daniel J. Swirsky

(57) ABSTRACT

The invention relates to a method for determining by a direction finder (DF) the direction to a Target, which comprises (a) providing an antenna at the DF, and an array of antennas at the Target; (b) providing a compass at each of the DF and the Target, for determining the azimuth of the DF Heading and of the Target Heading, respectively, with respect to the North; (c) providing at the DF a look-up table which describes n antenna patterns, one per Transmission Mode that may be used respectively at the Target; (d) sequentially performing x Transmission Modes from the Target, each time using another pair of antennas, and during each of the Transmission Modes intentionally, and in a controlled manner attenuating a reception signal at the DF
(Continued)

until a loss of communication, and recording the respective attenuation levels; (e) based on the x recorded attenuations levels and the look up table, determining by the DF the direction from the Target to the DF; and (f) receiving at the DF the azimuth of the Target, and based on (i) the determined direction from the Target to the DF (ii) azimuth of the Target; and (iii) azimuth of the DF; calculating by the DF the direction from the DF to the Target.

25 Claims, 42 Drawing Sheets

Related U.S. Application Data filed on Jun. 30, 2015, provisional application No. 62/186,396, filed on Jun. 30, 2015.

(51) Int. Cl.
*G01S 5/00* (2006.01)
*G01S 5/02* (2010.01)

(58) Field of Classification Search
USPC .......................................................... 342/350
See application file for complete search history.

(56) References Cited

U.S. PATENT DOCUMENTS

| | | |
|---|---|---|
| 7,616,112 B2 | 11/2009 | Miller, III |
| 8,405,549 B2 | 3/2013 | Vered et al. |
| 8,988,283 B2 | 3/2015 | Erad et al. |
| 2003/0052773 A1 | 3/2003 | Sjonell |
| 2011/0068980 A1 | 3/2011 | Vered et al. |
| 2013/0002489 A1 | 1/2013 | Erad et al. |

| R-N (dB) | φ₁ | φ₂ | φ₃ |
|---|---|---|---|
| ------- | 0° | 0° | 0° |
| ------- | ------- | ------- | ------- |
| ------- | ------- | ------- | ------- |
| ⋮ | ⋮ | ⋮ | ⋮ |
|  | 10° | 80° | 150° |
| ⋮ | ⋮ | ⋮ | ⋮ |
| ------- | 359° | 359° | 359° |

| R-N (dB) | φ₁ | φ₂ | φ₃ |
|---|---|---|---|
| ------- | -90° | -90° | -90° |
| ------- | ------- | ------- | ------- |
| ------- | ------- | ------- | ------- |
| ⋮ | ⋮ | ⋮ | ⋮ |
| ------- | +90° | +90° | +90° |

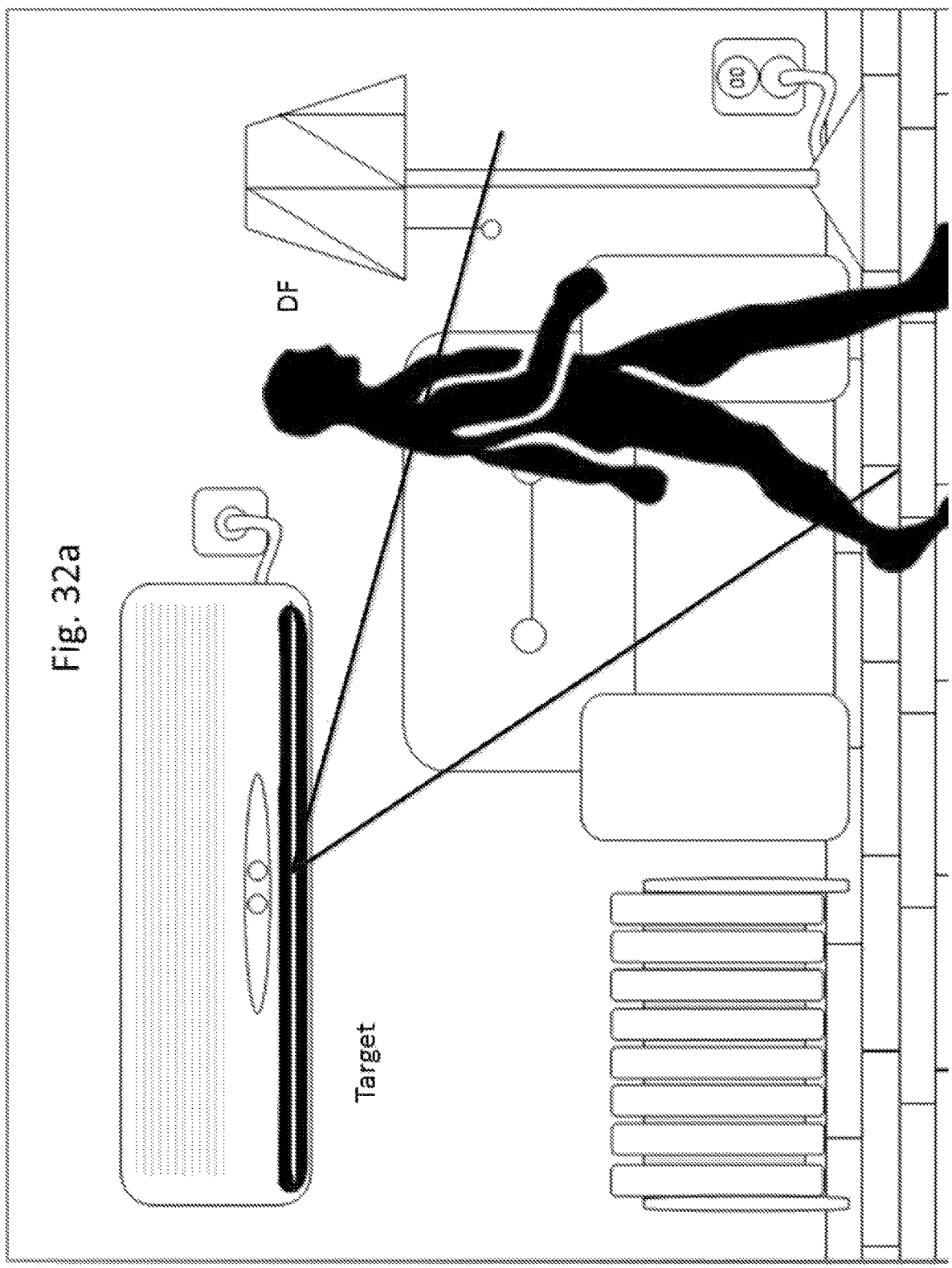

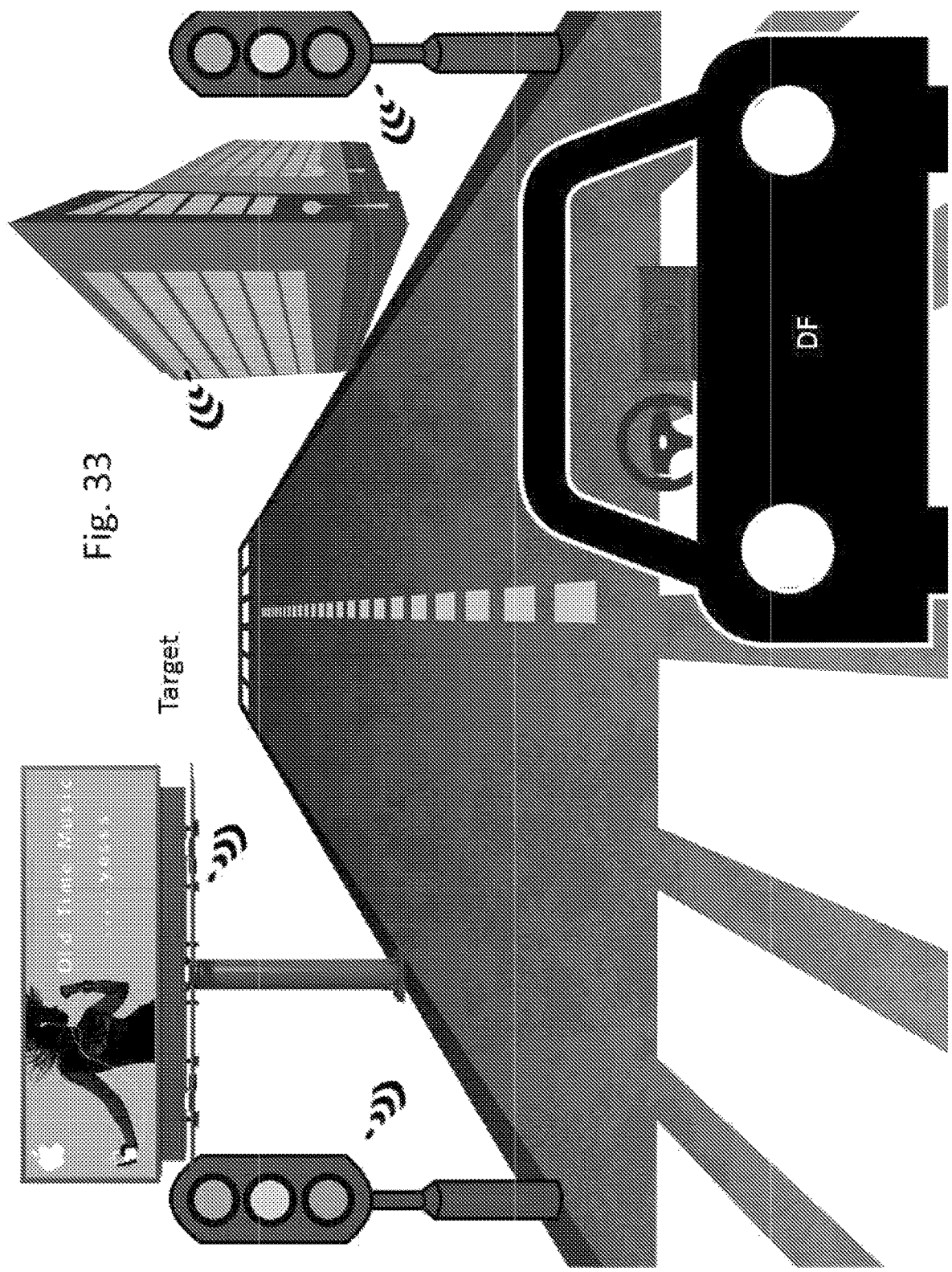

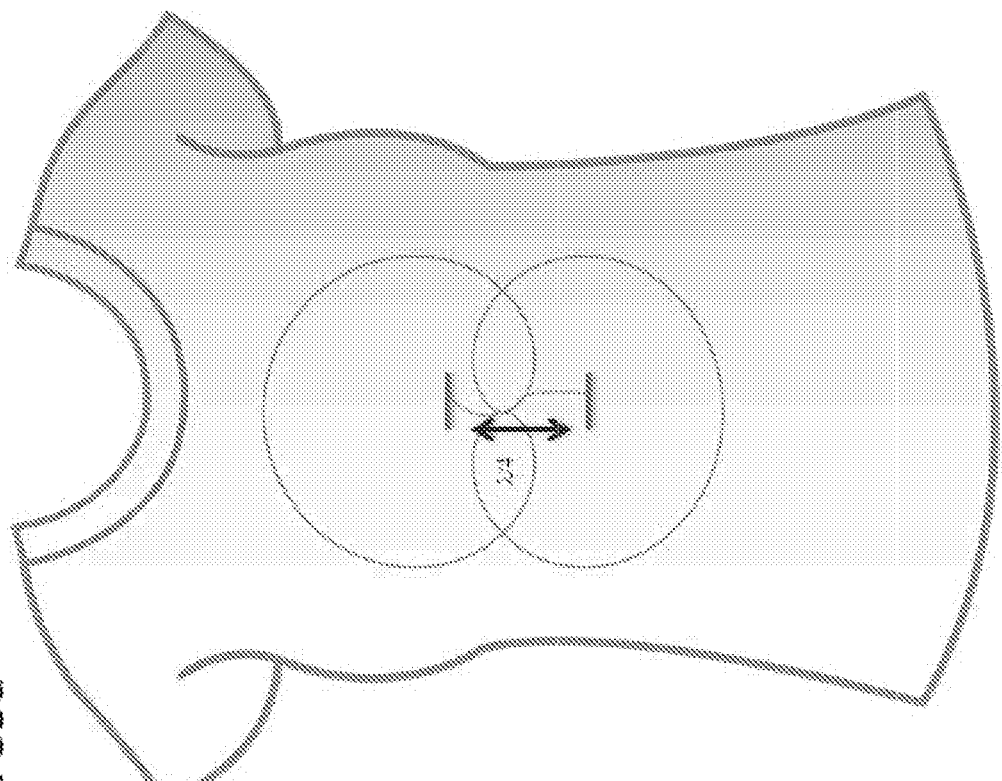
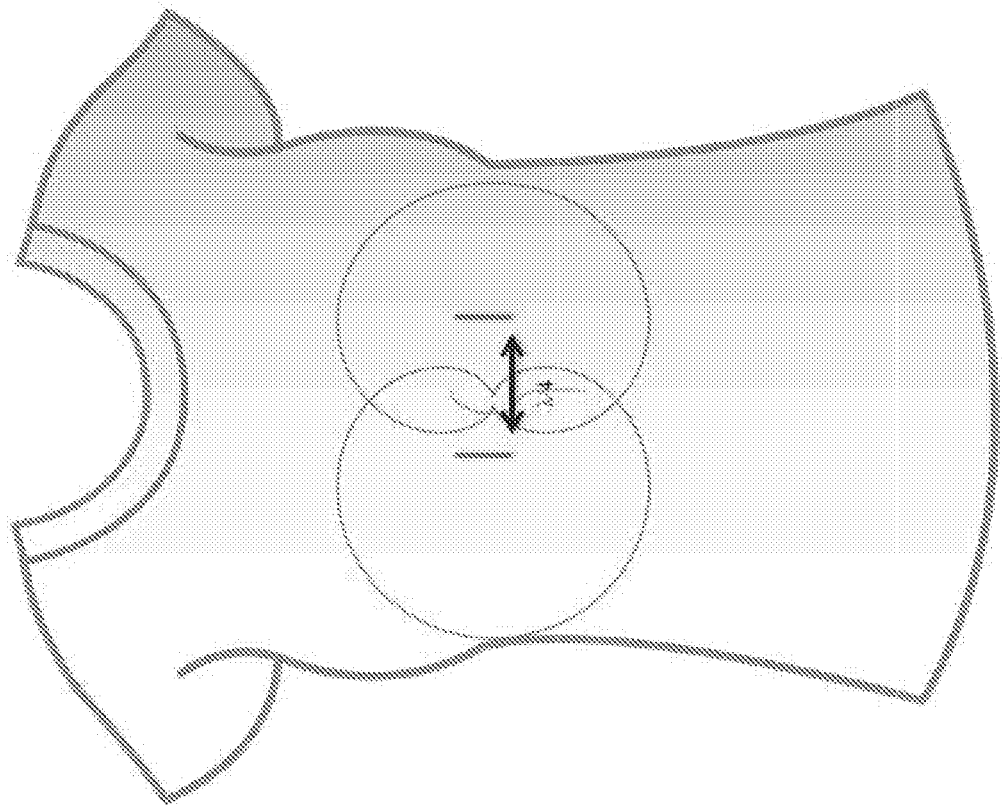
Fig. 35a

DIRECTION FINDING SYSTEM DEVICE AND METHOD

FIELD OF THE INVENTION

The present invention relates to the field of determining the relative direction between wireless communication devices that are located within a direct wireless communication range from each other. More particularly, the invention relates to a system, device, and method for finding the relative direction between a at least one directional finder device, receiving via a single antenna, to one or more Targets, transmitting via an antenna array, wherein the transmission patterns of said antenna array of the Target are known to the DF.

BACKGROUND OF THE INVENTION

The art has provided many ways for a direction finder (DF) to determine the direction to an RF source (Target), mainly by various wave analysis procedures.

Direction finding techniques can be categorized in groups, those which find the direction of the Target based on the received signal amplitude, based on the received signal phase, based on received signal timing, or those which are based on several of said attributes of the received signal.

One of the major challenges all direction-finding techniques face, in most situations, but mainly within a reflective environment, is to overcome the multipath reflections problem. Multipath reflections can cause false indications regarding the direction of the targeted RF source. Reflection of waves is expected from nearby objects, such as walls, or metallic objects. Waves transmitted from a Target may be scattered and reflected from nearby objects such as one or more walls, and arrive to the direction finder via many waves and from many directions. The reflected waves are weaker due to the following facts: (a) the reflected waves travel a longer path; (b) The reflected waves are scattered to many directions; and (c) the reflected waves from an object suffer from reflection losses. The reflected waves arrive at the DF later than the direct wave due to the longer path. These reflections are combined with the direct wave, distorting the amplitude, phase, and time of arrival of the signal. In prior art direction finding techniques that are based on measuring the signals amplitude, phase, or time of arrival, these multi-path reflections cause sever errors in the direction finding.

Amplitude-Based Direction Finding Techniques:

These direction finding techniques use one or more antennas. An example of a single antenna direction finding is a rotational directional antenna. The direction from which the received signal strength (RSS) or received signal strength indication (RSSI), or equivalent thereof is the highest, is the expected direction to the Target. Amplitude based directional finders that use several antennas measure the RSS/RSSI at each antenna and calculate from these amplitude differences the Angle of Arrival (AOA) of the signal. An example for an amplitude directional finder which uses several antennas is the monopulse system.

Additional techniques assess the distance to the Target, based on the signal strength, and by triangulating several measurements calculate the location or the direction to the Target.

Phase-Based Direction Finding Techniques:

These directional finders use two or more antennas and measure the phase difference of the arrival of a signal in plurality of antennas and calculate from these phase differences the AOA of the signal. This group includes, for example, interferometer direction finder, correlative interferometer direction finder, passed array systems, etc.

Time-based directional finder techniques: These directional finders are also known as TOA (Time of Arrival) type directional finders. They use two or more antennas and measure the time difference of the arrival of a signal to plurality of antennas and calculate from these differences the AOA of the signal. This group includes, for example short and long base TOA, DTOA (Differential Time of Arrival) etc.

Monopulse DF Techniques:

This technique is mainly used in ELINT (Electronic Intelligence) systems and radars, to find the direction from which a pulsed radar signal or echo is received. The signal is received in two or more directional antennas. The signals in the antennas, usually highly directional antennas, are added in phase to create a sum (E) signal, and added in opposite phase to create a Difference (A) signal, in one or two dimensions, azimuth, elevation or both. Based on the E and A signal strengths, the direction of the Target is determined.

All said prior art techniques rely on one or more properties of the received signal, require at the direction finder (DF) either plurality of receiving antennas and/or at least one receiving directional antenna, and also requires relatively complicated calculations and analysis, while they have no knowledge about the antenna array structure and layout, radiation patterns and orientation of their Targets. The inclusion of either a plurality of antennas or a directional antenna at a small size DF is cumbersome and complicated. Therefore, said techniques and the associated structures are generally not suitable for small size and relatively simple wireless personal devices, such as cellular phones, PDAs, digital cameras, smart watches, smart glasses, remote-control devices, etc.

Such devices are small in size, are provided in many cases with one or more simple antennas, that can be (but not limited to) omni-directional antennas, or very low gain directional antennas, and are relatively of low cost. Furthermore, in many cases such devices comprise of only one receiving channel for each antenna, and therefore are not suitable for using the abovementioned prior art techniques, unless significantly increasing their size, and or price.

U.S. Pat. Nos. 8,405,549 and 8,988,283 by same applicant and inventors provide direction finding techniques and devices that do not depend on attributes of the signal, such as amplitude, phase, or time of arrival, and that can substantially overcome reflections of the signal from nearby objects, such as walls. The DFs in both U.S. Pat. Nos. 8,405,549 and 8,988,283 utilize an array of two, three, or four receiving antennas (such as, but not limited to, omnidirectional antennas) that together with a hybrid junction are combined to create various directional reception patterns. Several of such directional reception patterns are alternately created during several modes of reception, respectively. During each of said reception modes, an attenuator is used at the directional finder to intentionally attenuate in a controlled manner the received signal from the Target device until a point of loss of communication (such as handshake), and the respective attenuation for causing said loss of reception is recorded. The direction to the transmitting Target device is then calculated based on a relative comparison between the recorded attenuations and the respective reception patterns that have been used.

As noted, in both U.S. Pat. Nos. 8,405,549 and 8,988,283 the DF applies alternately two or more directional reception patterns at the DF in order to calculate the direction to the Target device (which in turn issues the transmitted signal). It has been found by the inventors that such a structure is vulnerable to errors due to signals that are "parasitically" received at the DF through components other than the antennas. For example, the signal may be partially "received" at the RF amplifier of the DF due to induction over the wires or other components of the device that are not the antennas. In order to overcome this problem, at least partially, the RF amplifier at the DF may be positioned within a masking enclosure. However, even when such an enclosure is used, this phenomenon cannot be entirely eliminated. Moreover, the use of such a masking enclosure is relatively cumbersome and expensive, and is not suitable to mobile devices having small volume.

In still another aspect, in devices where an array of antennas is used for receiving at the direction finder, the effectiveness of the operation is significantly influenced when the DF is not maintained horizontally during the process of the direction finding. It is highly desired to release the DF from this requirement.

It is therefore an object of the present invention to provide a method, device, and system for finding the direction to another device.

It is still another object of the present invention to provide said system method and device that do not depend on attributes of the signal such as its amplitude, phase, or time of arrival.

It is another object of the invention to provide said method, device, and system that utilizes only a single receiving antenna having any radiation pattern at the direction finder.

It is still another object of the invention to release the DF from the requirement of maintaining the device horizontally while performing direction finding.

It is still another object of the invention to provide said method, device, and system that require minimal and compact-size hardware, a structure which is particularly adapted for use in small-size mobile devices, such as smart-phones, smart-watches, Google® Glasses, digital cameras, remote controls, etc.

It is another object of the present invention to provide a method, device and system that are particularly applicable for operation within close locations, such as buildings, malls, theaters, etc.

It is another object of this invention to apply sensors or combinations of sensors for compensating for the orientation of the DF and Target devices at the time when the measurement is made.

It is still another object of the present invention to provide said system method and device that are simple in structure and reliable.

It is still another object of the present invention to provide said system method and device that are capable of determining a relative location between Target devices that are located within the communication range.

It is another object of the present invention to display to a user in a radar alike manner at least one Target device, wherein said display indicates the relative direction, distance, height, or any combination thereof relative to the DF.

It is still another object of the present invention to enable a user to select at least one Target and define it as a "landmark" or "mark", that are in turn serve as additional reference to other Targets.

It is still another object of the present invention to use the DF for distributing data of any type, or performing various types of operations on selected Targets following said Targets direction, distance or height determination.

Other objects and advantages of the invention will become apparent as the description proceeds.

SUMMARY OF THE INVENTION

The invention relates to a method for determining by a direction finder (DF) the direction to a Target, which comprises: (a) providing an antenna at said DF, and an array of antennas at the Target; (b) providing a compass at each of said DF and said Target, for determining the azimuth of the DF Heading and of the Target Heading, respectively, with respect to the North; (c) providing at said DF a look-up table which describes n antenna patterns, one per Transmission Mode that may be used respectively at the Target; (d) sequentially performing x Transmission Modes from the Target, each time using another pair of antennas, and during each of said Transmission Modes intentionally, and in a controlled manner attenuating a reception signal at the DF until a loss of communication, and recording the respective attenuation levels; (e) based on said x recorded attenuations levels and said look up table, determining by the DF the direction from the Target to the DF; and (f) receiving at the DF the azimuth of the Target, and based on (i) said determined direction from the Target to the DF (ii) azimuth of the Target; and (iii) azimuth of the DF; calculating by the DF the direction from the DF to the Target.

In an embodiment of the invention, each of said antenna patterns are cardioid-type patterns.

In an embodiment of the invention, said x Transmission Modes are initiated by the DF.

In an embodiment of the invention, said x Transmission Modes and their sequence are customized to different Target types or different DF types.

In an embodiment of the invention, said x Transmission Modes and their sequence are customized to different software applications applied at the DF.

In an embodiment of the invention, an indication regarding the Transmission Mode from among said n Transmission Modes which is currently active is reported from the Target to the DF.

In an embodiment of the invention, (i) said look-up table at the DF is null, namely either the look up table is empty or no look up table exists; (ii) based on said x recorded attenuations, the determination by the DF of the direction from the Target to the DF results in a quadrant at the Target that directs to the DF; and (iii) based on said (a) azimuth of the Target; (b) azimuth of the DF; and (c) said determined quadrant at the Target that directs to the DF; calculating by the DF a quadrant at the DF which directs to the Target.

In an embodiment of the invention, a hybrid junction is used at the Target in order to issue each of said cardioids, respectively.

In an embodiment of the invention, the method further comprising: (a) performing an x-mode determination by the Target of the direction from the Target to the DF, based on transmission from the DF and reception at the Target; and (b) comparing the results as previously obtained by a performed by the DF with said direction as determined by the Target, to cross-verify the results.

In an embodiment of the invention, the antenna at the DF is an omni-directional antenna.

In an embodiment of the invention, the method is used in a security system, wherein an activation and/or deactivation of the security system is conducted by positioning the DF in a pre-defined relative direction from at least one Target of the security system.

In an embodiment of the invention, a positioning of the DF in a pre-defined orientation is also performed.

In an embodiment of the invention, the method also comprises performance of a cross verification procedure.

In an embodiment of the invention, when applied in a security system, at least one DF and at least one Target are used, and activation of the security system triggers a creation of a relative direction or location schematic map reference in such manner that any deviation of a device in the system from said reference map triggers a pre-defined action.

In an embodiment of the invention, the DF is an IOT device.

In an embodiment of the invention, the DF controls, operates or exchanges data with at least one Target device, based on a pre-defined relative direction between the DF and the Target.

In an embodiment of the invention, the DF uses sensors to monitor parameters relating to a user of the DF and activates or reconfigures the operation of Target appliances based on a combination of the relative location between the DF and the Target, and the sensors' data.

In an embodiment of the invention, the DF is incorporated within a vehicle and the Target is incorporated within one or more traffic related objects commonly available near traffic routes.

In an embodiment of the invention, the antennas are dipole-type antennas.

In an embodiment of the invention, the DF and the Targets are incorporated within a garment.

In an embodiment of the invention, said antennas of the DF or Target have the form of conductive wires that are threaded into the fabric of the garment.

In an embodiment of the invention, a pressure sensor is coupled to each pair of antennas from the antenna array in order to sense pressure that may be applied to the said antenna pair.

In an embodiment of the invention, a Tilt sensor is coupled to each pair of antennas from the antenna array, in order to sense a diversion of the antennas pair with respect to the horizontal.

BRIEF DESCRIPTION OF THE DRAWINGS

In the drawings:

FIGS. 17a and 17b show two examples for lookup tables that can be used by the device of U.S. Pat. No. 8,988,283;

FIG. 32a illustrates an example for the use of the invention Internet of Things (IOT) objects;

FIG. 33 illustrates yet another exemplary use of the invention, wherein a DF is integrated into a vehicle;

FIG. 35a illustrates an exemplary use of a dipole-based Reversed DF system in a garment.

DETAILED DESCRIPTION OF PREFERRED EMBODIMENTS

Figure 1:
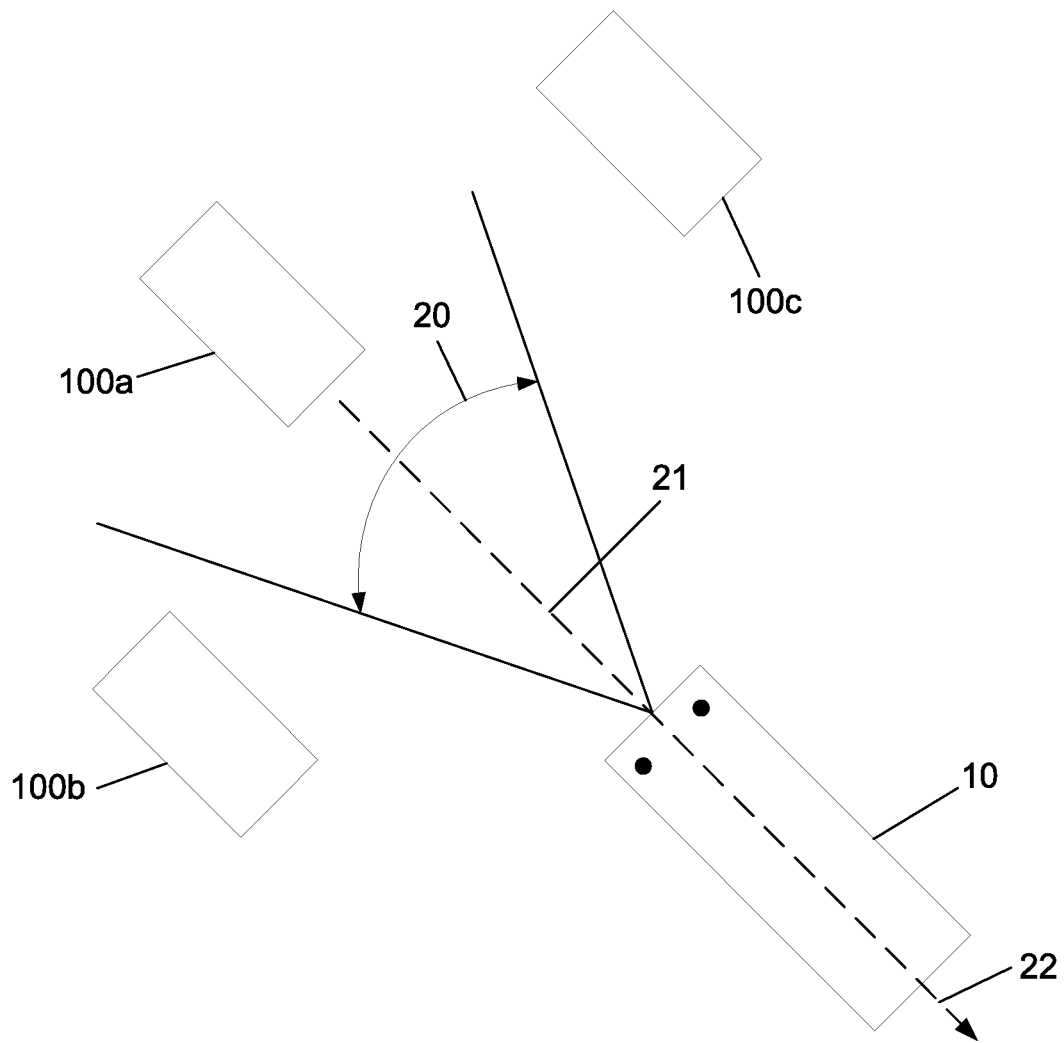
FIG. 1 shows a direction finder according to an embodiment of the U.S. Pat. No. 8,405,549, whose objective is to determine those Targets that are located within a sector of interest.

For the purposes of this application, and in order to enable clear understanding of the invention, the following terms shall have the meaning set forth beside them. It should be noted, however, that the use of such meanings shall in no way serve to limit the scope of possible interpretation of the ideas, and the ideas and concepts provided herewith shall apply even if other terms and definitions are used.

The examples provided herein relate to the use of the invention for various applications. However, the invention may be applied to other applications and devices, and in fact to any device or application that uses or may use wireless identification data of any type. In these cases, the features of the inventions described hereunder shall apply as well.

"Wireless Communication"—refers to the transfer of information and/or data and/or packets (formatted blocks of data) and/or to communication of acknowledgment/no-acknowledgment and/or voice over long or short distances without the use of electrical conductors or "wires", but rather via Radio waves, at any given frequency.

"Wireless Communication Protocol and/or Standard"—refers to any protocol and/or standard used to conduct Wireless Communication, such as, but not limited to, wireless Information Technology, cellular communication (such as, but not limited to, GSM, GPRS, CDMA), Wireless Networks, WLAN computer communications, wireless networking standards (such as IEEE 802.11), wireless personal area networks (WPAN) and wireless mesh networks, and "Internet-of-Things". Among such protocols, but not limited only to them, are Wi-Fi, Bluetooth, Low-Energy-Bluetooth (BLE), Wi-Max, ZigBee, Z-wave, Insteon, Cellular devices communication protocols, Near-field Communication (NFC), RFID protocols or standards). This term also refer to the use of such protocols in association with any radio frequency, such as—but not limited to, UHF, HF, VHF, 2.4 Ghz, 5 Ghz, 18 Ghz, 60 Ghz, etc.

"Antenna Module"—refers to a system and/or a device comprising at least one antenna and/or an array of antennas that can be used to either transmit or receive radio signals in pre-defined antenna patterns. The antennas may be of any of type known in the art, including, but limited to, directional, monopoles, Omni-directional, Dipole, etc. Each antenna or array of antennas may apply a respective pattern, that may be created using variety of components and/or antenna types, shapes or sizes and/or layout of the antennas in the array.

"Transmission Mode"—shall refer to a simultaneous transmission of the Wireless Communication via a pair of antennas in the Antenna Module having a combined antenna pattern.

"Reception Mode"—shall refer to a simultaneous reception of the wireless Communication via a pair of antennas in the Antenna Module having a combined antenna pattern.

"Direction finder or DF or Looker" refers to a device having an Antenna Module which is used to determine a relative direction to a Target as defined herein under. Alternatively the device is used to find whether one or more Targets are located within a desired directional sector from the finder. The DF may be a stand-alone device or a device which is integrated with another electronic device, either by software or hardware or a combination thereof. The DF may also function as a Target. As will be further elaborated herein, the DF may also include a compass and/or Accelerometer and/or Gyro and/or Tilt sensors.

"Target"—Target refers to a device and/or object having Wireless Communication means and Antenna Module, or an RF communication source, which comprises RF transmitter and/or receiver and/or repeater or transponder and/or tag, which communicates wirelessly directly (i.e., not via relays) with the DF. A Target device may also function as a DF. Said Target may include a compass component and/or Accelerometer and/or Gyro and/or Tilt sensors.

"Communication Circuit" or in short "Comm"-refers to an RF transmitter and/or receiver which communicates wirelessly with one or more Targets. The Communication circuit may be e.g., Wi-Fi, Bluetooth, ZigBee, or RFID etc. at any frequency.

"Identification Data or ID"—refers to a number, either serial or other, a name, a collection of symbols, or any other type of reference used to provide an electronic device a unique identification, which enables users and/or systems to identify, track, monitor, or operate the device. Said ID may originally be provided by the respective device manufacturer, may be assigned to it by a computer system or by a user, or may be used simply to associate a unique description by a user to the device. A device may also possess more than one ID, for example, IDs assigned to it by the manufacturer, by the system, and by the user. A device may also broadcast different IDs at different circumstances, for example, ID1 for "stand-by" mode, ID2 for "operating" mode, etc.;

"Azimuth" or "Compass Azimuth" or in short "AZ"—refers to the angle of the bearing with respect to the North, typically CW looking down to the earth, within the range of 0≤AZ<360. The bearing may be for example from one location to another (e.g. from the DF to the Target or from the Target to the DF), the bearing of the Heading of a device (e.g. the DF Heading or the Target Heading).

"φ"—Direction of the device, either the Target or the DF, respectively, relative to its Heading. Range: −180≤φ<180

"Heading"—refers to a direction which is locally defined within the DF and the Target, respectively, as a "zero direction of the Antenna Module" of the device, and will be used to illustrate the "Heading" of the Target or looker device, respectively. Said Heading may typically be chosen to correlate with a device's display or shape or be rotated in respect to the device's display or shape.

"Internet-of-Things or IOT"—refers to a physical object or "thing" which is provided with electronics, software and/or sensors and Wireless P2P Communication connectivity to enable it to connect with other devices. Each "thing" is locally uniquely identifiable by means of its embedded computing system, but it might also be able to interoperate within the existing Internet infrastructure. Such object or "thing" does not have to include a display.

"Peer-2-peer or P2P"—refers to a Wireless Communication network between at least 2 wireless devices, which allows wireless devices to directly communicate with each other. Said wireless devices within a communication range of each other can discover and communicate directly without involving any central access point. This term also covers the use of a wireless communication between a cellular device to a base-station, a base-station to cellular device, and base-station to base-station. It also covers, in the same manner, a TV stations Wireless Communication.

"Accelerometer"—means a device that measures the acceleration experienced relative to a freefall. Single- and multi-axis models are available to detect magnitude and direction of the acceleration as a vector quantity, and can be used to sense position, vibration and shock. Said accelerometer can be a component and/or sensor in portable electronic devices—such as, but not limited to, cellular phone, video game controllers/console, digital camera, GPS device, media player, laptop computer, tablet computer, wireless remote control, PDA—to detect the position of the device or to provide for game input.

"Gyroscope"—refers to an element for measuring or maintaining orientation, based on the principles of conservation of angular momentum. Said Gyroscope may be a component and/or sensor in portable electronic devices—such as, but not limited to, cellular phone, video game controllers/console, digital camera, GPS device, media player, laptop computer, tablet computer, wireless remote control, PDA—to detect the position of the device or provide for game input.

"Tilt sensor"—refers to a component that can measure the tilting of a portable device, for example, in two axes with respect to a reference plane. Said portable device may be, for example, a cellular phone, video game controllers/console, digital camera, GPS device, media player, laptop computer, tablet computer, wireless remote control, PDA—to detect the position of the device or provide for game input.

"Cross Verification"—refers to a mode of operation in the invention, where the Target and DF exchange functionality—i.e. the Target functions as a DF, and the DF functions a Target. In such a manner the two devices may exchange their measured results for the purpose of verification.

"Sensors"—refer to various types of sensors, such as, but not limited to, barometer, pressure sensors, light sensors, medical sensors, touch sensors, etc.

As noted above, U.S. Pat. Nos. 8,405,549 and 8,988,283 by same applicants and inventors provide direction finding techniques and devices that do not depend on attributes of the signal, such as amplitude, phase, or time of arrival, and that are substantially overcome the reflections of the signal from nearby objects, such as walls. The DFs in both U.S. Pat. Nos. 8,405,549 and 8,988,283 utilize an array of two, three, or four receiving antennas that together with a hybrid junction are combined to create various directional reception patterns. Several of such directional reception patterns are alternately created during several modes of reception, respectively. During each of said reception modes, an attenuator is used at the directional finder to intentionally attenuate in a controlled manner the received signal from the Target device until a point of loss of reception (such as handshake), and the respective attenuation for causing said loss of reception is recorded. The direction to the transmitting Target device is then calculated based on a relative comparison between the recorded attenuations and the respective reception patterns that have been used.

As also noted, in both U.S. Pat. Nos. 8,405,549 and 8,988,283 the DF applies alternately two or more directional reception patterns at the DF in order to calculate the direction to the Target device (which in turn issues the transmitted signal). It has been found by the inventors that such a structure is vulnerable to errors due to signals that are "parasitically" received at the DF through components other than the antennas. For example, the signal may be partially "received" at the RF amplifier of the DF due to induction over the wires or other components of the device that are not the antennas. In order overcome this problem and reduce its effect, at least partially, the RF amplifier at the DF may be positioned within a masking enclosure. However, even when such an enclosure is used, this phenomenon cannot be entirely eliminated. Moreover, the use of such a masking enclosure is relatively cumbersome and expensive, and is not suitable to mobile devices having small volume.

The Invention of U.S. Pat. No. 8,405,549

The invention of U.S. Pat. No. 8,405,549 relates to method and system for detecting by a direction finder device (hereinafter referred to as DF) the direction to one or more wireless communication sources, hereinafter referred to as "Targets". More specifically, the invention of U.S. Pat. No. 8,405,549 provides means for determining whether one or more Targets are located within a sector of interest. The invention of U.S. Pat. No. 8,405,549 does not consider, or depends on the received signal or wave attributes, such as amplitude, phase, time of arrival, or any other technical attribute. In other terms, The invention of U.S. Pat. No. 8,405,549 obtains said direction finding without performing any wave analysis. Rather than that, said invention is based on wireless communication existence or no existence, and induced wireless communication loss between the DF and the Target.

FIG. 1 shows a direction finder 10 according to an embodiment of U.S. Pat. No. 8,405,549 whose object is to determine those Targets 100a, 100b, 100c . . . etc. that are located within a sector of interest 20, and optionally also to provide indication as to the proximity of each Target to the central axis 21 of the direction sector of interest 20. Each of the Targets is a wireless communication source which is an RF transmitter or transceiver, repeater or transponder or a tag whose existence and/or ID and or direction has to be found by the DF. As noted above, the invention of U.S. Pat. No. 8,405,549 performs said tasks without relying on any of the wave or signal properties.

Figure 2:
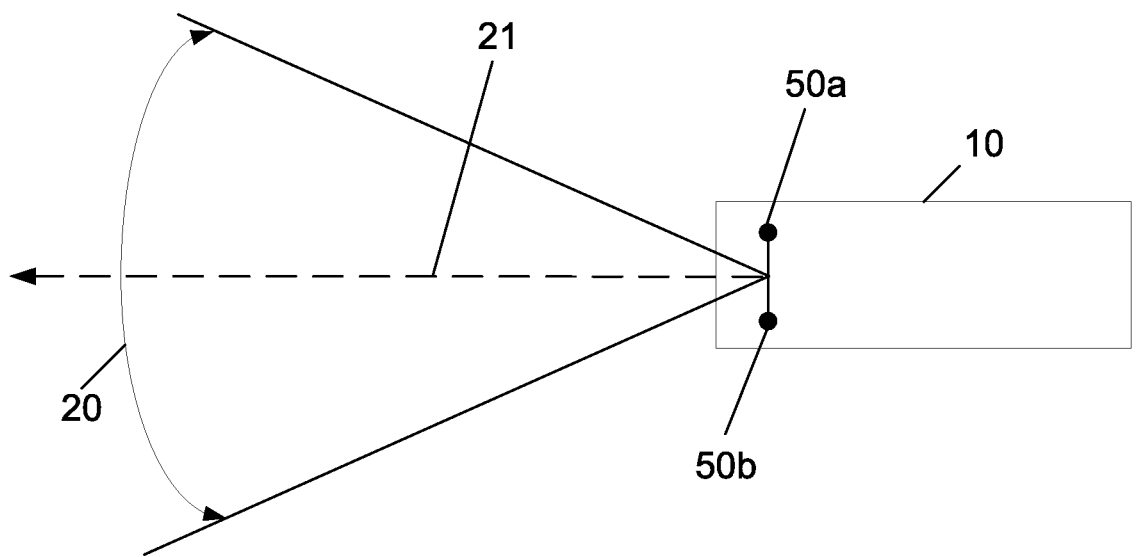
FIG. 2 shows a direction finder according to an embodiment of U.S. Pat. No. 8,405,549, which comprises two antennas that are arranged in a broad-side configuration.

FIG. 2 shows a direction finder 10 according to one embodiment of U.S. Pat. No. 8,405,549. The direction finder 10 comprises two antennas 50a and 50b that are arranged in a broad-side configuration, i.e., the central axis of the sector of interest is perpendicular to the line connecting the two antennas. Typical distance between the antennas is a quarter of the wavelength λ, and usually not more than half the wavelength λ.

The direction finding of U.S. Pat. No. 8,405,549 is based on the use of two antenna patterns, which will be referred herein as "reference" and "null" patterns (R and N respectively). The direction finding is performed in three major stages. The first stage ("stage 1") is performed while the reference pattern is generated, and the second stage ("stage 2") is performed while the null pattern is generated. In a third stage, a comparison between the previous patterns is made to infer if the Target is within the sector of interest.

Figure 3:
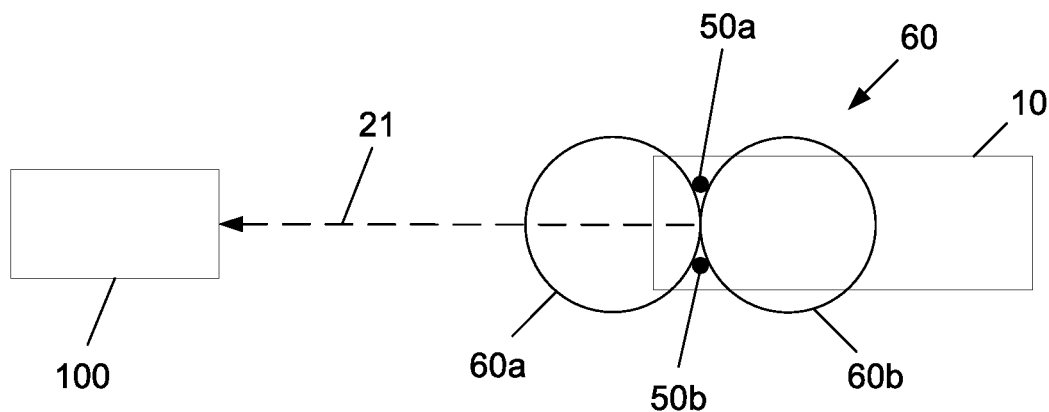
FIG. 3 shows the general form of the in-phase reference pattern, according to an embodiment of U.S. Pat. No. 8,405,549.

FIG. 3 shows the general form of the reference pattern according to an embodiment of U.S. Pat. No. 8,405,549. The reference pattern 60 is generated by an in-phase combination of the signals of the two antennas 50a and 50b, which forms an "8-shaped" pattern that comprises a front lobe 60a, and back lobe 60b. The front lobe 60a is directed toward central axis 21.

Figure 4:
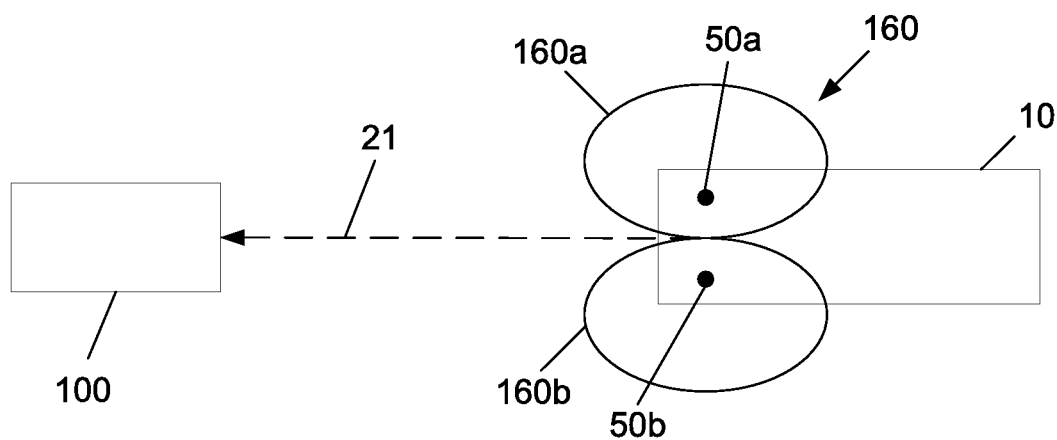
FIG. 4 shows the general form of the out-of-phase null pattern, according to an embodiment of U.S. Pat. No. 8,405,549.

FIG. 4 shows the general form of the null pattern according to an embodiment of U.S. Pat. No. 8,405,549. The null pattern 160 is generated by an out-of-phase combination of the signals of the two antennas 50a and 50b, which also forms an "8-shaped" pattern which is rotated by 90° with respect to the reference pattern of FIG. 3. The null pattern also comprises upper lobe 160a, and lower lobe 160b. The null between said two lobes is directed towards the central axis 21.

Figure 5:
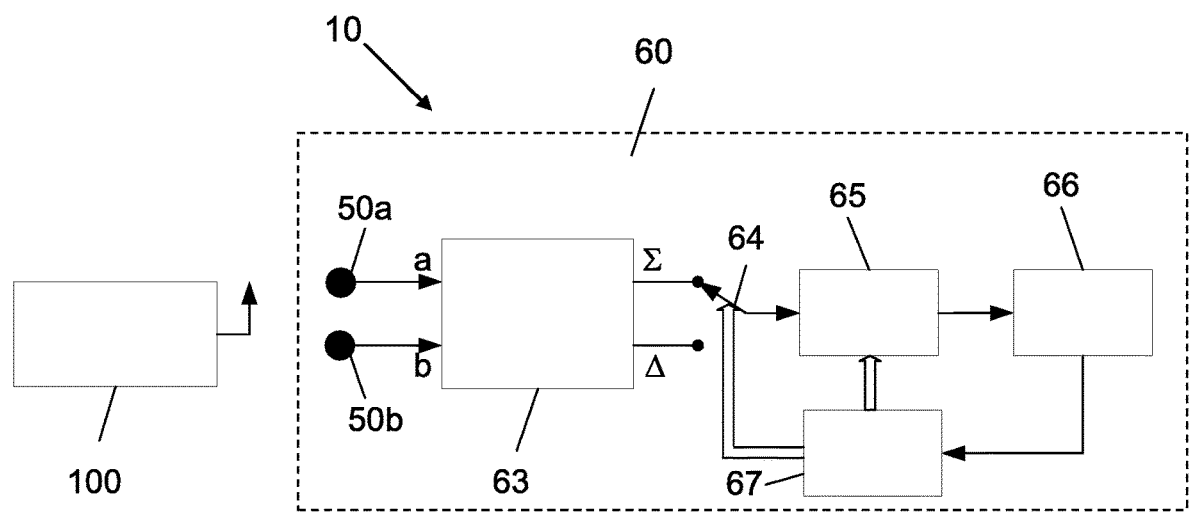
FIG. 5 illustrates a general structure of the direction finder, according to a first hardware embodiment of U.S. Pat. No. 8,405,549.

FIG. 5 illustrates the general structure of the direction finder 10, according to a first hardware embodiment of U.S. Pat. No. 8,405,549. The direction finder comprises a conventional wireless communication unit 66 that communicates with a similar wireless communication unit (not shown) of the Target 100. The 180° hybrid junction 63 is used to generate the reference and null patterns 60 and 160 (of FIGS. 3 and 4) respectively. The hybrid junction 63 is connected at its port a to antenna 50a, and at its port b to antenna 50b. The reference (i.e., in-phase) pattern 60 is generated at the Σ (sum) port and the null (i.e., out-of-phase) pattern 160 is generated at the Δ (difference) port. Switch 64 selects between the usage of the reference pattern at the first stage, and the usage of the null pattern at the second stage. Controlled attenuator 65, which is an essential element of the invention of U.S. Pat. No. 8,405,549, is used for indirect measurement of the relevant antenna pattern value at the direction of the Target, using a communication yes/no principle. More specifically, the communication yes/no principle operates as follows: Processing unit 67 accepts from the wireless communication unit 66 the information whether communication with Target 100 exists or not. The processing unit controls switch 64, and controlled attenuator according to the following DF procedure. First, in stage 1 the attenuation of attenuator 65 is set to 0 dB, and a communication between the wireless communication units of the direction finder 66 and the Target is established. Establishment of communication is regarded as "yes" when data handshake between the two wireless communication units is acquired. Loss of communication, i.e., "no" communication is regarded when data transfer between the two wireless communication does not exist, for example, due to loss of handshake. Attenuation in the wireless communication path is deliberately introduced by controlled attenuator 65 until communication is lost. More specifically, the attenuation is gradually increased, until loss of communication. In stage 1, i.e., when the reference pattern is used, the minimal attenuation required to lose communication is recorded, and noted R in dB units. Similarly, by switching switch 64 from E to A port in stage 2, i.e., when the null pattern is used, the minimal attenuation required to lose communication is recorded also, and noted N in dB units. The values of R and N directly depend on the direction to the Target, and on the active pattern (i.e., the pattern which is used at that time).

Figure 6A:
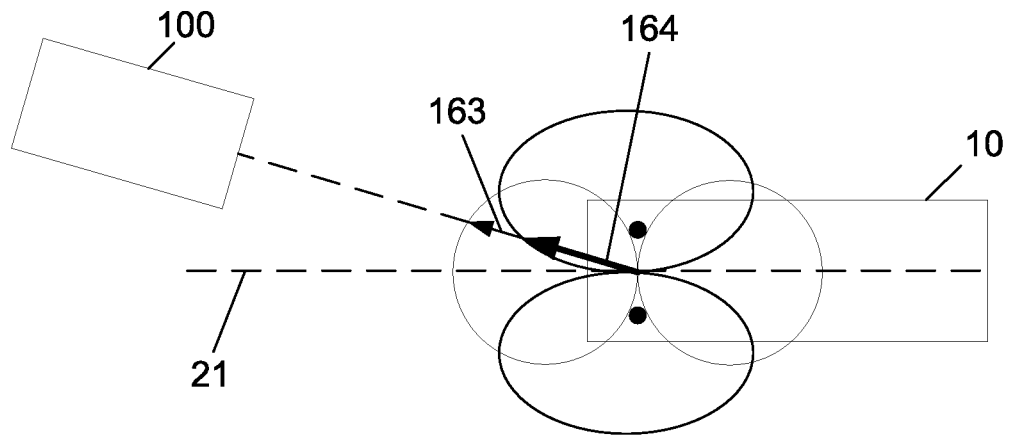
FIG. 6a shows a situation in U.S. Pat. No. 8,405,549 when a Target is positioned off the central axis of the direction sector of interest during generation of reference and null patterns respectively, and the corresponding vectors R and N that represent the attenuation which is required to lose communication in each of said cases.
Figure 6B:
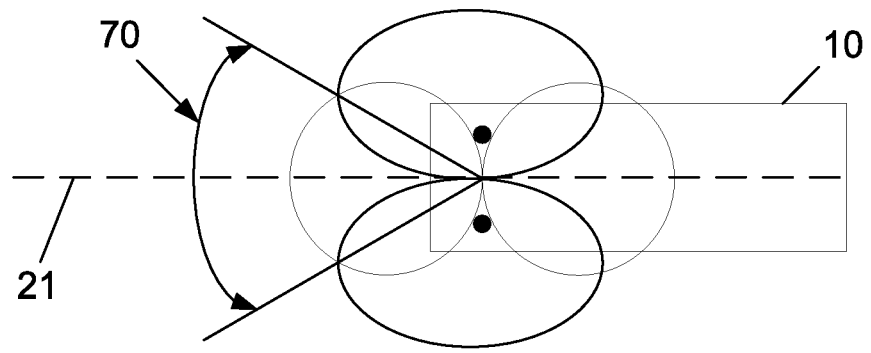
FIG. 6b shows the sector in which (R−N≥0), relative to the reference and null patterns respectively, as in U.S. Pat. No. 8,405,549.

FIG. 6a shows a situation in U.S. Pat. No. 8,405,549 in which Target 100 is positioned off the central axis 21. In that case, the vector 163 represents the R attenuation required to lose communication in stage 1. The closer the direction of Target 100 to the central axis 21, the larger R value becomes. Similarly vector 164 represents the N attenuation required to lose communication in stage 2. However, in stage 2, the closer the direction of Target 100 to the central axis 21, the smaller N value becomes. When the direction to Target 100 coincides with axis 21, R becomes maximal, and N becomes minimal. On the other hand, when the direction to Target 100 is 90° off the central axis 21, N becomes maximal, and R becomes minimal. FIG. 6b shows the sector 70 in which (R−N≥0). The larger the difference R−N is, the closer the Target direction to the central axis 21 is. The definition of the sector width can be controlled by requiring R−N≥C. When X≥0, the sector 70 width is narrowed, and when X≤the sector width is broadened.

Figure 7:
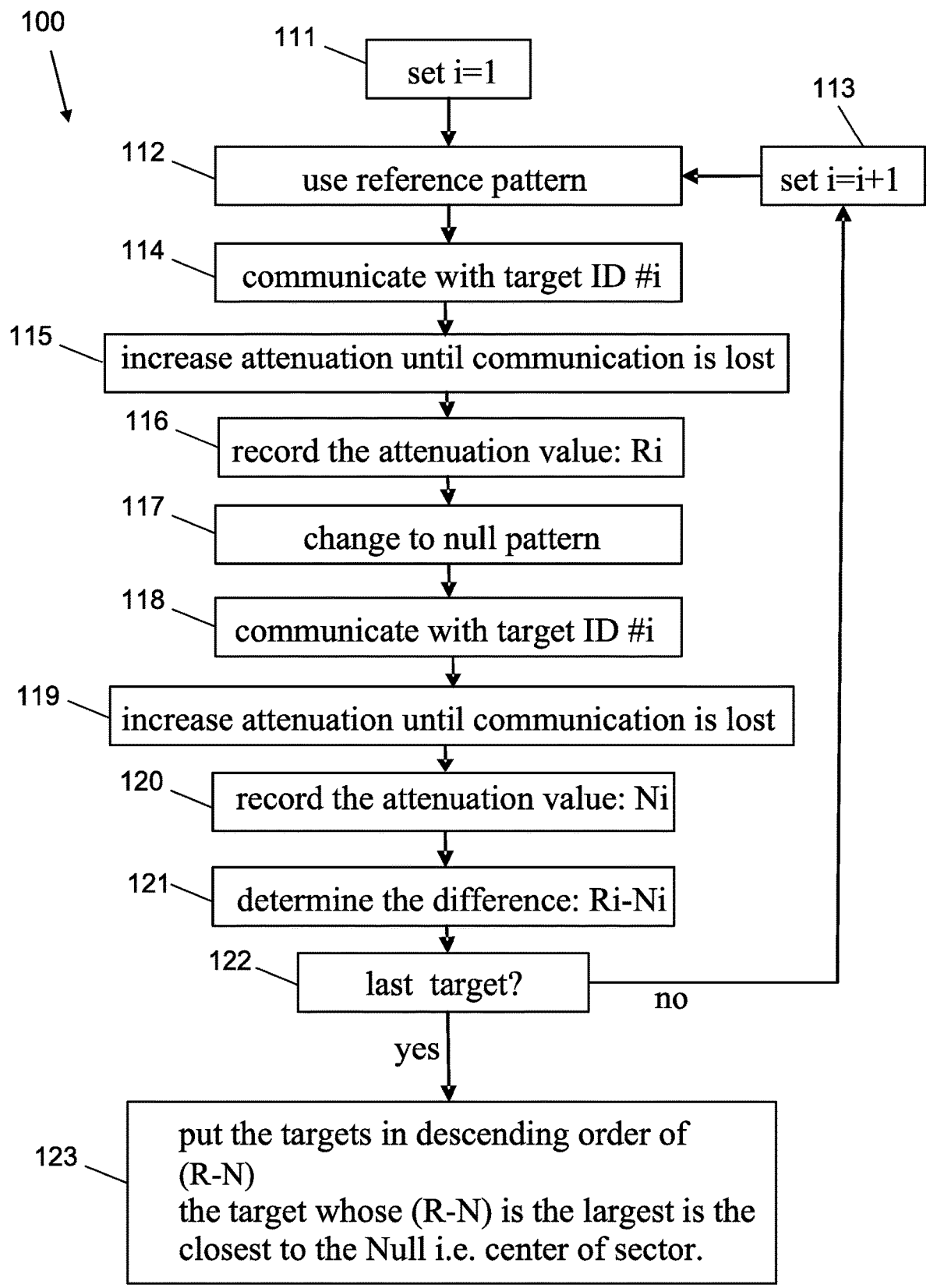
FIG. 7 is a flow diagram as in U.S. Pat. No. 8,405,549 for determining the direction to a Target when several Targets are present.

FIG. 7 is a flow diagram illustrating a procedure 100 for determining the direction when several Targets are present (i.e., having wireless communication directly with the DF), according to U.S. Pat. No. 8,405,549. In step 111, an index i, which represents a number which is assigned to each Target ID, is set to 1. Next, the reference pattern is activated in step 112, by switching switch 64 (FIG. 5) to the Σ position. In step 114, a communication is established with a Target # i. Next, in step 115, the attenuation is increased until loss of communication, and in step 116, the attenuation value R corresponding to the point of loss of wireless communication is recorded. In step 117, switch 64 is turned to the Δ position, the attenuation is zeroed, and again communication is established in step 118 with Target # i using a null pattern. In step 119, the attenuation is again increased until loss of communication. In step 120 the attenuation value N corresponding to the point of loss of wireless communication is recorded. In step 121, the value of Ri-Ni is determined, and recorded. In step 122, the procedure checks whether all Targets have been treated. In the negative case, the index i is increased by 1 in step 113, and the procedure repeats from step 112 for the new Target corresponding to the present I (of step 113). If, however, the answer in step 122 is yes, an analysis of all recorded values of Ri-Ni is performed in step 123. More specifically, in step 123 the Targets are arranged in descending order according to their determined Ri-Ni values. Furthermore, it can be concluded that the Target with index i whose Ri-Ni value is largest, is the closest to the sector central axis 21.

Figure 8:
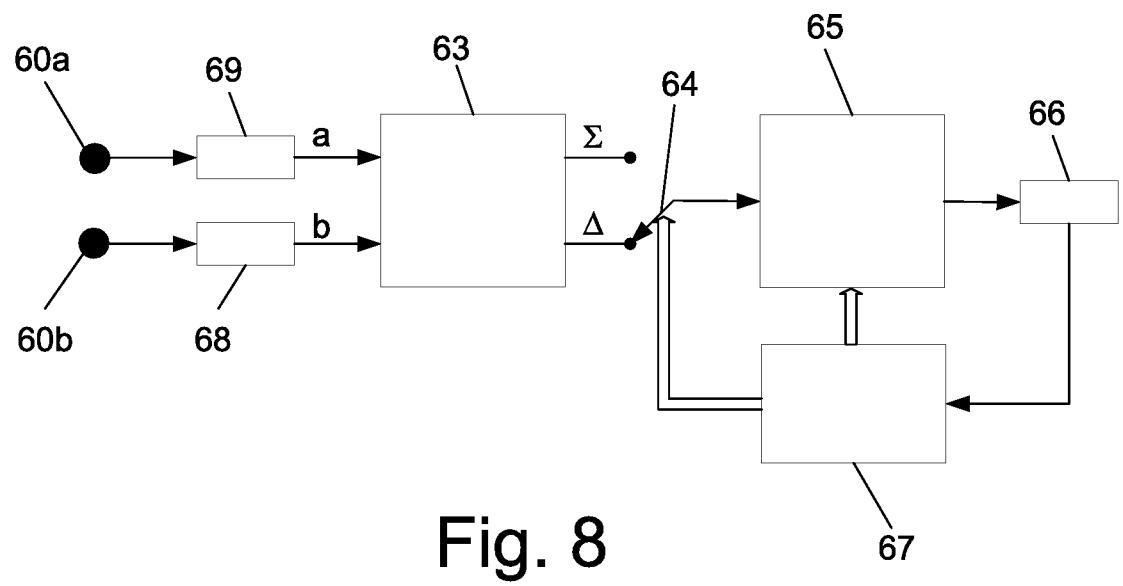
FIG. 8 shows a direction finder according to an embodiment of U.S. Pat. No. 8,405,549, which comprises elements for compensating for amplitude and phase differences in the antennas or other elements, thereby to respectively cause a deep null pattern which coincides with the central axis of the direction sector of interest.

U.S. Pat. No. 8,405,549 mentions that in practical situations the signals at antennas 50a and 50b, are not necessarily equal in amplitude and phase when communicating along axis 21. Moreover, cables from the antennas are not necessarily equal, and the 180° hybrid junction 63 is not perfect. This may result in null pattern whose null shifted off the axis 21, and/or the null depth is not maximized. The null depth is the difference in dB between the highest and the lowest values in an antenna pattern. To adjust the best possible null depth and/or the null position with respect to the central axis 21 of the direction finder, one or combination of the following additional components may be added to the direction finder, as shown in FIG. 8:

A Voltage Variable Attenuator—VVA 69: This component compensates for any amplitude difference in the antennas or other elements to acquire a deep null;

A phase shifter 68—This component compensates for any phase difference in the antennas or other elements to acquire a null coinciding with axis 21.

Figure 9:
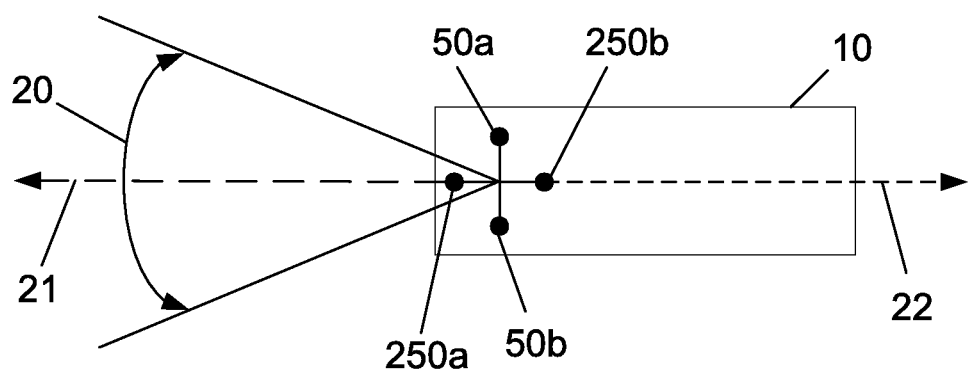
FIG. 9 shows an embodiment of U.S. Pat. No. 8,405,549 which further comprises two additional antennas in an end-fire configuration for performing front and back detection discrimination.
Figure 10A:
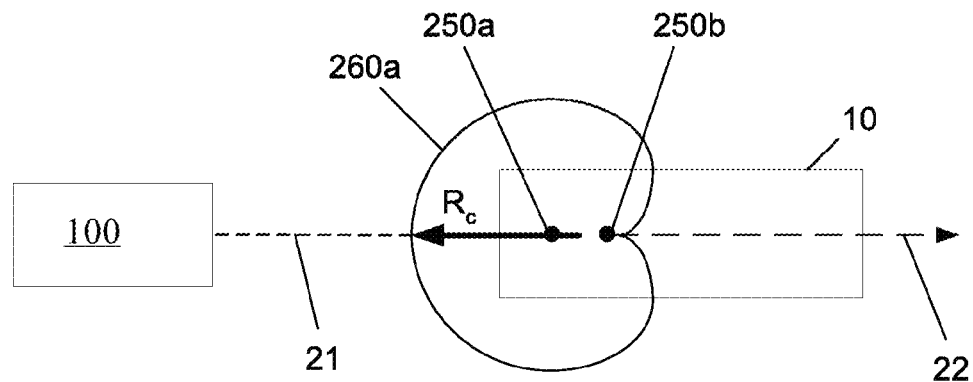
FIG. 10a shows the general form of a cardioid reference pattern as in U.S. Pat. No. 8,405,549 which is generated by an additional 90°-phase shift to the front antenna in order to provide front vs. back discrimination.
Figure 10B:
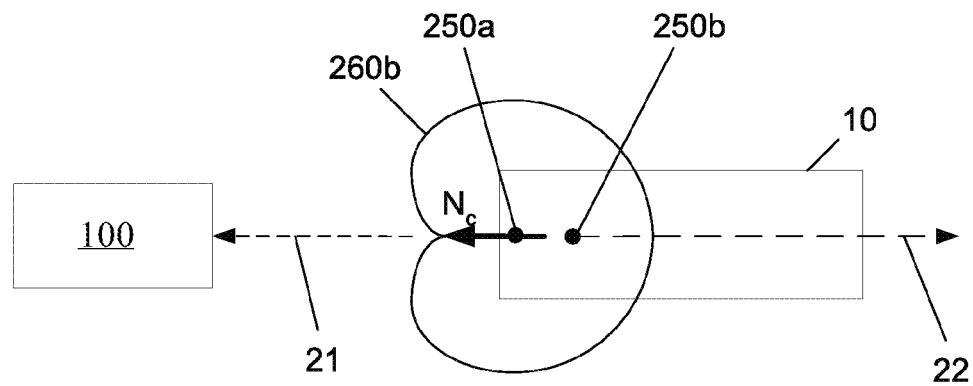
FIG. 10b shows the general form of a cardioid null pattern of U.S. Pat. No. 8,405,549 which is generated by an additional 90°-phase shift to the back antenna in order to provide front vs. back discrimination.

The procedure of U.S. Pat. No. 8,405,549 as thus far described enables the finding of Targets that are located within sector 20 (see FIG. 1). However, this procedure generally cannot discriminate between Targets that are located in front of the direction finder 10 and those that are located to the back of the direction finder 10, i.e., in the direction of arrow 22 (in FIG. 1). If a front vs. back discrimination is required, the following procedure may be performed. As shown in FIG. 9 of U.S. Pat. No. 8,405,549, two additional antennas 250a and 250b are added to the direction finder 10 in an end-fire configuration, i.e., the central axis 21 of the sector of interest coincides with the line connecting the two antennas 250a and 250b. As shown in FIGS. 10a and 10b of U.S. Pat. No. 8,405,549, in addition to the abovementioned reference and null patterns 60 and 160 that are produced in stages 1 and 2 using antennas 50a and 50b respectively, "cardioid" type antenna patterns 260a and 260b are generated in stages 3 and 4 using antennas 250a and 250b. FIG. 10a shows the general form of the cardioid reference pattern 260a as in U.S. Pat. No. 8,405,549. In stage 3, the cardioid reference pattern is generated by an additional 90°-phase shift to the front antenna 250a. The cardioid pattern comprises a lobe, which is directed toward central axis 21, and a null directed to the back axis 22. FIG. 10b shows the general form of the cardioid null pattern 260b. In stage 4, the cardioid null pattern is generated by an additional 90°-phase shift to the back antenna 250b. The cardioid pattern comprises a lobe, which is directed toward back axis 22, and a null directed to the front axis 21. The procedure as above described with respect to the generation of the vectors R and N is repeated in the cardioid stages 3 and 4. In stage 3, i.e., when the cardioid reference pattern 260a is generated, the minimal attenuation required to lose communication is recorded, and denoted $R_c$ in dB units. Similarly, in stage 4, when the cardioid null pattern is generated, the minimal attenuation required to lose communication is also recorded, and denoted $N_c$ in dB units. The values of $R_c$ and $N_c$ directly depend on whether the direction to the Target is in the front or the back (i.e., to the direction of axis 21 or axis 22). If $R_c > N_c$, it is concluded that the Target is in the front of the DF 10. Otherwise, If $R_c < N_c$, it is concluded that the Target is in the back of the DF 10.

Figure 11:
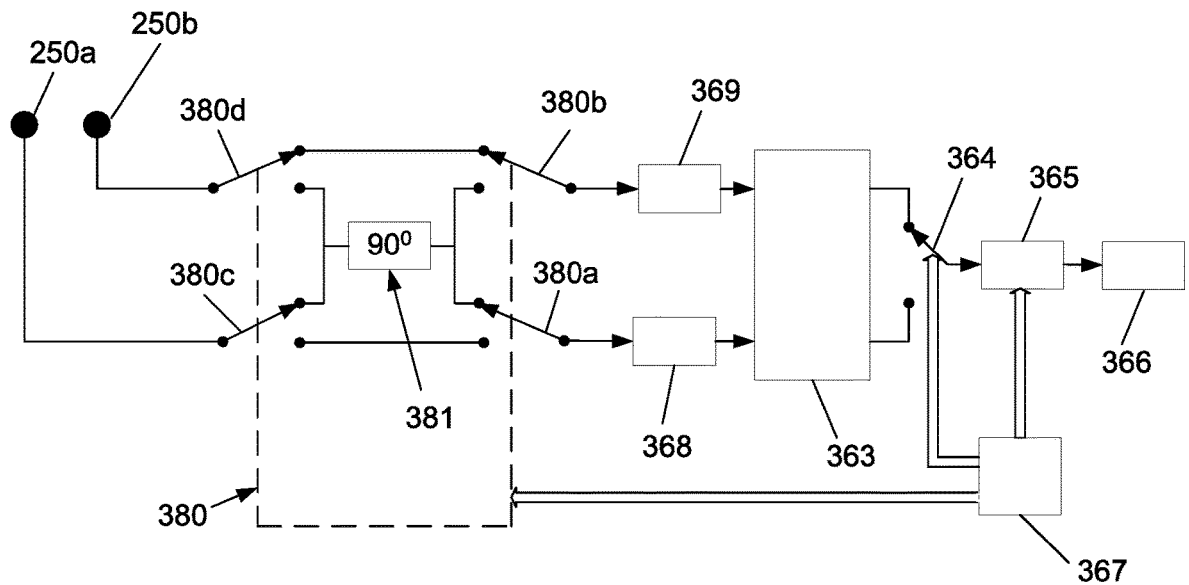
FIG. 11 illustrates in a block diagram form the general structure of a directional finder according to U.S. Pat. No. 8,405,549 having a front and back discrimination, as described with respect to FIGS. 9, 10a and 10b.

FIG. 11 illustrates in a block diagram form the general structure of the directional finder of U.S. Pat. No. 8,405,549 having a front and back discrimination, as described with respect to FIGS. 9, 10a and 10b. In stage 3, switch 380 is connected in the position as shown in the figure, thus introducing an additional 90° phase shifter 381 in the path of the front antenna 250a, thereby to generate the cardioid shown in FIG. 10a. In stage 4, switch 380 is turned to the lower position shown in the figure, thus introducing the additional 90° phase shifter 381 in the path of the back antenna 250b, thereby to generate the cardioid of FIG. 10b. Processing unit 367, in addition to controlling the switch 364 and controlled attenuator 365, controls the switch 380 according to procedure described above. The rest of the elements in the figure, i.e., elements 363, 364, 365, 366, 368, and 369 are essentially the same elements 63, 64, 65, 66, 68, and 69 as discussed above.

Alternate embodiments of U.S. Pat. No. 8,405,549 for acquiring the 90° phase shift are: (a) including a 90° phase shift for stage 3 and 270° phase shift for stage 4 as part of phase shifter 368; and (b) using a quadrature, i.e., 90° hybrid junction instead of the 180° hybrid junction 363.

Figure 12:
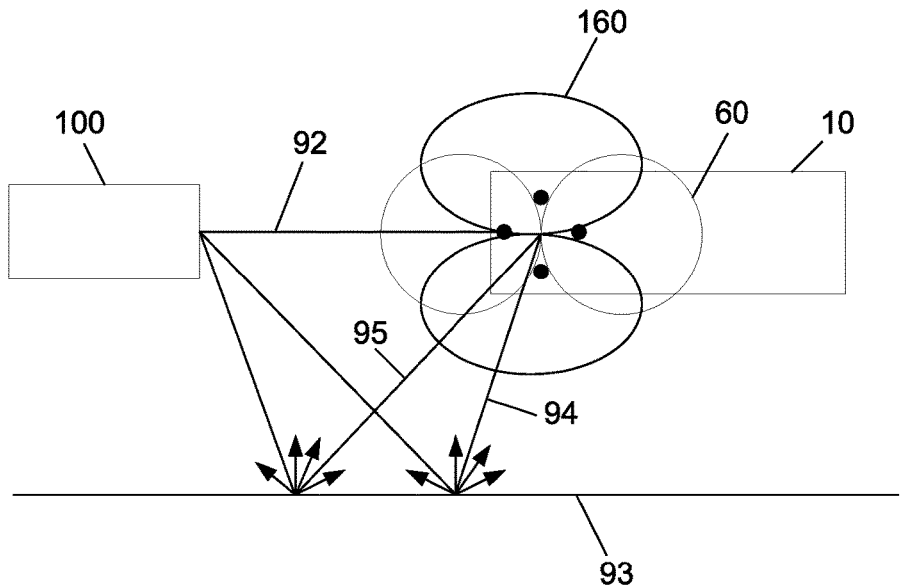
FIG. 12 illustrates how the invention of U.S. Pat. No. 8,405,549 overcomes reflected waves that arrive to the direction finder of the present invention.

In various situations, reflection of waves is expected from nearby objects, such as walls, or metallic objects. As shown in FIG. 12 of U.S. Pat. No. 8,405,549, waves transmitted from Target 100 may be scattered and reflected from nearby object such as wall 93, and arrive the direction finder 10 via many waves two of which 94 and 95 are shown in the figure. In contrast to the direct wave 92, the reflected waves are much weaker due to the following facts: (a) the reflected waves travel a longer path; (b) The reflected waves are scattered to many directions; and (c) the reflected waves from an object suffer from reflection losses. The reflected waves arrive at the DF later than the direct wave due to the longer path. These reflections are combined with the direct wave 92, distorting the amplitude, phase, and time of arrival of the signal. In prior art DF techniques that are based on measuring the signals amplitude, phase, or time of arrival, these multi-path reflections cause severe errors in the direction finding. A key novel feature of the invention of U.S. Pat. No. 8,405,549 is its ability to overcome multi-path reflections because the direction finding is based on the deliberate loss of communication concept, rather than measuring these signal attributes. The facts that the reflected waves are weaker than the direct wave 92 and that they are non-coherent, do not affect the existence of communication between the DF and the Target. As noted above, the existence or non-existence of communication is the basis of the invention of U.S. Pat. No. 8,405,549, rather than any specific characteristic of the arrived signal. As mentioned above, the DF procedure of U.S. Pat. No. 8,405,549 is based on the difference R–N rather than absolute values of received signal levels, and therefore the procedure of the invention of U.S. Pat. No. 8,405,549 is also not affected by the distance between the Target and the DF, as long as they can communicate.

Figure 13:
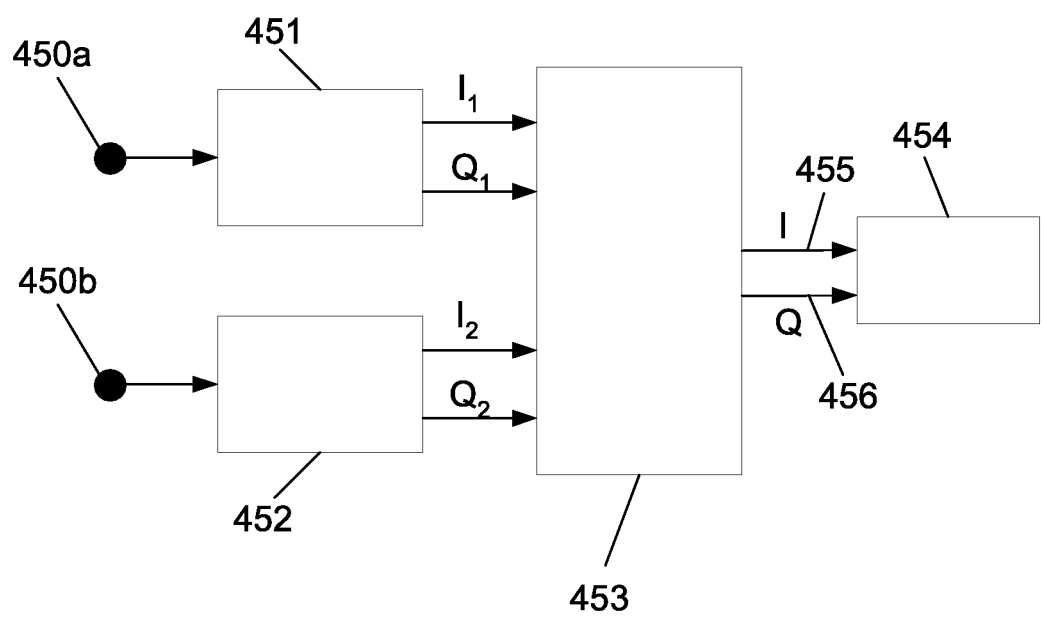
FIG. 13 illustrates in block diagram form the software based implementation of U.S. Pat. No. 8,405,549.

In yet another embodiment of U.S. Pat. No. 8,405,549, the DF technique as described above is implemented by software rather than hardware. In this embodiment, the same reference and null patterns of stages 1 and 2 respectively as mentioned with respect to FIGS. 3 and 4 are generated digitally. FIG. 13 generally illustrates in block diagram form the structure of the software based implementation. The first antenna 450a is connected to a first RF channel (radio receiver) 451. The second antenna 450b is connected to a second RF channel (radio receiver) 452. The ADC (Analogue to Digital Converter—not shown) (which may be a part of the radio receiver, or separate thereof) outputs of the RF channels are named the I/Q (In-phase/Quadrature) ports. The first RF channel 451 outputs are denoted $I_1$ and $Q_1$. The second RF channel 452 outputs are denoted $I_2$ and $Q_2$. Processing unit 453 receives $I_1$ and $I_2$ and $Q_1$ and $Q_2$ inputs, performs the direction finding technique by calculating new I and Q based on said inputs, and conveys over lines 455 and 456 respectively the newly calculated I and Q to the baseband component 454. In stage 1, the reference pattern is digitally generated by the sums $I=I_R=I_1+I_2$ and $Q=Q_R=Q_1+Q_2$. In stage 2. the null pattern is digitally generated by the differences $I=I_N=I_1-I_2$ and $Q=Q_N=Q_1-Q_2$. The deliberate attenuation which is performed in the hardware embodiment by the controlled attenuator 65, is replaced herein by a digital attenuation of the received signals represented by $I_1$, $Q_1$, and $I_2$, $Q_2$. In stage 1 the values of $I_R$ and $Q_R$ are reduced simultaneously, and in stage 2 the values of $I_N$ and $Q_N$ are reduced simultaneously. In stage 3 the values of $I_{Rc}$ and $Q_{Rc}$ are reduced simultaneously, and in stage 4, the values of $I_{Nc}$ and $Q_{Nc}$ are reduced simultaneously. The compensation for any amplitude and phase difference which was performed in the hardware implementation by VVA 69 and phase shifter 68, is performed in the software implementation digitally by adding correction factors I', Q', I", and Q", where the correction factors are digital values, that are either positive or negative. More specifically in stage 1, $I=I_R=I_1+I_2+I'$, and $Q=Q_R=Q_1+Q_2+Q_1$. In stage 2 $I_N=I_1-I_2+I"$, and $Q_N=Q_1-Q_2+Q"$. In stages 3 and 4 the additional 90° phase shift is performed in a similar way by adding or subtracting digitally the respective factors. More specifically, in stage 3, $I=I_{Rc}=I_1-Q_2+I'''$ and $Q=Q_{Rc}=I_2+Q_1+Q'''$ and in stage 4, $I=I_{Nc}=I_1+Q_2+I''''$ and $Q=Q_{Nc}=Q_1-I_2+Q''''$. Correction factors I''', Q''', I'''', and Q'''' are added in a similar manner to stages 1 and 2 for any amplitude and phase difference. It should be noted that all the discussions throughout U.S. Pat. No. 8,405,549 with respect to FIGS. 1, 2, 3, 4, 6a, 6b, 7, 9, 10a, 10b, 12, and 13 are applicable also for the software embodiment of U.S. Pat. No. 8,405,549.

It should be noted that the novelty of the hardware implementation of U.S. Pat. No. 8,405,549 generally resides in all the elements of FIGS. 5, and 8, excluding the wireless communication unit 66. The novelty of the hardware implementation of FIG. 11 of U.S. Pat. No. 8,405,549 generally resides in all the elements shown in the figure, excluding the wireless communication unit 366. The novelty of the software implementation of FIG. 13 essentially resides in the processing unit 453.

As has been shown, the invention of U.S. Pat. No. 8,405,549 provides a procedure for finding the direction to one or more Targets, which is based on yes/no communication. The type of communication used between the direction finder and the Target is generally irrelevant to the invention of U.S. Pat. No. 8,405,549, as long as a wireless communication is maintained during a "yes" communications state, and a loss of wireless communication occurs during a "no" communication state. The procedure of U.S. Pat. No. 8,405,549 uses an attenuator which intentionally causes loss of communication, wherein the attenuator may attenuate the received signal, the transmitted signal or both. The invention of U.S. Pat. No. 8,405,549 determines the difference between the reference pattern and the null pattern in order to find if a Target is within a sector of interest. The reference pattern may be directional or omni-directional. The invention of U.S. Pat. No. 8,405,549 uses at least two antennas, typically omni-directional but also may be directional, for finding the direction. For the reference pattern, also a single antenna may be used. The deliberately induced attenuation (either by the controlled attenuators 65 or 365 in the hardware embodiments, or digital attenuation in the software embodiments) may be performed gradually, or according to a search algorithm. In addition, the order by which the reference and null patterns are generated is replaceable. Furthermore, the attenuation may start with the highest value where communication does not exist, towards communication existence. It should also be noted that the Target is not required to be equipped with direction finding, but it may include such a feature.

The description above with respect to FIGS. 1-13 illustrates the invention of U.S. Pat. No. 8,405,549. This description of U.S. Pat. No. 8,405,549 has been brought for assisting in understanding the background to the present invention, and as several steps from the techniques of U.S. Pat. No. 8,405,549 are used within the present invention. The following description relates to embodiments of the present invention.

The Invention of U.S. Pat. No. 8,988,283

Figure 14A:
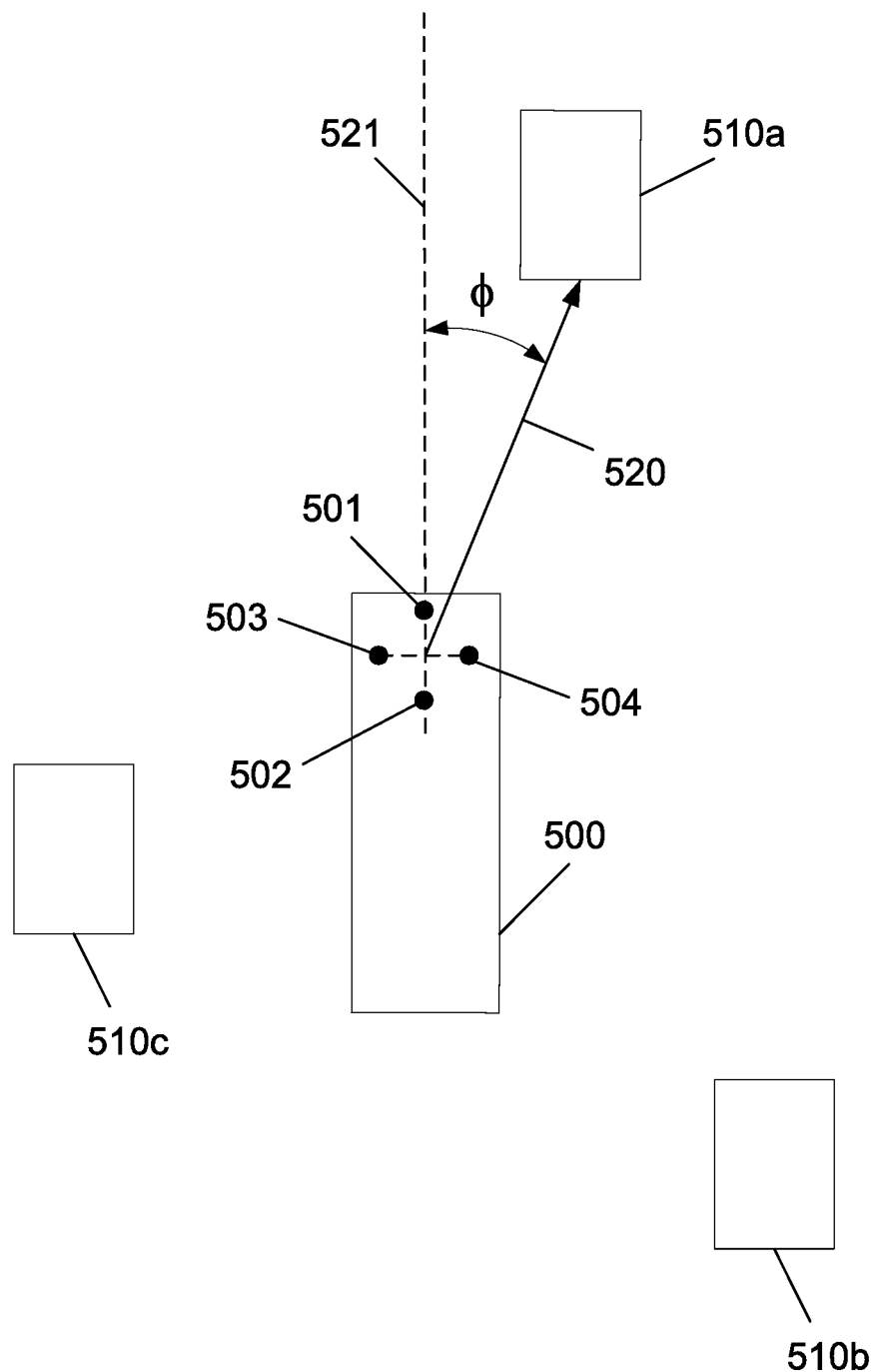
FIG. 14a describes a four-antenna arrangement for determining the direction from a direction finder (DF) 500 to a Target device, according to one embodiment of U.S. Pat. No. 8,988,283.

The invention of U.S. Pat. No. 8,988,283 is as follows:

A four-antenna arrangement for determining the direction from a direction finder (DF) 500 to a Target device, according to U.S. Pat. No. 8,988,283 is described in FIG. 14a. As before, the DF has a central axis 521. However, in contrast to the DF of U.S. Pat. No. 8,405,549 where the DF determines whether a Target is located within a predetermined sector, the arrangement of the invention of U.S. Pat. No. 8,988,283 enables determination of the direction φ to a Target 510 (several Targets 510a, 510b, 510c . . . etc. are shown in the figure). This direction φ is defined with respect to central axis 521 of the DF. The four antennas 501, 502, 503, and 504 are arranged in a Quadrangle configuration. In one preferred, rhombus configuration which is shown in the figure, the two antennas 501 and 502 are positioned on the central axis 521, and the two other antennas, namely 503 and 504 are positioned on an axis perpendicular to central axis 521. The typical distance between antennas 501 and 502 is a quarter of communication wavelength λ, and usually not more than half the wavelength λ. Similarly, the typical distance between antennas 503 and 504 is a quarter of the wavelength λ, and usually not more than half the wavelength λ. The direction finding of this invention is based on the comparison of R and N, said R and N are the values of the respective attenuations required to lose communication between the DF and the Target using a first and second cardioid antenna patterns respectively. Each of the R and N attenuation values is respectively used as an indirect measurement of the cardioid antenna pattern at the direction to the Target. The direction to the Target is derived by comparing R to N. Techniques for generating cardioid patterns by combining two signals from two antennas, that involve adding or subtracting 90° in software or hardware are described in U.S. Pat. No. 8,405,549 (the description relating to FIGS. 11 and 13).

Figure 15A:
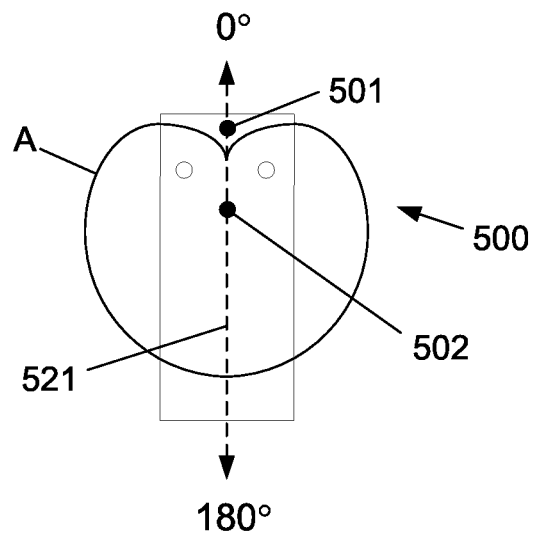
FIGS. 15a, 15b, 15c, and 15d show four antenna patterns respectively of the direction finding, according to an embodiment of U.S. Pat. No. 8,988,283.
Figure 15B:
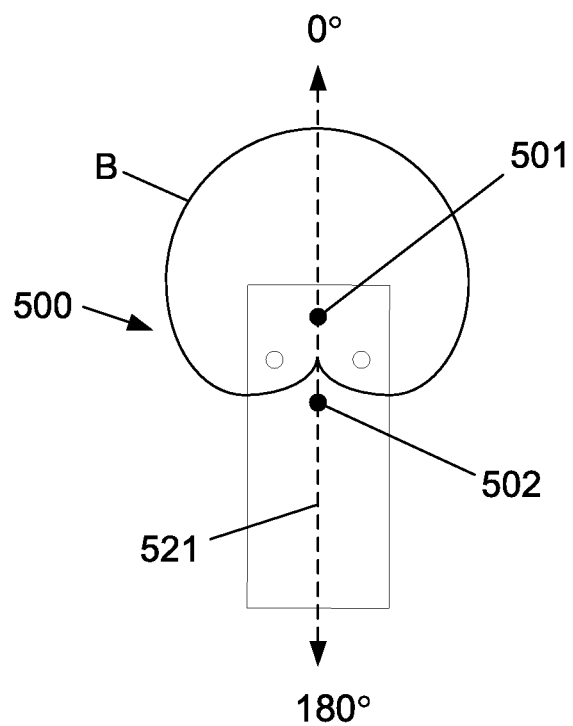

A basic (2D) direction finding is performed in nine stages, while holding the DF 500 essentially horizontally. The first stage ("stage 1") is performed while a first cardioid pattern A in the direction of 0° as shown in FIG. 15a is generated using antennas 501 and 502, resulting in determining a first attenuation value $R_A$. Hereinafter, a "0° antenna pattern" denotes an antenna pattern whose notch directs to the 0° direction as in FIG. 15a. A second stage ("stage 2") is performed while a second cardioid pattern B (a "180° antenna pattern") as shown in FIG. 15b is generated using antennas 501 and 502, resulting in determining a second attenuation value $N_B$. In a third stage ("stage 3") the relation between $R_A$ and $N_B$ (for example, $R_A-N_B$ or $R_A/N_B$) is calculated. In stage 4, one or more possible values for the direction $\phi$ to the Target as a function of $R_A$ and $N_B$ are obtained from a first lookup table (or equation). The correct direction $\phi$ from among those found is determined in subsequent stages.

Example 1

Figure 15C:
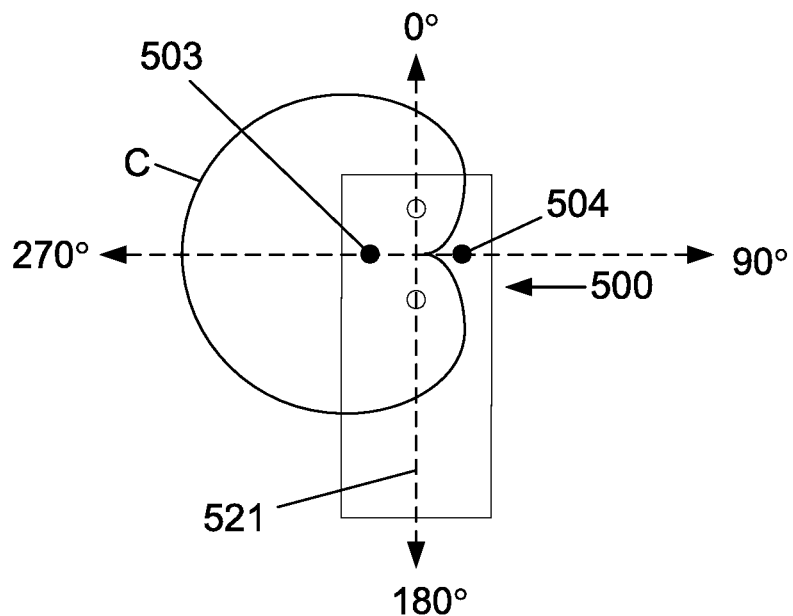
Figure 15D:
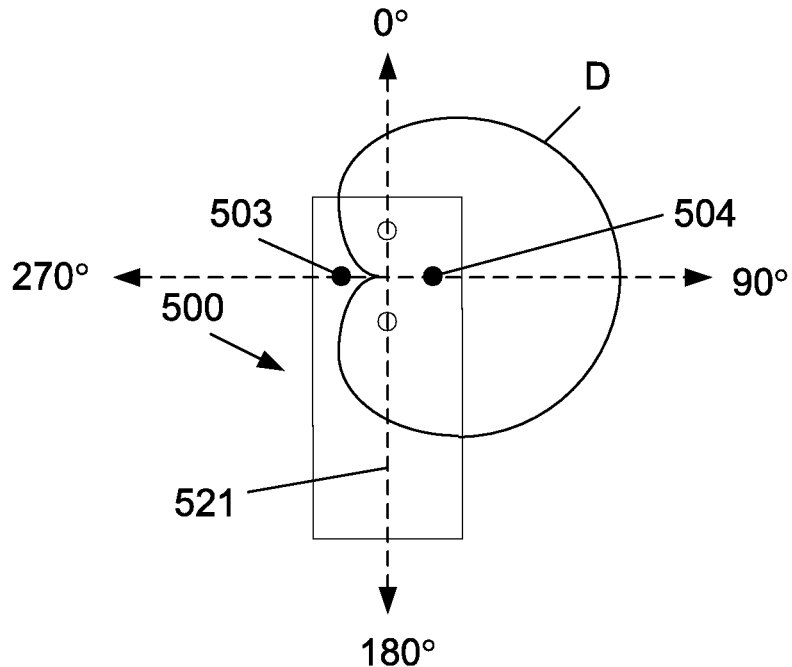
Figure 15E:
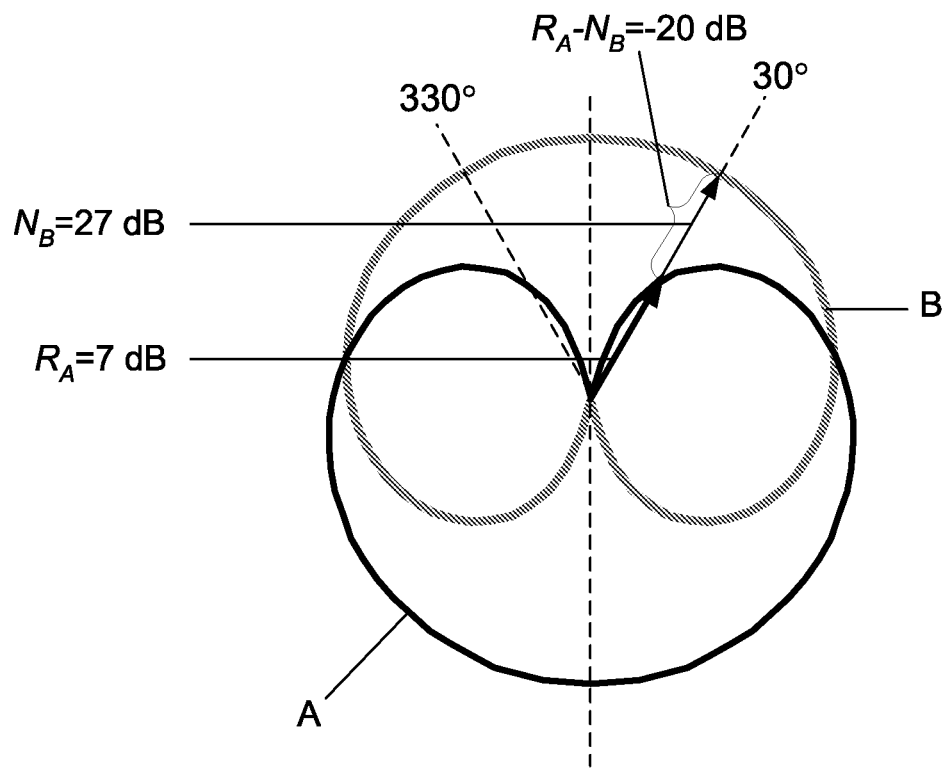
FIG. 15e shows an example for a direction finding according to one embodiment of U.S. Pat. No. 8,988,283.

The example of FIG. 15e illustrates the process above, relating to an R–N principle as applied with respect to a Target in the direction of 30°. The cardioids A and B are shown, and they are essentially the same as the cardioids of FIGS. 15a and 15b respectively. The cardioid A pattern gain is small and therefore relatively small amount attenuation is required to lose communication, e.g., $R_A$=7 dB. The cardioid B pattern gain is much larger and therefore relatively large amount of attenuation is required to lose communication, e.g., $N_B$=27 dB. The difference $R_A-N_B$=7-27=−20 dB, indicates that such a difference between the two vectors R and N can occur only in two directions, i.e., 30° (as shown) or 330° (not shown in the figure). Therefore, already in this stage the procedure can conclude that Target is either in the direction of 30° or 330° (for the sake of clarity only the vectors in the 30° direction are shown). This ambiguity will be resolved in the following stages.

Stage 5 is performed while a third cardioid pattern C (a 90° antenna pattern) as shown in FIG. 15c is generated using antennas 503 and 504, resulting in determining a third attenuation value $R_C$. Stage 6 is performed while a fourth cardioid pattern D (a 270° antenna pattern) as shown in FIG. 15d is generated using antennas 503 and 504, resulting in determining a fourth attenuation value $N_D$. In stage 7, the relation between $R_C$ and $N_D$ (for example, $R_C-N_D$ or $R_C/N_D$) is calculated. In stage 8, one or more possible values for the direction $\phi$ to the Target as a function of $R_C$ and $N_D$ are obtained from a second lookup table (or equation). In stage 9, the correct value of $\phi$ is determined by comparing those values that have been obtained in stage 4 with the values that have been obtained in stage 8.

Figure 15F:
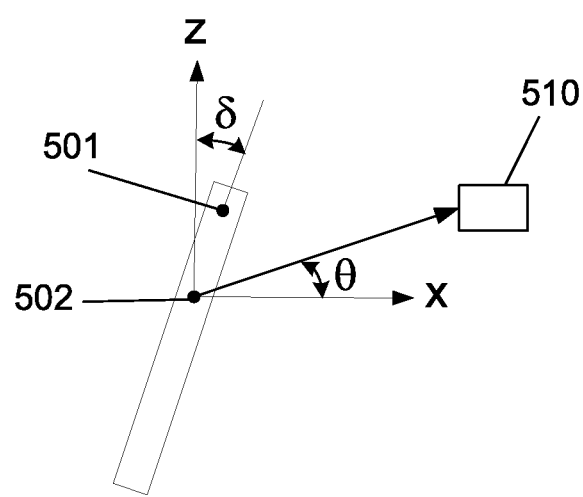
FIG. 15f shows the finding of an elevation angle to a Target, according to one embodiment of U.S. Pat. No. 8,988,283.

As mentioned, the above stages 1-9, that are performed while the DF is held essentially horizontally, determine the direction to Targets 510 in a horizontal plane (i.e., these stages refer to a 2D determination). When the Target elevation angle with respect to the DF is desired for a 3D application, the previous stages 1-3 are repeated in stages 10-12 while holding the device essentially vertically (FIG. 15f shows a side view of device 500 in which the device is held close to vertical). In stage 13 (which corresponds to original stage 4), one or more possible values for the elevation angle θ to the Target with respect to an axis z perpendicular to the plane of the device as a function of $R_A$ and $N_B$ are obtained from a third lookup table (or equation). As the DF may be held with a certain tilt angle δ with respect to the zenith (as shown in FIG. 15f), the measured elevation angle θ may be adjusted by adding or subtracting the tilt angle of the DF to determine the true Target elevation angle with respect to the horizon. The tilt angle of the DF may be derived, for example, by using a tilt sensor of any type, such as an accelerometer, Gyroscope, etc. which is positioned on the DF. For convenience purposes, the following description will use an accelerometer, but any other type of tilt sensor may be used. Furthermore, when the device is not held perfectly horizontally (during a 2D direction finding), the true direction to the Target in the horizontal plane may be found by adjusting the measured angle $\phi$ using the tilt angle δ.

Optional stages 14-17 may also be performed, repeating stages 1-4, while using a pair of antennas from the antenna arrangement that are located on a diagonal, such as antennas 501 and 503, or 501 and 504, etc, and while using additional lookup tables. These stages may be performed for the purpose of verification, or for increasing the measurement accuracy.

As mentioned above, a tilt sensor (such as accelerometer) is used within the DF in stages 10-13 to measure the tilt angle of the device, for determining the true elevation angle when the device is not held perfectly vertical. This tilt sensor may be used for still another purpose. As the tilt sensor continuously measures the orientation angle of the DF with respect to the horizon, it can be used to select the operation mode of the device. For example, if the measured angle by the tilt sensor is 0°±x° (0° is the horizon), the DF assumes that the user wishes to perform a 2D measurement (stages 1-9, and optional stages 14-17) in the plane. If, however, the measured angle by the tilt sensor is 90°±y° (90° is the zenith), the DF assumes that the user wishes to perform the elevation measurement (i.e., stages 10-13). In between those limits, the DF assumes that the user wishes to perform a full 3D measurement (i.e., stages 1-13, and optional stages 14-17).

The description above has shown how the elevation angle θ can be found between the DF and the Target. The description has also shown how the distance d to the Target can be determined (using the "round trip time" technique). Based on these two parameters, the determination of the difference in height between the DF and the Target is merely a manner of simple trigonometry. Therefore, in the following description when the difference in height is mentioned, it is assumed that the DF includes means or calculating the height difference based on said parameters, using trigonometry.

Figure 16A:
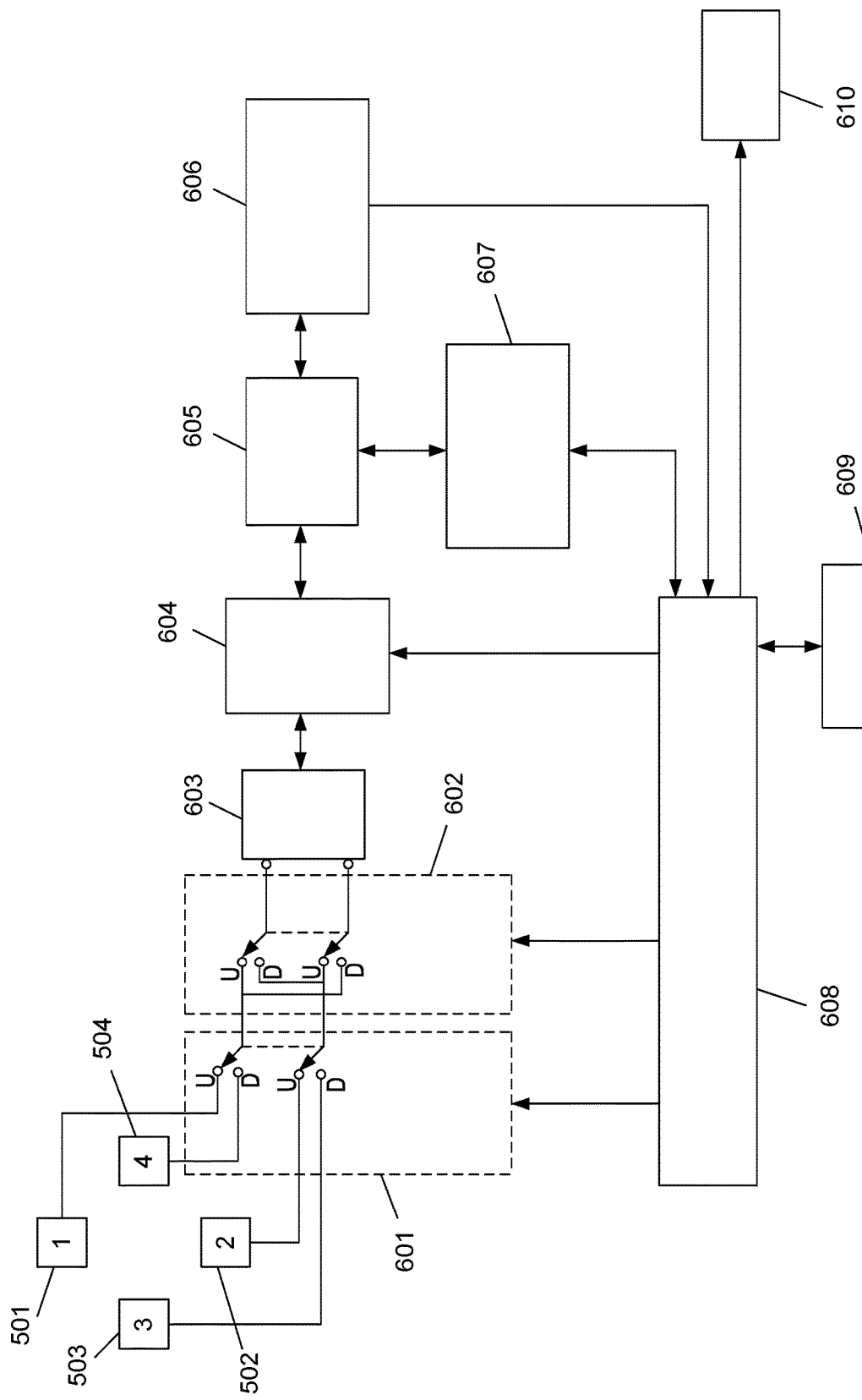
FIG. 16a illustrates the general structure of direction finder 500, according to a hardware embodiment of U.S. Pat. No. 8,988,283.

FIG. 16a illustrates the general structure of direction finder 500, according to a hardware embodiment of the invention. The direction finder comprises a conventional wireless communication unit 605 that communicates with a similar wireless communication unit (not shown) of the Target 510. The 90° hybrid junction 603 is used to generate the cardioid patterns shown in FIGS. 15a to 15d. The antenna switch 601 selects the pair of antennas that will be connected to the hybrid junction 603. The crossover switch 602 determines whether cardioids A and C are generated, or alternatively, cardioids B and D. Cardioid A is generated when switch 601 is positioned in its U position while cross-over switch 602 is positioned in its U position. Cardioid B is generated when switch 601 is positioned in its U position while cross-over switch 602 is positioned in its D position. Cardioid C is generated when switch 601 is positioned in its D position while cross-over switch 602 is positioned in its U position. Finally, cardioid D is generated when switch 601 is positioned in its D position while cross-over switch 602 is positioned in its D position.

Controlled attenuator 604 is used for an indirect measurement of the relevant antenna pattern value at the direction to the Target, using a communication yes/no principle as described in U.S. Pat. No. 8,405,549. More specifically, the communication yes/no principle operates as follows: Processing unit 608 accepts from the decision communication yes/no unit 606 the information whether communication with Target 510 exists or not. The processing unit 608 controls the position of the switches 601 and 602 according to stages 1-17 of the DF procedure. The processing unit 608 also controls the attenuation level of the controlled attenuator 604. Initially the attenuation of attenuator 604 is set to 0 dB, and communication between the wireless communication unit 605 (of DF 500) and a similar communication unit (not shown) within the Target is established. Existence of communication is regarded as "yes" when communication handshake between the two devices (i.e., between the DF and the Target) is established. Loss of communication, i.e., "no" communication, is regarded when communication handshake between the two wireless devices does not exist. Attenuation in the wireless communication path is deliberately introduced (either gradually or according to an algorithm) by controlled attenuator 604 until loss of communication. When the cardioid patterns A and C are generated, the minimal attenuations required to lose communication are recorded as $R_A$ and $R_C$ respectively. Similarly, by switching the switches 601 and 602, the cardioid patterns B and D are generated and the minimal attenuations required to lose communication are recorded as $N_B$ and $N_D$ respectively. The values of R and N directly depend on the direction to the Target, and on the pattern in use (i.e., the pattern in the relevant stage).

The lookup tables 609 are prepared in advance, and are stored within the DF 500. A first exemplary lookup table 609a, for determining the one or more possible values of φ, is shown in FIG. 17a. A second exemplary lookup table 609b, for determining the one or more possible values of θ, is shown in FIG. 17b. The manner of selecting between various possible angle results will be explained hereinafter. The look up tables 609 are preferably constructed by means of experiments. For example, repeated experiments are performed for Targets at various angles and cardioid patters. For example, the relationship between R and N (for example R−N or R/N), as measured, is recorded for each angle. The use of look up tables is advantageous as it can compensate for differences between theoretical and practical issues, such as antenna patters, or factors that may affect the patterns. The device should preferably include one or more of lookup tables according to the following criteria:
  a. The specific pair of antennas in use;
  b. The mode of operation (2D or 3D) and the tilt angle of holding the device;
  c. Operating frequency of the communication (e.g., various WiFi channels);
  d. The antenna type in use (e.g., ceramic, PIFA, etc.);
  e. Effect of the manner of holding the device by the user hands on the antennas patterns, e.g., as measured by proximity sensors on the DF.
  f. Other types of lookup tables to provide more accurate results may be used.

As discussed above, the lookup tables may provide more than one possible resulting angles for a single R and N relationship. The true angle can be found by comparing the results as obtained from several lookup tables, and selecting or calculating the most likely result. For example, if a first lookup table provides the values of 10°, 80°, and 150°, while a second lookup table provides the values of 40°, 86°, and 270°, the most probable value might be suggested to be 83°.

As mentioned above, the DF procedure of the present invention is based on the relationship between R and N rather than absolute values of received signal levels, and therefore the procedure of the invention of U.S. Pat. No. 8,988,283 is also not affected by the distance between the Target and the DF, as long as they can communicate.

Figure 16B:
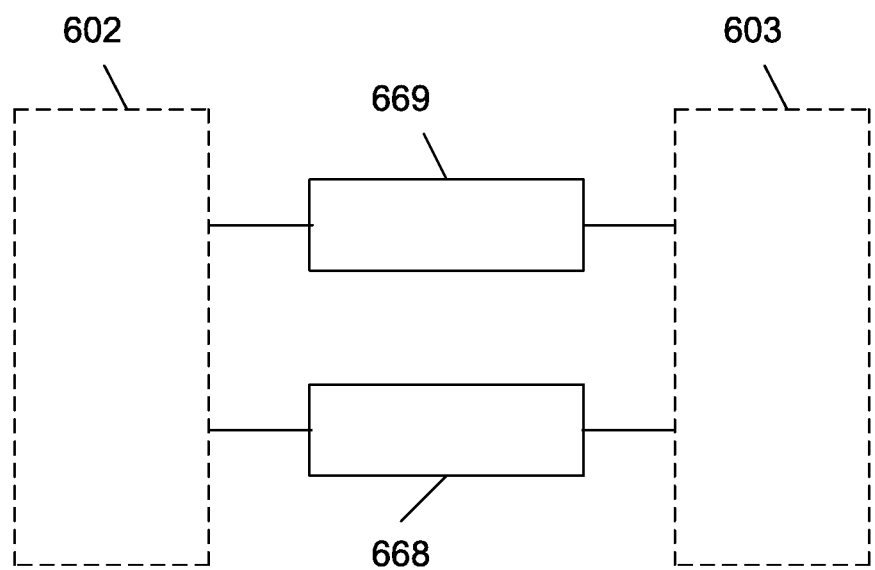
FIG. 16b shows a compensation circuit for the device of U.S. Pat. No. 8,988,283.

In practical situations, the received and transmitted signals at antennas 501, 502, 503, and 504 are not necessarily equal in amplitude and expected phase. Moreover, the antenna switch 601 and the cross over switch 602 may not necessarily have equal loss and phase shift while transferring signals to and from the antennas. Moreover, the 90° hybrid junction 603 is not perfect. These may result in patterns that are distorted relative to the theoretical patterns shown in FIGS. 15a-15d, possibly causing an error in the calculated direction to the Target with respect to the true direction. Compensation for this error may obtained by adding an attenuator and/or phase shifter between the cross over switch 602 and hybrid junction 603, as shown in FIG. 16b. A phase shifter 668 compensates for any phase difference in the antennas or other elements to acquire the desired patterns. Attenuator 669 in turn compensates for any amplitude difference in the antennas and other elements, including said phase shifter 668.

Figure 18A:
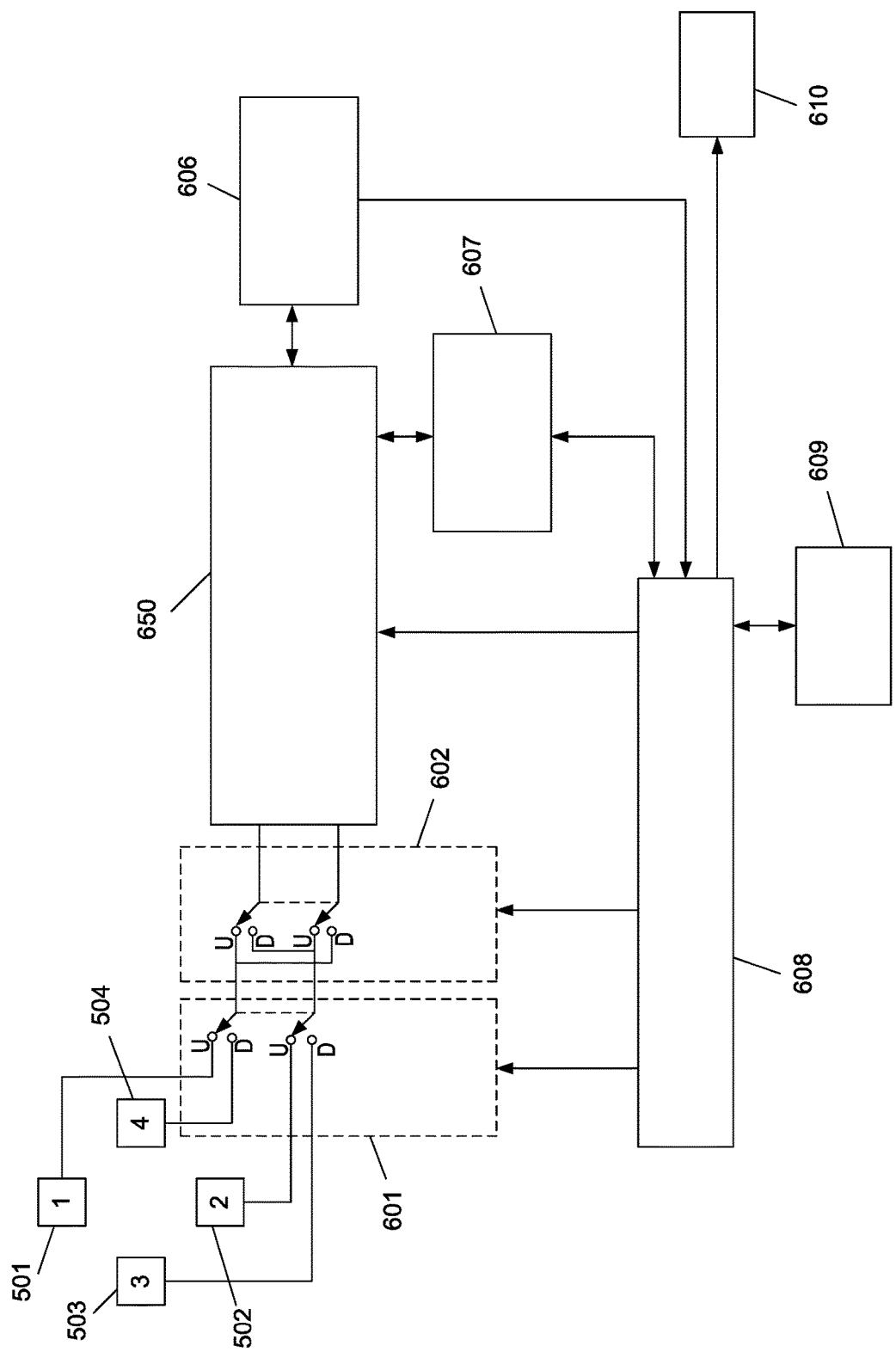
FIGS. 18a and 18b show software implementations of the device and technique of U.S. Pat. No. 8,988,283, having four-antenna and three-antenna arrangements respectively.
Figure 19:
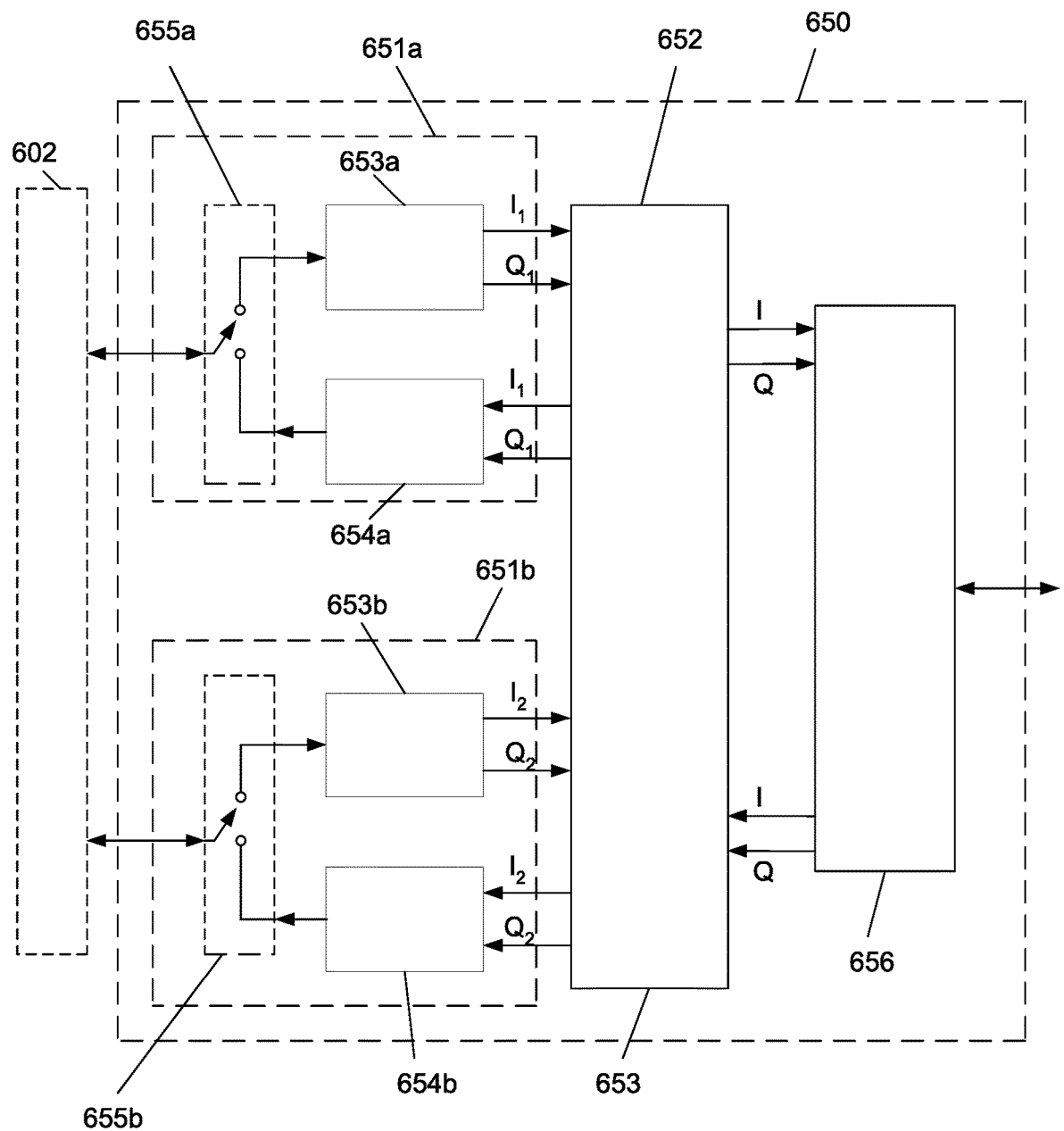
FIG. 19 shows the structure of a processing unit, which is a part of the software implementation, according to one embodiment of U.S. Pat. No. 8,988,283.

In yet another embodiment, the DF technique as described above is implemented by software rather than hardware. This implementation is shown in FIG. 18a, and the structure of the processing unit 650 is shown in FIG. 19. In the software implementation, a portion of the hardware implementation of FIG. 16a is replaced by a communication and processing unit 650. The structure of communication and processing unit 650 is shown in FIG. 19. In this software implementation, the same cardioid patterns of the stages as described above are generated digitally rather than using a hybrid junction. A first port of the cross-over switch 602 is connected to a first RF channel 651a, and a second port of the cross-over switch 602 is connected to a second RF channel 651b. The first RF channel 651a comprises a receiver of the first RF channel 653a, a transmitter of the first RF channel 654a, and a T/R switch of the first RF channel 655a. The T/R switch of the first RF channel 655a selects whether to connect the cross-over switch 602 to the receiver 653a, or transmitter 654a, according to the communication mode of operation. The outputs of the receiver of the first RF channel 653a are denoted $I_1$ and $Q_1$ (In-phase/Quadrature), and are conveyed to a cardioid generator and attenuation unit 652. The second RF channel 651b comprises a receiver of the second RF channel 653b, a transmitter of the second RF channel 654b, and a T/R switch of the second RF channel 655b. The T/R switch of the second RF channel 655b selects whether to connect the cross-over switch 602 to the receiver 653b, or transmitter 654b, according to the communication mode of operation. The outputs of the receiver of the second RF channel 653b are denoted $I_2$ and $Q_2$ (In-phase/Quadrature), and are conveyed to a cardioid generator and attenuation unit 652. While receiving, the cardioid generator and attenuation unit 652 generates the cardioid patterns by calculating new I and Q values based on the $I_1$, $Q_1$, and $I_2$, $Q_2$ input values from the receivers 653a and 653b, and conveys them to baseband unit 656. While transmitting, cardioid generator and attenuation unit 652 generates the cardioid patterns by calculating new $I_1$, $Q_1$, and $I_2$, $Q_2$ values and conveys them to the transmitters 654a and 654b based on the I and Q values as received from baseband unit 656. Baseband unit 656 either accepts I,Q values from the cardioid generator and attenuation unit 652, or it conveys I,Q values to baseband unit 656. The baseband unit the baseband unit 656 is connected to the decision communication yes/no unit 606.

The cardioid generator and attenuation unit 652 uses the following equations. While receiving, cardioid patterns A and C, are generated using the equations $I=I_1-Q_2$ and $Q=I_2+Q_1$. Furthermore, cardioid patterns B and D are generated using the equations $I=I_1+Q_2$ and $Q=Q_1-I_2$. While transmitting, cardioid patterns A and C, are generated using the equations $I_1=I$, $Q_1=Q$, $I_2=-Q$ and $Q_2=I$. Furthermore, cardioid patterns B and D are generated using the equations $I_1=I$, $Q_1=Q$, $I_2=Q$ and $Q_2=-I$.

The compensation for any amplitude and phase difference which was performed in the hardware implementation by phase shifter 668 and attenuator 669 (see FIG. 16*b*), is performed in the software implementation digitally by adding correction factors i and q to each of the abovementioned I and Q equations respectively. The i and q correction factors are digital values, that are either positive or negative. The i and q correction factors may have different values for the different I and Q equations, the required cardioid (A-D), and the criteria impacting or affecting the lookup tables indicated above. The i and q factors are found experimentally, and stored within the DF 500.

Cardioid generator and attenuation unit 652 deliberately and digitally attenuates the received and transmitted signals. More specifically, unit 652 simultaneously attenuates the $I_1$, $Q_1$, and $I_2$, $Q_2$ values while receiving and the $I_1$, $Q_1$, and $I_2$, $Q_2$ values while transmitting. The rest of the components of the software implementation in FIG. 19 function essentially the same as the corresponding components of FIG. 16. Therefore, for the sake of brevity the discussion about these components will not be repeated.

Figure 14B:
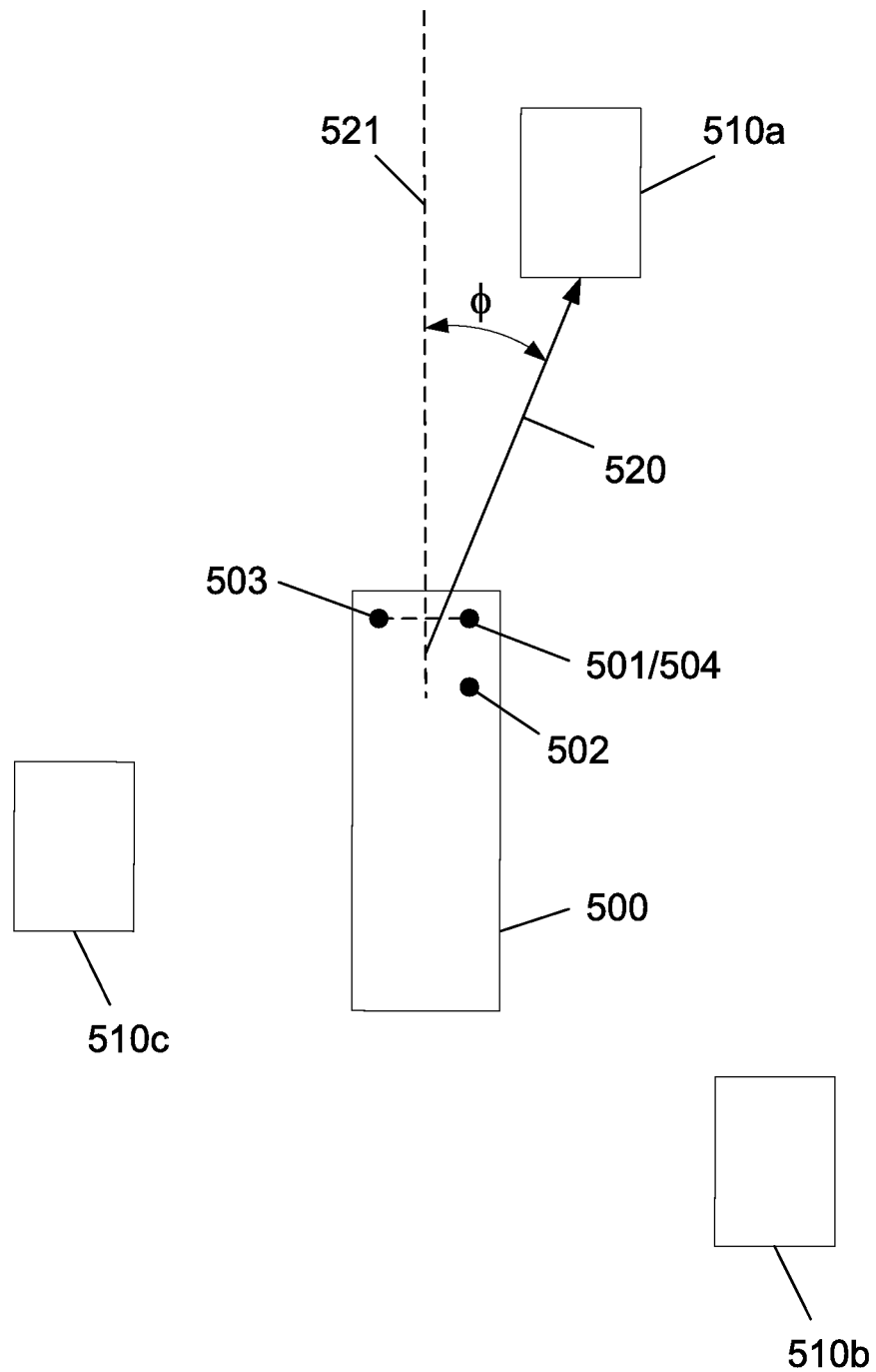
FIG. 14b describes a three-antenna arrangement for determining the direction from a direction finder (DF) 500 to a Target device, according to one embodiment of U.S. Pat. No. 8,988,283.
Figure 16C:
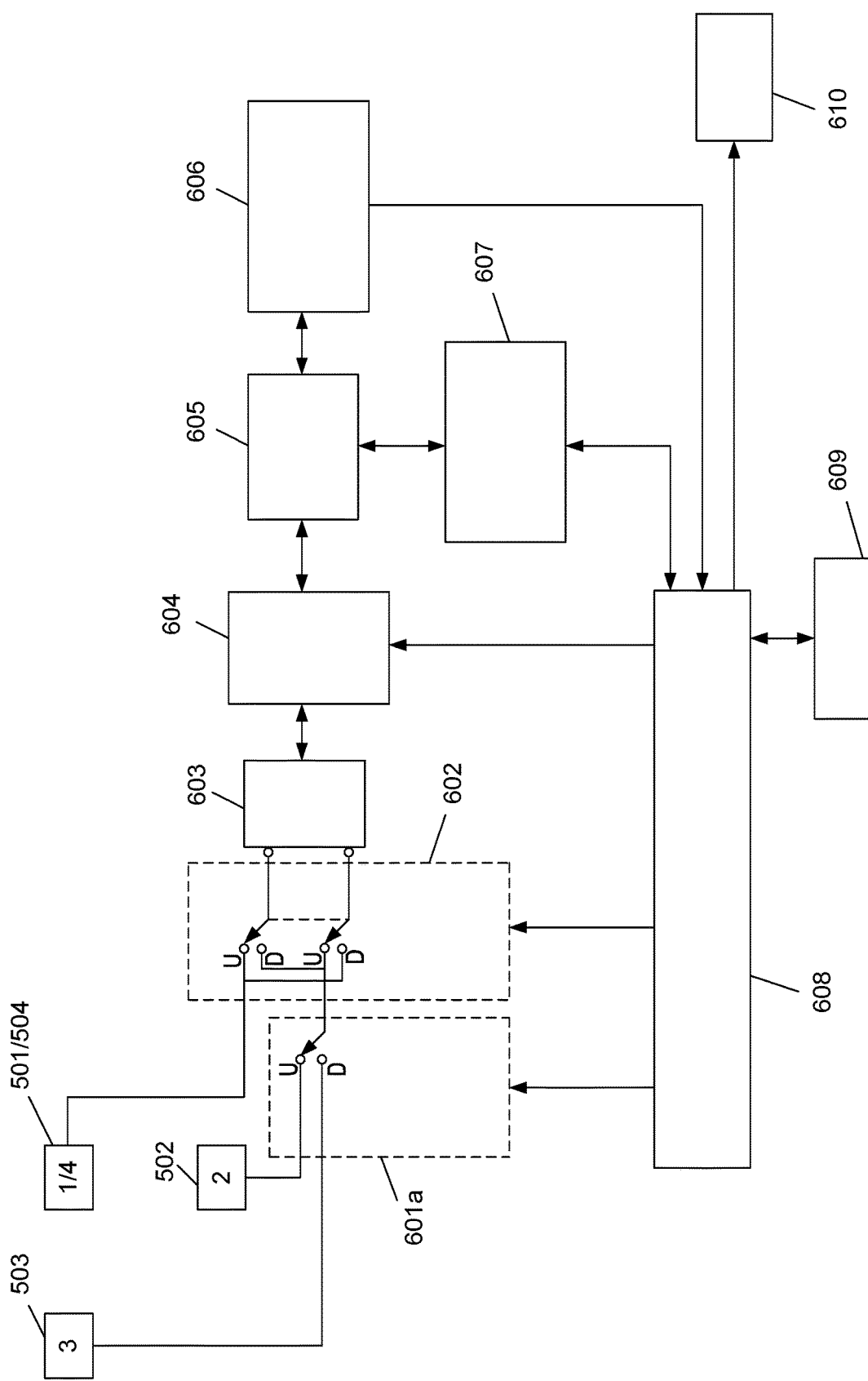
FIG. 16c shows a structure of the device of U.S. Pat. No. 8,988,283, having a three antenna arrangement.
Figure 18B:
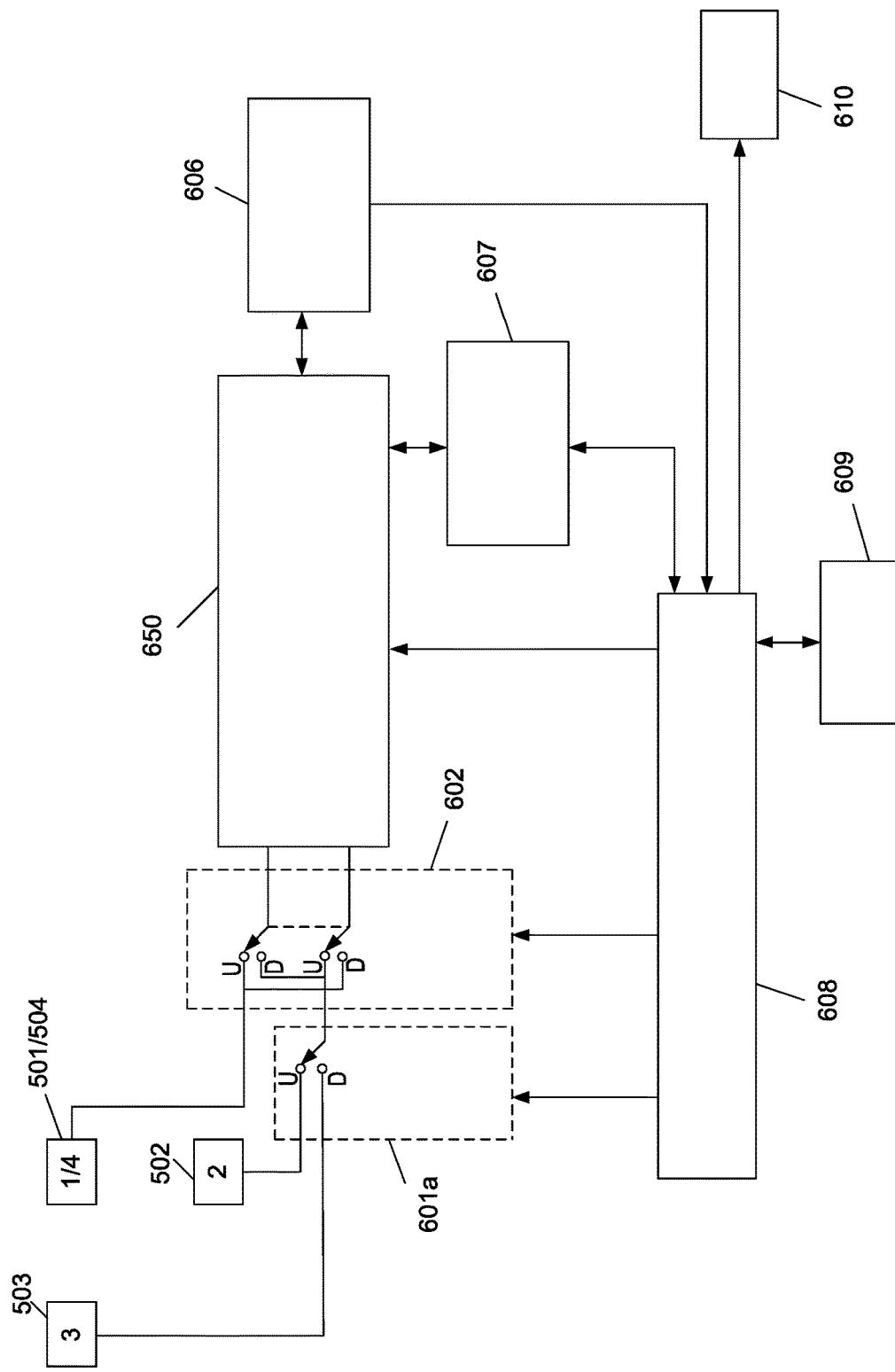

The system, method and device of the invention as described above requires use of two pairs of antennas, antenna pair 501 and 502, and antenna pair 503 and 504, one pair of antennas is used at each given time. It has been found by the inventors that the invention can be performed by use of 3 antennas, where one antenna is common to both pairs. For example, a single antenna 501/504 as shown in FIGS. 14*b*, 16*c*, and 18*b*, may serve the functions of antennas 501 and 504, e.g., as discussed before with respect to FIG. 14. As a result, the antenna switch 601*a* shown in FIGS. 16*c* and 18*b* includes one switch in comparison to the required two switches of FIGS. 16*a* and 18*a*. The operation of the 3 antennas configuration is the same as described above with respect to the 4 antennas configuration, with minor required adaptations.

The description thus far demonstrates how the direction to a Target can be determined. If determination of the distance is desired, this can be done using the "round trip time" technique by the distance measurement unit 607 shown in FIGS. 16*a*, 16*c*, 18*a*, and 18*b*. More specifically, the DF sends a signal, e.g., a digital packet (or "ping") and receives a reply. The round trip time from the time of transmission until the time of reception is measured. The distance to the Target is calculated using the round trip time, the speed of light, and taking into account the two way travel of the signal, and the processing times of the DF 500 and the Target 510.

The description thus far demonstrates how the direction and distance to a single Target within the communication range can be determined. If the finding of the directions and distances to plurality of Targets is desired, the procedure is repeated for each Target separately.

The directions and distances to the Targets are displayed in a radar-like manner on the display unit 610 (see FIGS. 16*a*, 16*c*, 18*a*, and 18*b*).

Figure 20:
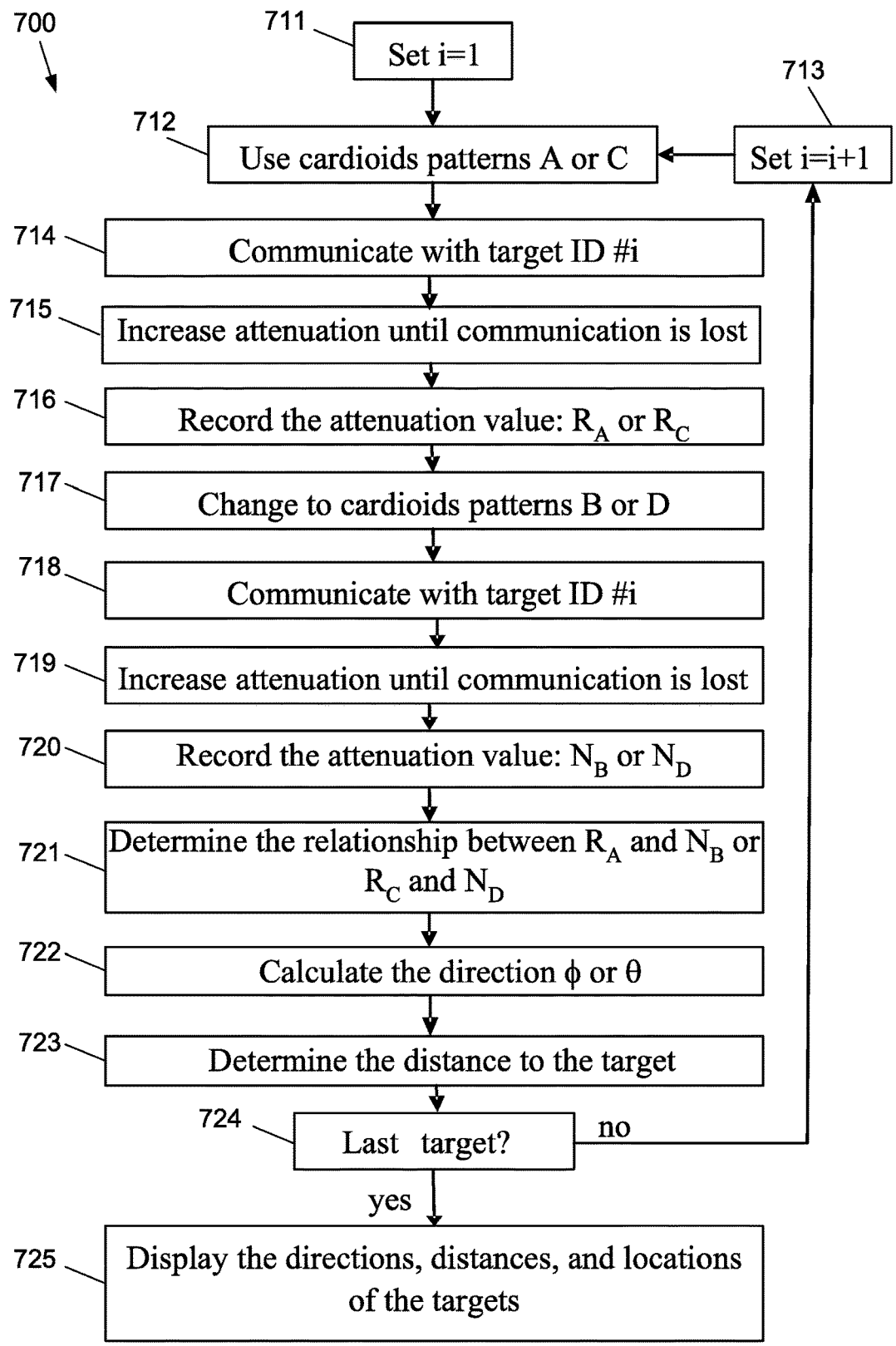
FIG. 20 is a flow diagram illustrating a procedure for determining the directions and distances to several Targets in the communication range, according to an embodiment of U.S. Pat. No. 8,988,283.

FIG. 20 is a flow diagram illustrating a procedure 700 for determining the directions and distances to several Targets in the communication range (i.e., having wireless communication directly with the DF), according to an embodiment of the invention of U.S. Pat. No. 8,988,283. In step 711, an index i, which represents a number which is assigned to each Target ID, is set to 1. Next, a cardioid pattern A or C according to the stages above is activated in step 712. In step 714, a communication is established with a Target # i. Next, in step 715, the attenuation is increased until loss of communication, and in step 716, the attenuation value $R_A$ or $R_C$ respectively, corresponding to the point of loss of wireless communication are recorded. In step 717, cardioid pattern B or D according to the stages above is activated. In step 718, a communication is again established with a Target # i. Next, in step 719, the attenuation is increased until loss of communication, and in step 720, the attenuation values $N_B$ or $N_D$ respectively, corresponding to the point of loss of wireless communication are recorded. In step 722, the relationships between the values $R_A$, $N_B$, $R_C$, and $N_D$ are used to determine the angles $\phi$ and/or $\theta$, according to the stages described above. In step 723 distance to the Target is measured. In step 724, the procedure checks whether all Targets have been treated. In the negative case, the index i is increased by 1 in step 713, and the procedure repeats from step 712 for the new Target corresponding to the present i (of step 713). If, however, the answer in step 724 is yes, the directions, distances, and locations of all the Targets are displayed.

As noted above, the invention of U.S. Pat. No. 8,988,283 is particularly adapted for use in mobile or stationary devices that can establish direct wireless communication, such as, but not limited to mobile phones, laptops, routers, etc. For sake of convenience, the description hereinafter refers to Wi-Fi type of communication as an example only. As shown above, the device and method of the invention of U.S. Pat. No. 8,988,283 enables a direction finder (DF) to find the relative location of one or more other devices that are located within the communication range. As noted above, the device of the invention of U.S. Pat. No. 8,988,283 can determine one or more of the relative direction, distance, and relative height between the two communicating devices.

U.S. Pat. No. 8,988,283 also provides various possible applications for the DF. All said applications that will not be repeated herein for the sake of brevity, are also applicable to embodiments of the present invention, mutatis mutandis.

The Present Invention

The present invention will now be described in details.

As described above, the Direction Finder (DF) in each U.S. Pat. Nos. 8,405,549 and 8,988,283 comprises an array of antennas in a Reception Mode, i.e., a plurality of antennas, while the Target itself could transmit via a single antenna or via an antenna array. The DF in said patents applies alternately two or more directional reception antenna patterns at the DF in order to calculate the direction to a Target device (which in turn transmits a signal). The inventors have now found that such a structure is vulnerable to errors due to signals that are "parasitically" received at the DF through components other than the antennas. For example, the signal may be partially "received" at the RF amplifier of the DF due to induction over wires or other components of the device that are not the antennas. In order to overcome this problem, at least partially, the RF amplifier at the DF of said patents may be positioned within an enclosure acting as Faraday cage. However, even when such an enclosure is used, this phenomenon cannot be entirely eliminated. Moreover, the use of such an enclosure is relatively cumbersome and expensive, and is not suitable to mobile devices having a small volume.

The system of the present invention comprises a DF which receives a signal via a single antenna (having any radiation pattern), and a Target, transmitting in a Transmission Mode via an array of antennas, i.e., a plurality of antennas—(as opposed to the embodiments of U.S. Pat. Nos. 8,405,549 and 8,988,283 could transmit via a single antenna) wherein said antenna array patterns and/or antenna array layout and/or antenna combinations in the array of the Target are known to the DF.

Figure 21:
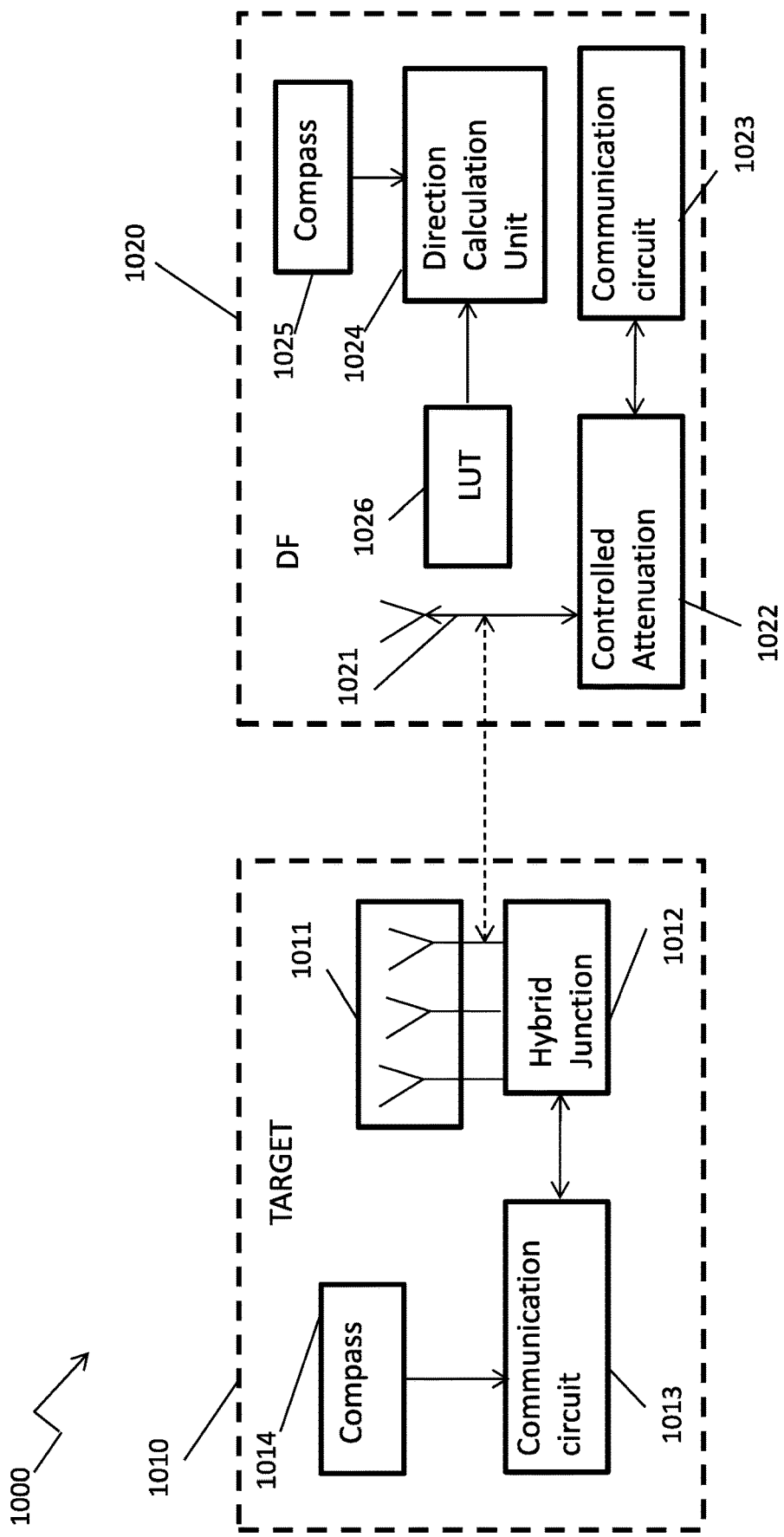
FIG. 21 describes in a block diagram form the general structure of a direction finding system according to an embodiment of the present invention.

FIG. 21 describes in a block diagram form the general structure of a direction finding system 1000 according to an embodiment of the present invention. As before, the system 1000 comprises one or more Targets 1010, and one or more direction finders (DF) 1020 (only one of each is shown). Each of the Target devices 1010 comprises an array of antennas 1011, a hybrid junction 1012, communication circuit 1013, and compass 1014. The DF, in turn, comprises a single antenna 1021, a controlled attenuator 1022, a communication circuit 1023, a direction calculation unit 1024, a compass 1025, and a look-up table 1026. As will be described in more details, the present invention utilizes the "Reciprocity Principle" in antennas theory, where a reception pattern of any antenna is identical to its respective transmission pattern of the antenna, and vice versa. The same principle is also applicable for an array of antennas, where a combined reception pattern of a plurality of single antennas is identical to the combined transmission pattern of the same array of antennas.

As will be explained in more details hereinafter, the invention uses for its operation a compass at each of the DF and the Target devices, as the orientation of each of the devices relative to the North is an inherent part of this invention for the determination of the direction from the DF to the Target.

Figure 22:
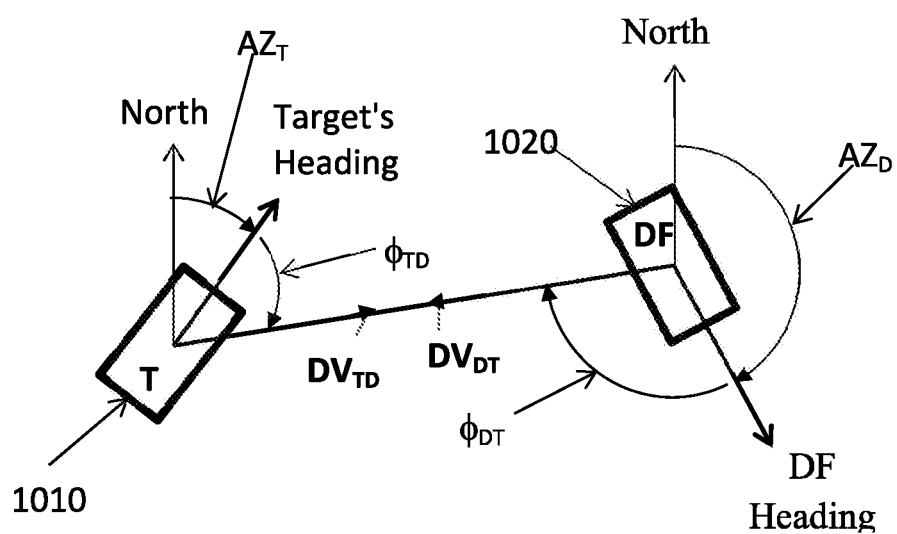
FIG. 22 illustrates schematically the relationship between a Target device and a DF device according to the present invention.

FIG. 22 illustrates schematically the relationship between a Target device 1010 and a DF device 1020 according to the present invention. A "Heading" direction is pre-defined for each of the Target and DF devices, respectively. The Heading direction of the device (which may change while changing the orientation of the device) is typically (but not necessarily) selected to be along a symmetric axis of the device, while pointing to one selected end of the device, as shown. Each of the Target and DF devices may therefore have at any given time some azimuth angle $AZ_T$ and $AZ_D$, respectively, relative to the North direction, as shown. The object of the invention is therefore to determine the direction vector "$DV_{DT}$" from the DF to the Target. For determining the direction vector $DV_{DT}$, two additional angles are defined, as follows: (a) $\phi_{TD}$—the angle between the Heading of the Target device and the direction vector DV; and (b) $\phi_{DT}$—the angle between the Heading of the DF and the direction vector DV. As will be discussed hereinafter in more details, the DF first determines the angle $\phi_{TD}$, receives from the Target device its azimuth $AZ_T$ relative to the North, and having its own azimuth relative to the North $AZ_D$, it calculates the angle $\phi_{DT}$, namely the angle at which the DF "sees" the Target device.

To summarize, the following notations are used:

AZ—Azimuth with respect to the North. Range: $0 \le AZ < 360$;

$\phi$—Direction with respect to the Heading (either the DF Heading or the Target's Heading). Range: $-180 \le \phi < 180$;

$AZ_T$—Azimuth of the Target's Heading to the North;

$AZ_D$—Azimuth of the DF Heading relative to the North;

$\phi_{TD}$—Direction from the Target to the DF relative to the Target's Heading;

$\phi_{DT}$—Direction from the DF to the Target relative to the DF Heading.

As noted above, according to the present invention, the Target comprises an array of antennas. For example, the array of antennas in the Target device 1010 of the present invention may comprise a pair of antennas that are arranged as shown in the DF 10 as appearing in any of FIGS. 1, 10a, and 10b. In another example, the Target device of the present invention may comprise an array of four antennas that are arranged as in the DFs appearing in any of FIG. 12, 14a, 15a, 15b, 15c, or 15d. In still another example, the Target device may comprise three antennas that are arranged as in the DF of FIG. 14b, where two pairs of antennas (from among the three antennas) are alternately used, while a common antenna (501/504 in the figure) serves in both of the pairs, in a manner as discussed with respect to FIG. 14b. In a similar manner as in the various antennas arrangements in any of said figures, also in the present invention the typical distance between each pair of antennas that are simultaneously used is a quarter of a communication wavelength $\lambda$, and usually no more than half the wavelength $\lambda$.

As discussed above, U.S. Pat. Nos. 8,405,549 and 8,988,283 describe manners of creation of various antenna patterns while each time a selected pair of antennas is used in Reception Mode. Said antenna patterns are used in said patents at the antenna array of the DF when receiving a signal from the Target (while the Target in fact preferably transmits from a single omni-directional antenna). In contrary, the present invention (that will also be referred to as "Reversed DF") in fact applies same techniques to produce, each time for selected two pairs of antennas, same antenna patterns at the Target, while said antenna patterns are this time used at the Target for the transmission of a signal (i.e., in Transmission Mode), rather than for reception at the DF as in the prior art. The following table will summarize the differences between the structures of the Target and DF devices of U.S. Pat. Nos. 8,405,549 and 8,988,283 compared to the structures of the Target and DF devices of the present invention. As will be discussed hereinafter, several of the following differences that are given for the sake of brevity, relate to preferred embodiments only, and should not limit the present invention.

| | U.S. Pat. No. 8,405,549 and U.S. Pat. No. 8,988,283 - DF techniques | Present Invention - Reversed DF technique |
|---|---|---|
| Receiving via the antenna array where various antenna patterns are used in Reception Mode | DF | None |
| Receiving via a single antenna | None | DF |
| Broadcasting/ transmitting via a single antenna | Target | None |
| Transmitting via the antenna array where various antenna patterns are used in Transmission Mode | None | Target |
| Device which transmits the signal | Target | Target |
| Various antenna patterns are used for | Reception at the DF | Transmission at the Target |
| Transmission of the signal is made through | A single antenna at the Target | One or more pairs of antennas operated each time in another combined antenna pattern |
| Intentional attenuation in a controlled manner until a point of loss of communication is performed at the . . . | DF | DF |
| Location of the Look-up table/s describing various antenna patterns | DF | DF (antenna patterns of the Target array are stored at the DF) |

-continued

| | U.S. Pat. No. 8,405,549 and U.S. Pat. No. 8,988,283 - DF techniques | Present Invention - Reversed DF technique |
|---|---|---|
| Look up table (database) contains data relating to various antenna patterns and transmittal combinations and/or antennas layout in the array that take place at | DF | Target |
| Direction calculation unit is located at | DF | DF |
| Compass is used at | None of the devices | Both at the DF and at the Target |

The invention will now be described in more details. According to the present Reversed DF invention a signal is transmitted from the Target device 1010 to the DF 1020. Said signal is transmitted from the Target in several Transmission Modes, each mode relating to a simultaneous transmission from another pair of antennas having a combined antenna pattern. For example, the Target device 1010 may transmit the signal in 4 Transmission Modes, using sequentially the 4 cardioid antenna patterns (two R antenna patterns and two N antenna patterns), respectively, as described in FIGS. 15*a* to 15*d*. During each Transmission Mode, the DF 1020, receives the respective signal via a single antenna, and intentionally attenuates respectively the received signal until a point of loss of communication, using its built-in controlled attenuator 1022. The attenuation until a point of loss of communication is performed at the DF in a similar manner as done in the DFs of U.S. Pat. Nos. 8,405,549 and 8,988,283. As in U.S. Pat. Nos. 8,405,549 and 8,988,283, a loss of communication may be defined as a loss of handshaking between the Target device and the DF. At each of said points of loss of communication, the respective attenuation is recorded. Therefore, at the end of the 4 sequential Transmission Modes of transmission, the DF has in fact recorded 4 respective attenuation values, similar to the 4 attenuation values that were recorded following the respective 4-mode process of U.S. Pat. No. 8,988,283. The difference, however, is that the differences in attenuations, as now recorded in the 4 modes, respectively, result from the use of different antenna transmission patterns at the Target device, rather than from the use of different antenna reception patterns at the DF as was done in U.S. Pat. Nos. 8,405,549 and 8,988,283. As noted, the DF 1020 includes a database relating to the various antenna patterns that are used at the Target, respectively in each mode of transmission. This database is in fact similar in its structure to the databases of FIGS. 17*a* and 17*b* taken from U.S. Pat. No. 8,988,283. Having this database, and due to the reciprocity principle of antennas, the 4 recorded attenuations are in fact sufficient for the DF to calculate the direction ($\phi_{TD}$ in FIG. 22) at which the Target "sees" the DF, relative to the Target's Heading (this calculation may be done, for example, by the techniques as explained in U.S. Pat. No. 8,988,283—example 1 above). However, said determination of the direction $\phi_{TD}$ at which the Target "sees" the DF is not sufficient for the DF to determine the direction $\phi_{DT}$ at which the DF itself "sees" the Target (relative to its own Heading direction), as the DF in fact does not know the Heading of the Target device at the time of transmission of the 4 modes, or more particularly, relative to what Target Heading said transmissions from the Target and said respective attenuations at the DF have been determined. Therefore, according to the present invention, the Target device 1010, who measures its own Heading direction relative to the North using its compass 1014, sends also this Target Heading-direction to the DF 1020. The DF, in turn, uses said received Target Heading (relative to the North), together with its own Heading-direction (relative to the North) as measured by its local compass 1014, together with said direction at which the Target "sees" the DF, in order to fully determine the direction from the DF 1020 to the Target 1010. This determination may either be calculated in a resolution of a quadrant (90° each) or in a resolution of degrees.

The procedure for determining the angle $\phi_{DT}$, namely, the angle at which the DF "sees" the Target relative to its own Heading, can be found as follows:
  a. The Target device 1010 informs, e.g. via typical communication, the azimuth of the Target's Heading (relative to the North), $AZ_T$ using its built in compass 1014.
  b. The DF knows its own azimuth $AZ_D$ relative to the North, using its built-in compass 1025.
  c. The DF determines the direction $\phi_{TL}$ from the Target to the DF relative to the Target's Heading.
  d. The DF calculates the direction $\phi_{DT}$ from the DF to the Target relative to the DF Heading, using the following geometrical steps:
   1. Step 1: The azimuth from the Target to the DF is $AZ_{TD}=AZ_T+\phi_{TD}$. But if the result is larger than 360°, then $AZ_{TD}=AZ_T+\phi_{TD}-360°$, and if the result is smaller than 0°, then $AZ_{TD}=AZ_T+\phi TD+360°$.
   2. Step 2: The azimuth from the DF to the Target: if $AZ_{TD}$ is larger than 180°, then $AZ_{DT}=AZ_{TD}-180°$, while if $AZ_{TD}$ is smaller than 180°, then $AZ_{DT}=AZ_{TD}+180°$.
   3. Step 3: the direction $\phi_{DT}$ from the DF to the Target is $\phi_{DT}=AZ_{DT}-AZ_D$. But if the result is larger than 180°, then $\phi_{DT}=AZ_{DT}-AZ_D-360°$ and if the result is smaller than)(−180° then $\phi_{DT}=AZ_{DT}-AZ_D+360°$.

Example 2

Figure 23:
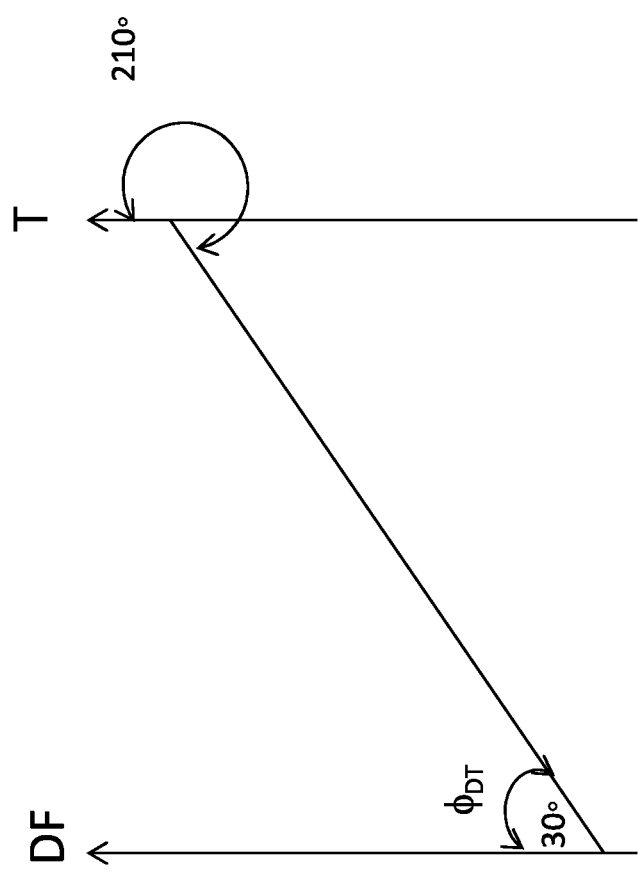
FIG. 23 shows a simple case where the Heading of the DF and the Heading of the Target point both exactly to the North.

FIG. 23 shows a simple case where the Heading of the DF and the Heading of the Target point both exactly to the North. The DF in turn, determines, following the 4-modes transmissions by the Target and respective attenuations at the DF, that the direction $\phi_{TD}$ at which the Target sees the DF is 210°. Simple geometry can show that the angle $\phi_{DT}$, namely the direction from the DF to the Target is 30°.

Example 3

The following example relates to the setting of FIG. 22: $AZ_T=40$; $AZ_D=150°$ $\phi_{TD}=45°$ (given, as calculated following said 4-modes transmission from the Target, attenuation at the DF, and respective direction calculation);
  $AZ_{TD}=AZ_T+\phi_{TD}=40°+45°=85°$ (step 1 above)
  $AZ_{DT}=AZ_{TD}+180°=85°+180°=265°$ (step 2 above);
  $\phi_{DT}=AZ_{DT}-AZ_D=265°-150°=115°$.
Result:
Following the calculation above, the direction to the Target will be shown on the screen of the DF, e.g., by an arrow directing to 115° relative to the DF Heading.

As noted above, the determination of the direction to the Target may be performed either in a resolution of degrees (as discussed above) or in a resolution of "quadrants", as elaborated below. The determination of the direction in a resolution of quadrants is in some cases preferable, as it involves simpler calculations and storage of less data in the look up table 1026 at the DF.

As discussed above, the determination of the direction to the Target in a resolution of degrees involves typically (a) determination at the DF of the attenuation (up to a point of loss of communication) with respect to the 4-mode transmission from the Target using R and N cardioid patterns, respectively; (b) Following each transmission using R and N cardioids, determining the difference R–N (twice) between the respective attenuations; and (c) Using the two values of R–N and the look up table 1026 to determine the direction from the Target to the DF; and (d) Transforming the direction from the Target to the DF to the direction from the DF to the Target by also using the azimuth of the Target and the azimuth of the DF, as measured respectively in said two devices. As shown, a look up table is required in this procedure in order to determine the direction in terms of degrees. As will be shown, when calculating the direction in terms of quadrants, a look up table is not necessary, as the determination whether R>N or R<N suffice.

Figure 24:
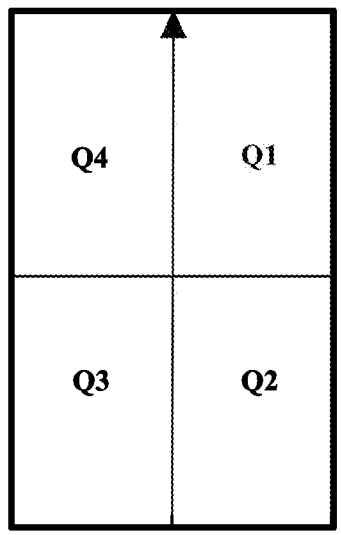
FIG. 24 defines a division of the Target device into 4 quadrants Q1, Q2, Q3, and Q4.
Figure 25:
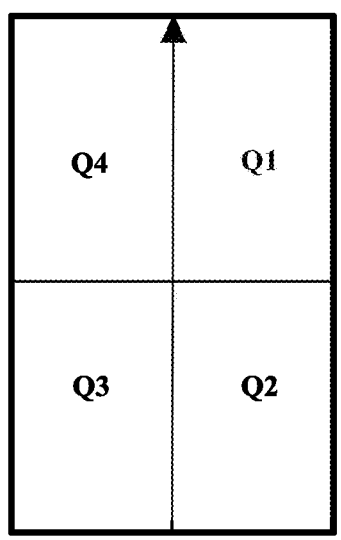
FIG. 25 defines a division of the DF device into 4 floating quadrants Q1, Q2, Q3, and Q4.
Figure 26:
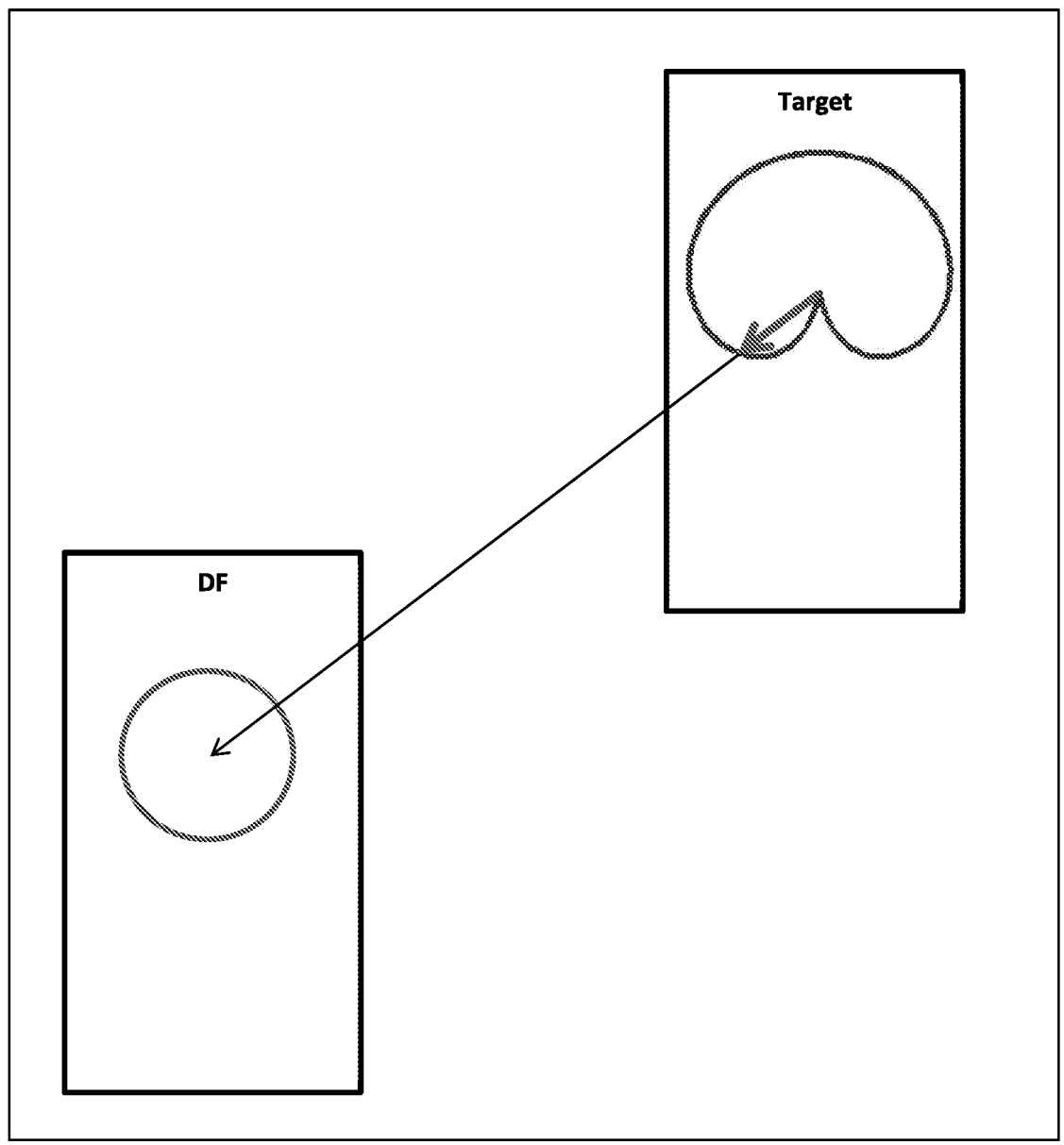
FIGS. 26-29 show 4 antenna patterns that are used during 4 respective modes of transmission from the target.
Figure 27:
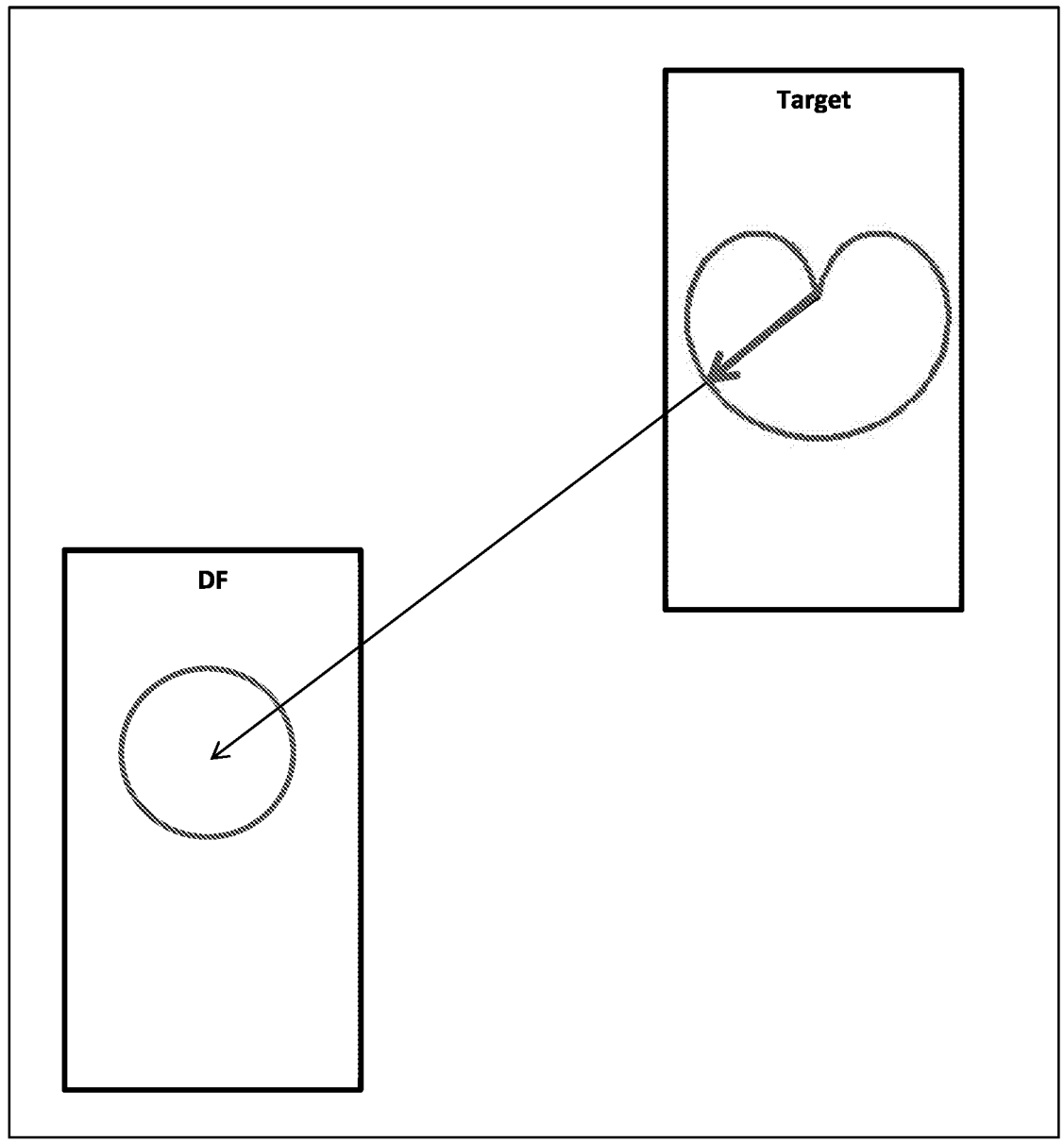
Figure 28:
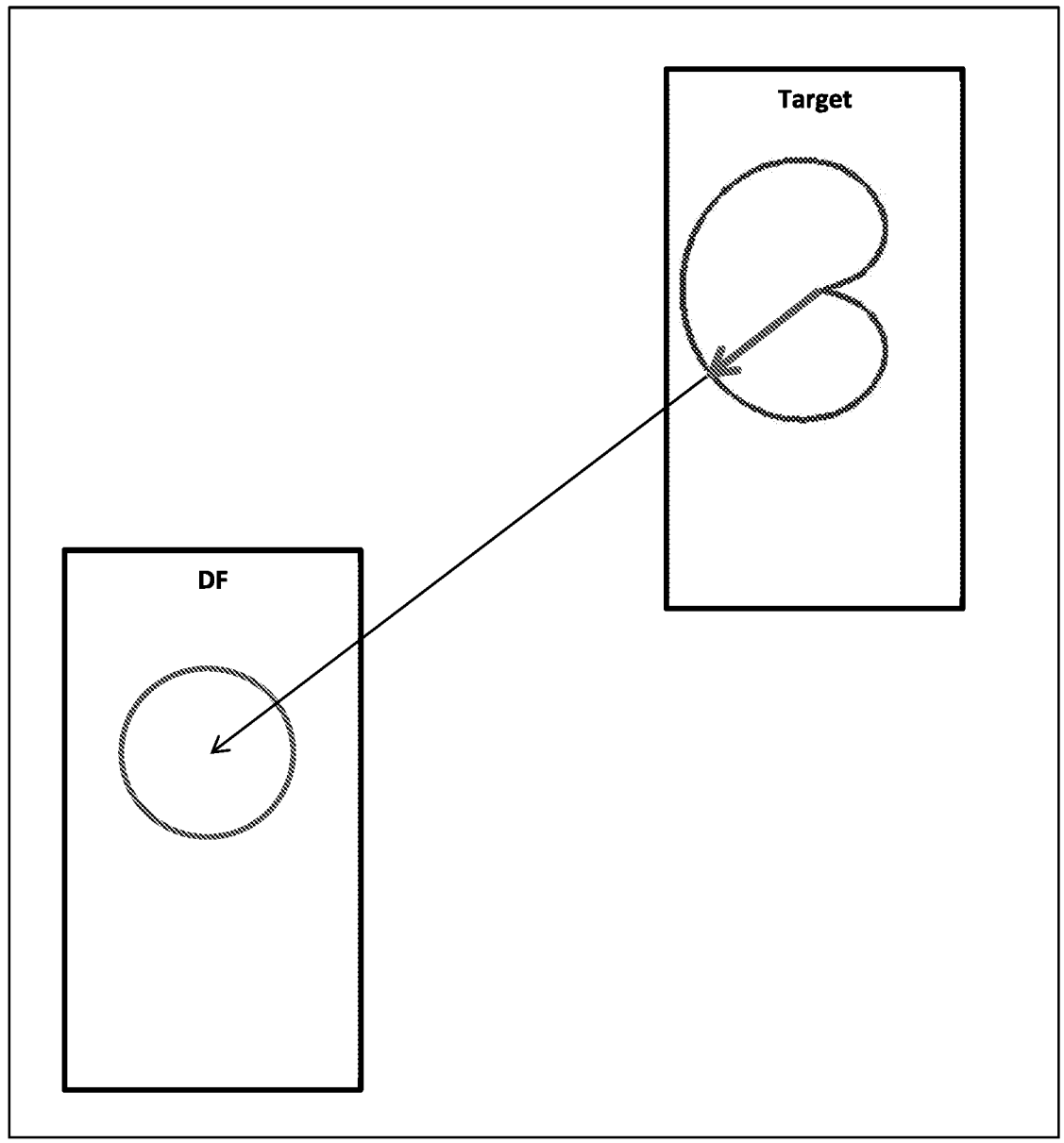
Figure 29:
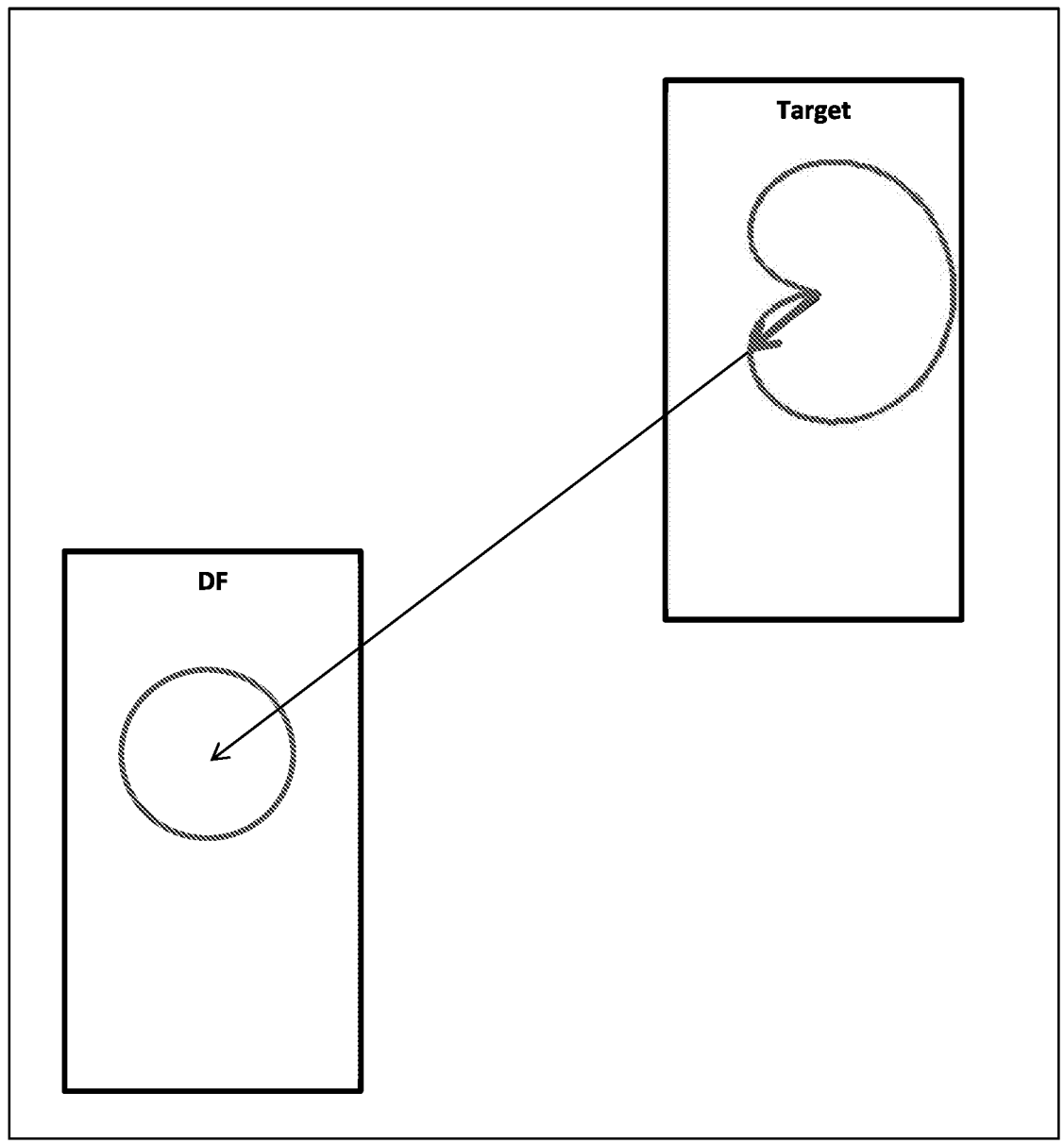

The determination of the direction from the DF to the Target in terms of quadrants will now be described. FIG. 24 defines a division of the Target device into quadrants Q1, Q2, Q3, and Q4. As will be explained below, at the DF the device is divided into 4 "floating" quadrants. Said 4 floating quadrants are initially arranged based on the DF Heading, as shown in FIG. 25. Then, following the determination of the direction to the Target, the system, as displayed at the DF are rotated such that one specific quadrant is directed to the Target. More specifically, if it is determined that the Target "sees" the DF at a sector as defined by its quadrant 3, the procedure of the invention transforms the floating quadrants system at the DF such that its quadrant 3 will direct to the Target. More specifically, the procedure causes rotation of the quadrants system at the DF such that quadrant 3 of the DF defines a directional sector in which the Target is located.

a non-limiting procedure of determination by quadrants may be performed as follows:
  a. Initially, the Target transmits via a first pair of its antennas, using its "forward"-pattern cardioid as shown in FIG. 26. An attenuation until a point of loss of communication is performed at the DF, and a respective $R_{F/B}$ attenuation is recorded at the DF.
  b. Next, the Target transmits via the first pair of its antennas, using its "backward"-pattern cardioid as shown in FIG. 27. An attenuation until a point of loss of communication is performed at the DF, and a respective $N_{F/B}$ attenuation is recorded at the DF.
  c. If it is determined at the DF that $R_{F/B} > N_{F/B}$, it is concluded that the DF is located forward relative to the Heading of the Target (i.e., in a direction as defined by Q1 and Q4). If, however, it is determined that $R_{F/B} < N_{F/B}$, it is concluded that the DF is located backward relative to the Heading of the Target.
  d. Next, the Target transmits via a second pair of its antennas (perpendicular to said first pair), using its "left"-pattern cardioid as shown in FIG. 28. An attenuation until a point of loss of communication is performed at the DF, and a respective $R_{L/R}$ attenuation is recorded at the DF.
  e. Next, the Target transmits via said second pair of its antennas (perpendicular to said first pair), using its "right"-pattern cardioid as shown in FIG. 29. An attenuation until a point of loss of communication is performed at the DF, and a respective $N_{L/R}$ attenuation is recorded at the DF.
  f. If it is determined at the DF that $R_{L/R} > N_{L/R}$, it is concluded that the DF is located left relative to the Heading of the Target (i.e., in a direction as defined by Q4 and Q3). If, however, it is determined that $R_{L/R} < N_{L/R}$, it is concluded that the DF is located right relative to the Heading of the Target.
  g. Following the procedure above, the DF can determine a single quadrant at the Target device, indicating a directional sector towards the DF relative to the Targets Heading. More specifically, a forward-right relates to Q1, forward-left to quarter Q4, backward right to Q2, and backward left to Q3. As shown, the determination of the specific quadrant does not require any use of a look up table at the DF, as only two comparison operations are in fact required. This determined (quadrant) directional sector at the Target device has to be transformed to a respective quadrant directional sector at the DF, indicating the direction to the Target. The transformation is performed as follows.
  h. Comment: as noted above, the transformation should (a) mark at the DF (for example by green color) the corresponding quadrant that was determined at the Target, while the other quadrants remain marked by another color. For example, if Q3 was determined at the Target as directing to the DF, Q3 is also marked at the DF; and (b) rotate CW or CCW by a specific rotational angle the quadrants system at the DF, such that Q3 of the DF will direct to the Target device. The following procedure also determines this specific rotation angle. The amount of rotation depends, among others, on the azimuth of the Target $AZ_T$ and on the azimuth of the DF $AZ_D$ (for the notations, see FIG. 22).
  i. Next, the quadrant at the DF corresponding to the quadrant found at the Target is marked.
  j. Next, as a reference for calculating the rotation, the DF is assumed to be in the direction of the Target's Heading. The azimuth from the Target to the DF is therefore $AZ_{TD} = AZ_T$.
  k. The azimuth from the DF to the Target is found as follows: if $AZ_{TD}$ is larger than 180°, then $AZ_{DT} = AZ_{TD} - 180°$, while if $AZ_{TD}$ is smaller than 180°, then $AZ_{DT} = AZ_{TD} + 180°$.
  l. The angular rotation at the DF is: Rotation=$AZ_{DT} - A_{ZD}$. However, if the result is larger than 180°, then Rotation=$AZ_{DT} - AZ_D - 360°$, while if the result is smaller than –180°, then the Rotation=$AZ_{DT} - AZ_D + 360°$.
  m. After the rotation, the quadrant at the DF which corresponds to the quadrant at the Target, as found, forms a directional sector from the DF to the Target.

Example 4

Figure 30:
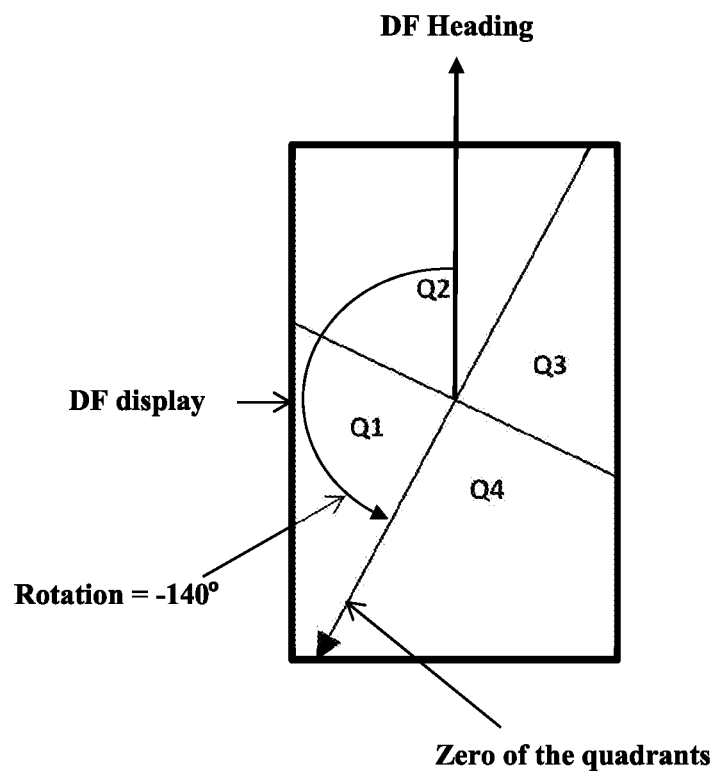
FIG. 30 shows how the floating quadrants are arranged at the DF following a determination of the direction to the target in an example.

The following example finds the quadrant-direction from the DF to the Target:
  a. $AZ_T = 10$, $AZ_D = 330$ (given)
  b. The B/F steps of the 4-mode procedure were resulted in: $R_{B/F} > N_{B/F}$, hence the DF is in the front of the Target.
  c. The L/R steps of the 4-mode procedure were resulted in: $R_{L/R} < N_{L/R}$, hence the DF is to the right of the Target.
  d. Hence the DF is in the front and right section of the quadrants system, i.e. in quarter Q1 of the Target.

e. Hence the quadrant Q1 is also marked at the DF. Next, the rotation angle should be determined, such that after the rotation, Q1 of the DF will direct to the Target. It should be noted that the rotation is performed electronically on the display, and in fact preferably remains directed to the Target even upon rotation of the DF
f. $AZ_{TD}=AZ_T=10°$ (step j above).
g. $AZ_{DT}=AZ_{TD}+180°=10°+180°=190°$ (step k above).
h. Rotation=$AZ_{DT}$-$AZ_D$=190°-330°=-140° (step l above).
i. Result: Rotation=-140°. More specifically, the quadrants system in the DF is rotated CCW by 140° relative to its original orientation (originally it was aligned with the DF Heading), such that Q1 forms a directional sector towards the Target as shown in FIG. 30.

As described above, the present Reversed DF invention provides a system in which the DF receives via a single antenna having any type of radiation pattern and a Target transmitting via an antenna array, wherein said antenna array patterns of the Target are known to the DF. This is in contrast to prior art direction finding techniques that have required use of either an antenna array or one or more rotating antennas (either mechanically or electronically) at the DF for the reception of signals from any type of a Target's antenna (in said prior art systems the knowledge of the antenna patterns that were used at the targets during their transmissions are usually unknown to the DF). As noted, an important principle of the present Reversed DF invention lies on the Reciprocity Principle in antennas theory, stating that for a given antenna or antenna array, the receiving and transmitting are in fact the same, namely, signals are received and broadcasted via the array in the same patterns.

Important benefits of the system of the Reversed DF invention over prior art techniques are two folded: (a) When transmitting via an antenna array, it is known that the signal will go out via the best outgoing channel—which are the antennas, thereby significantly reducing, if not eliminating, some of the technical requirements associated with the design and manufacturing for reception. (b) As the patterns are provided during the transmission process, and via the transmission Antenna Module, it means that the effect of the Target's RF components on the direction finding is significantly reduced.

Another significant benefit of the present invention lies in the elimination of the necessity to keep the DF horizontally in order to conduct horizontal direction finding. In fact, since according to the present invention the antenna array is in the Target, and its orientation dominates the direction detection plane, the DF may be rotated freely, a feature of high importance in mobile, wearable DF devices (for example, when incorporated into "Internet of Things" (IOT) objects, smartphones, smart watches, activity trackers, digital cameras, remote control units, etc.

The system of the invention may also apply a cross-verification technique as follows:
 (a) Initially the direction finding procedure as described above (where the Target performs 4-modes of transmission and the DF receives via a single antenna is performed to find the direction from the DF to the Target;
 (b) Next, the two devices reverse their functionalities to operate as in the prior art techniques of U.S. Pat. Nos. 8,405,549 and 8,988,283, namely, such that the Target will act as a 4-mode DF receiving device via its array of antennas, and the DF will act as a transmitting device via its single antenna. The Target (now acting as a DF) will now determine the direction to the Target.
 (c) Finally, the two devices will share and compare their direction findings one toward the other. For example, if in step (a) the DF will find that the Target is located to its front-right direction, in step (b) above the Target (now acting as a direction finder) should find the DF at its back-left direction. Otherwise, one or more of the finding is probably incorrect.

In one non-limiting embodiment of the invention, the DF "commands" the Target to issue the 4-mode transmissions while using 4 different antenna patterns, respectively. In another embodiment, the Target itself issues the 4-Transmission Modes, while each time notifying the DF which of specific pattern ("forward", "back", "left" or "right" cardioid) is transmitted.

In still another non-limiting embodiment of the invention, the DF may include several look up tables, each relating to another Target or to another Target type. The Target, in turn, conveys an indication to the DF (via a conventional transmission) which specific look-up table to use.

Figure 31:
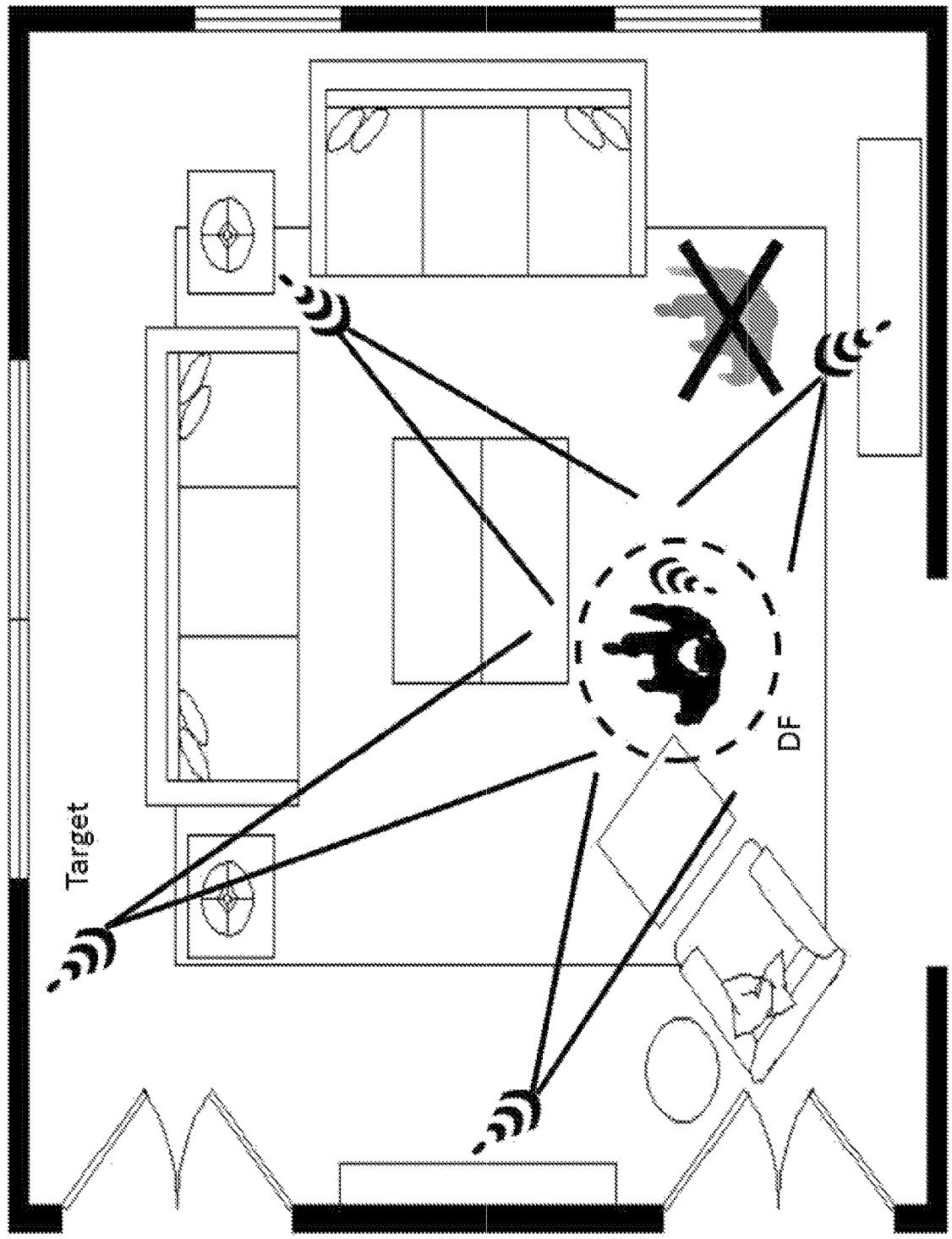
FIG. 31 illustrates an example for the use of the invention in a security system.

FIG. 31 illustrates an example for the use of the Reversed DF invention, which comprises at least one DF and at least one Target that are used in a security system, such as (but not limited to) home security system. According to this embodiment, a Target may be any home appliance, such as (but not limited to) TV, lamp, refrigerator, etc. the DF may be a portable device, or integrated into a portable electronic device such as a smart phone, smart watch, etc. said security system may take advantage of the Reversed DF invention, by enabling activation and/or deactivation of the security, by creating relative-location "rules". Said rules may require the user of the DF to stand in a specific relative location vs. specific Targets in order to activate or deactivate his security system. Said rules may also require the user of the DF to stand in a specific orientation vs. specific Targets (for example, that a TV Target is in the "back" of the DF). The system may also enable the user to program and update the relative-location "rules". Said system may also use the cross-verification ability, by switching the roles of the DF and Targets (namely, enabling the Targets to become DF devices, and the DF to become a Target), thus enabling the security system to verify the user's relative location as well. In yet another embodiment, the system may include cross-verification capability for security purposes, said DF and Targets may all be home appliances or objects, and upon activation of the security system, it determines the relative directions and/or locations between these devices. While being active, the system may periodically verify that no change has occurred to the initial determination of said relative directions or locations. If a deviation is detected while the system is active, it can be inferred as a breach of security, and an alarm (or any other pre-defined action) will be activated.

FIG. 32a illustrates still another example for the use of the Reversed DF invention, wherein said DF and/or Targets are Internet of Things (IOT) objects. In this embodiment, a DF IOT device communicates with a Target IOT device, and based on the relative direction and/or location between them, it controls, activates or shares data. As illustrated in FIG. 32a, the DF is an IOT device carried by a user, while the Target is an air-condition unit. Said DF may change the operational parameters of the air-condition unit (for example, but not limited to, the air flow velocity, air flow direction, temperature, etc.) in accordance with the change of the DF relative location vs. the Target.

Figure 32B:
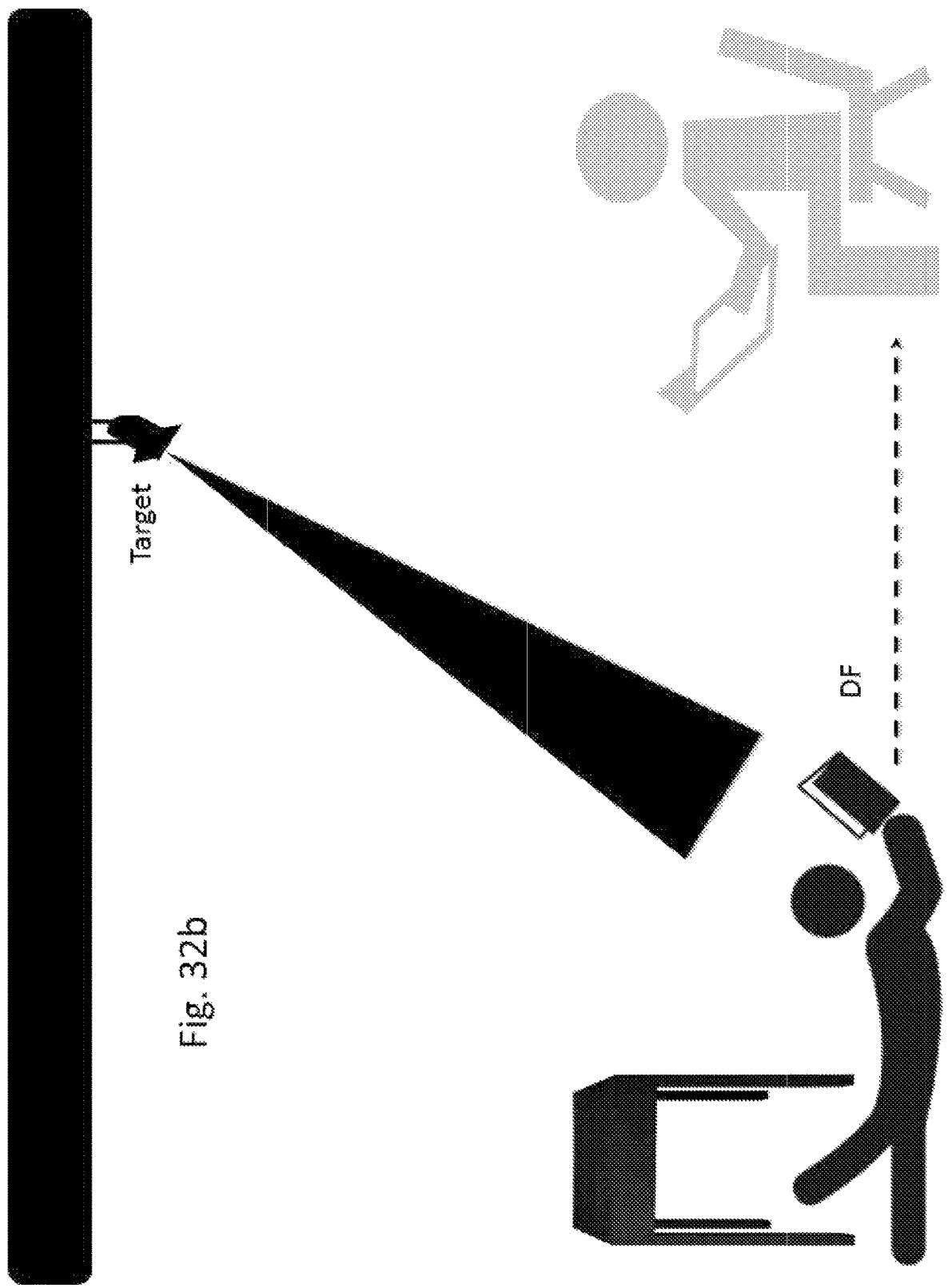
FIGS. 32b and 32c illustrate yet another embodiment, where the Target is a lamp having means for changing the lighting direction and the intensity of the illumination.
Figure 32C:
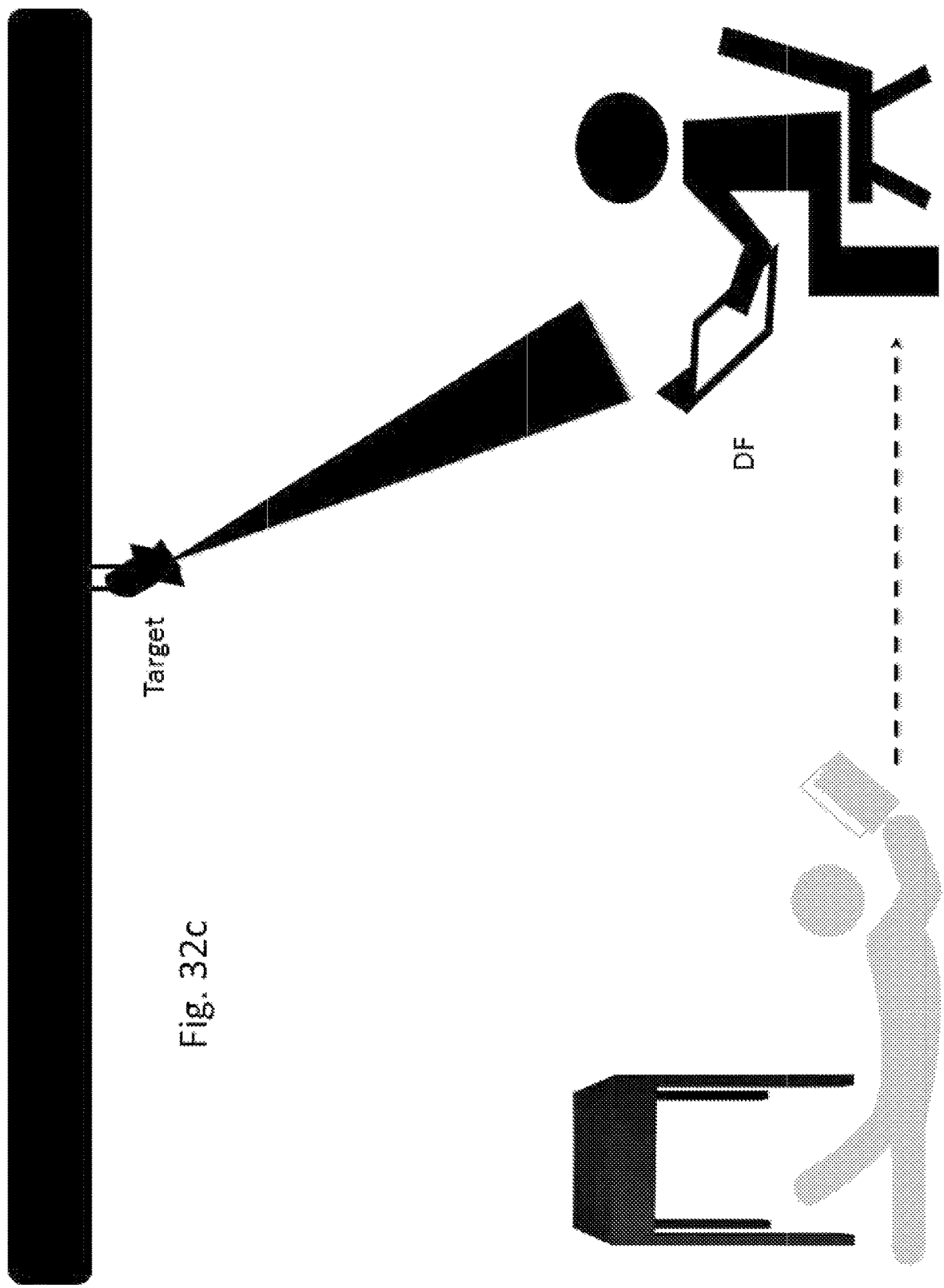

FIGS. 32b and 32c illustrate yet another embodiment, where the Target is a lamp having means for changing the lighting direction and the intensity of the illumination. Said changes may occur based on changing relative the location of the DF, which is a device carried by a user, for example (but not limited to), an electronic e-book reader.

FIG. 33 illustrates yet another novel exemplary use of the Reversed DF invention, wherein a DF is integrated into a vehicle. According to this embodiment, the DF may determine its relative direction and/or relative location vs. Targets, for example, traffic lights, traffic signs, commercial billboards, buildings, etc. The determination of the system may be used to provide the vehicle with navigation information or traffic information, or advertisement information.

Figure 34A:
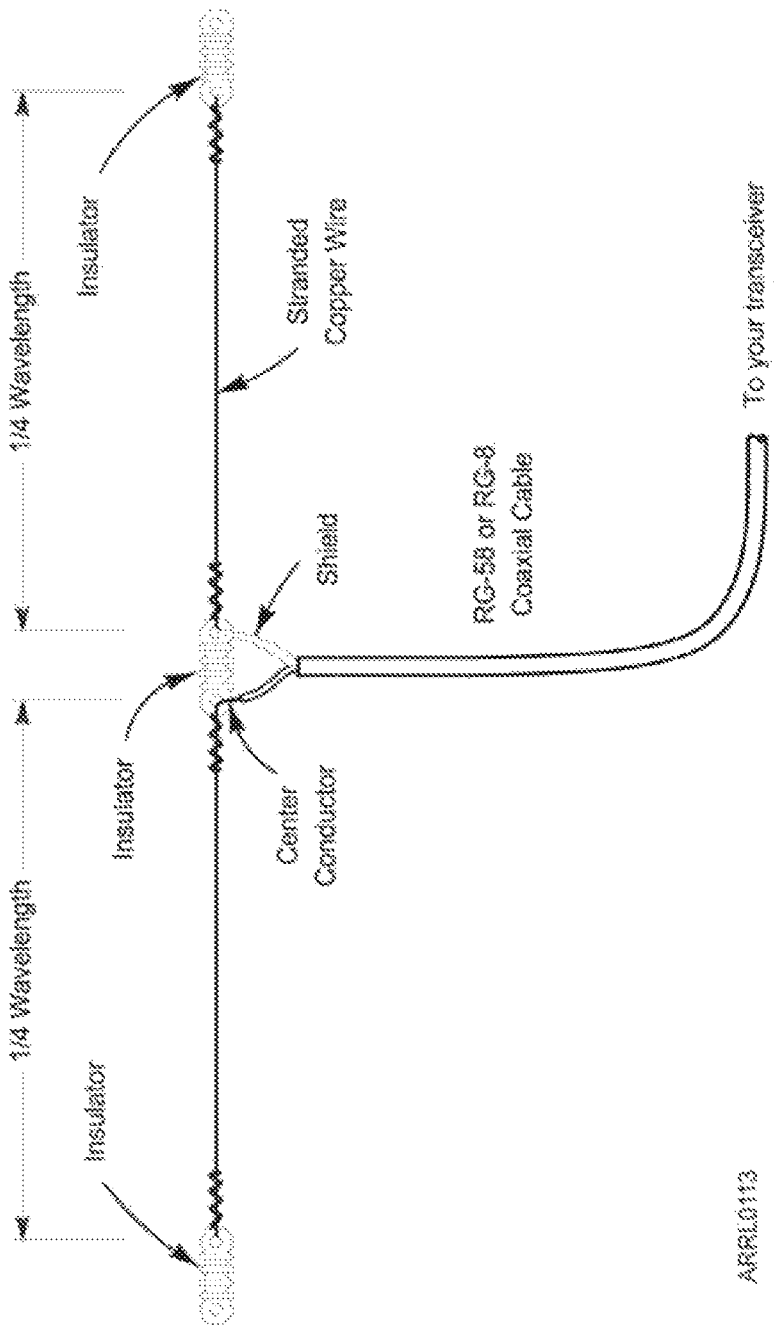
FIG. 34a illustrates a structure of a common Dipole antenna.
Figure 34B:
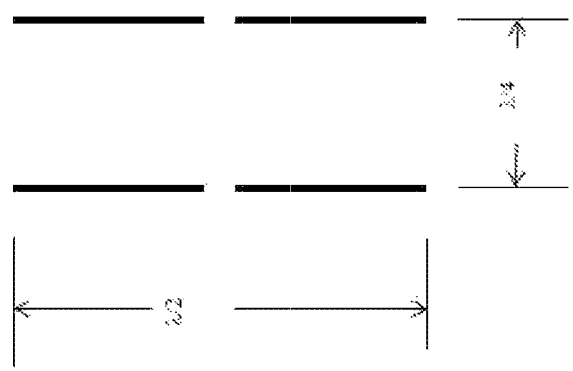
FIG. 34b illustrates an antenna pair within the Target's antenna array in which the antennas are dipole antennas.

FIG. 34a illustrates a structure of a common Dipole antenna. FIG. 34b illustrates an antenna pair within the Target's antenna array in which the antennas are dipole antennas. As can be seen, a distance of a quarter of a wavelength is maintained between the antennas. The advantage of using Dipole antennas is that unlike monopole antennas (for example), Dipole antennas do not require a ground surface for creating the radiation pattern, thus making them more suitable for use in devices where the ability to have such a ground surface is limited. For an exemplary case where the system is required to be integrated into a clothing item, there are significant limitations to the ability of creating a horizontal ground surface for a vertical regular antenna. In another case, if integration of such a system is desired in a door, a vertical surface, etc., where having a horizontal ground surface is not possible, the use of a Dipole antenna is advantageous.

FIG. 35a illustrates an exemplary use of a dipole-based Reversed DF system in a garment. According to this embodiment, both DF and Target dipole antennas can be integrated into the garment's fabric.

In yet another example for integration of dipole-based Reversed DF system in clothes, a pressure sensor is placed near each antenna pair, and is used to sense pressure applied on the pair, for example, when the wearer of the garment is leaning back in a chair, and by doing so the antennas on the back of the shirt are pressed between his body and the chair. The benefit of having this data is to know that when a pair is under such pressure, its radiation patterns may be significantly affected, or that its gain may be effected, enabling the system to take pre-define actions, such as (but not limited to) ignoring the data received from said pair, turning it off, switching to a different pair, etc.

Figure 35B:
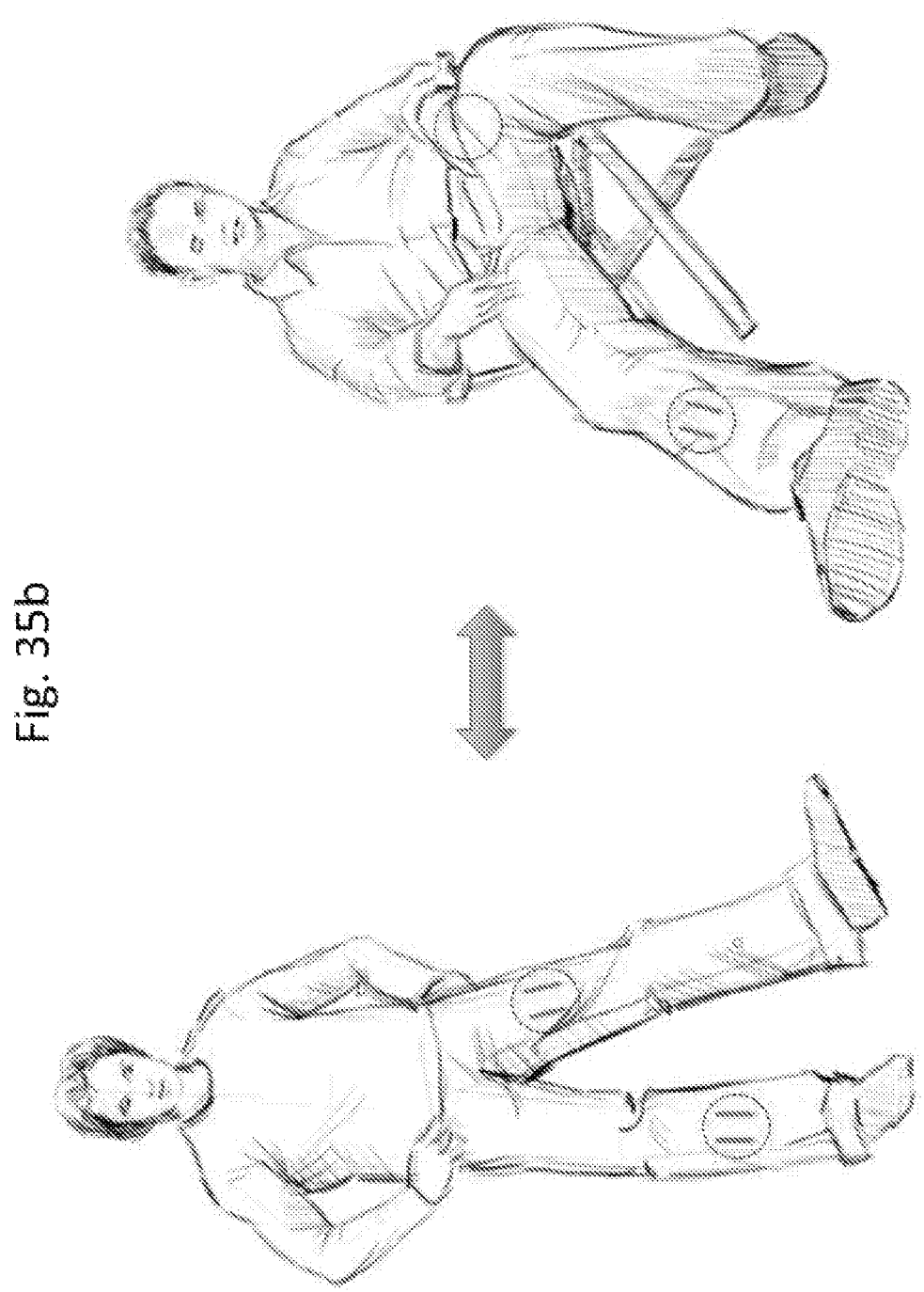
FIG. 35b illustrates another aspect of integration of a dipole-based Reversed DF system in garments.

FIG. 35b illustrates another aspect of integration of a dipole-based Reversed DF system in clothes. According to this aspect, a Tilt sensor is placed near each antenna pair, and is used to sense changes in the horizontal or vertical alignments of the pair. In FIG. 35b, it can be seen that the horizontal alignment of a pair of such antennas integrated into pants clothing items, may significantly change if the wearer of the pants is standing or sitting, thus significantly changing the plane of radiation of the antennas. By having such Tilt sensors near the antennas, the system may take pre-defined actions required to take in consideration the said change in alignment.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A method for determining by a direction finder (DF) the direction to a Target, which comprises:
   a. providing an antenna at said DF, and an array of antennas at the Target;
   b. providing a compass at each of said DF and said Target, for determining the azimuth of the DF Heading and of the Target Heading, respectively, with respect to the North;
   c. providing at said DF a look-up table which describes n antenna patterns, one per Transmission Mode that may be used respectively at the Target;
   d. sequentially performing x Transmission Modes from the Target, each time using another pair of antennas, and during each of said Transmission Modes intentionally, and in a controlled manner attenuating a reception signal at the DF until a loss of communication, and recording the respective attenuation levels;
   e. based on said x recorded attenuations levels and said look up table, determining by the DF the direction from the Target to the DF; and
   f. receiving at the DF the azimuth of the Target Heading, and based on (i) said determined direction from the Target to the DF (ii) azimuth of the Target Heading; and (iii) azimuth of the DF Heading; calculating by the DF the direction from the DF Heading to the Target.

2. A method according to claim 1, wherein each of said antenna patterns are cardioid-type patterns.

3. A method according to claim 1 wherein said x Transmission Modes are initiated by the DF.

4. A method according to claim 1, wherein said x Transmission Modes and their sequence are customized to different Target types or different DF types.

5. A method according to claim 1, wherein said x Transmission Modes and their sequence are customized to different software applications applied at the DF.

6. A method according to claim 1 wherein an indication regarding the Transmission Mode from among said n Transmission Modes which is currently active is reported from the Target to the DF.

7. A method according to claim 1, wherein:
   a. said look-up table at the DF is null, namely either the look up table is empty or no look up table exists;
   b. based on said x recorded attenuations, the determination by the DF of the direction from the Target to the DF results in a quadrant at the Target that directs to the DF; and
   c. based on said (i) azimuth of the Target Heading; (ii) azimuth of the DF Heading; and (iii) said determined quadrant at the Target that directs to the DF; calculating by the DF a quadrant at the DF which directs to the Target.

8. A method according to claim 2, wherein a hybrid junction is used at the Target in order to issue each of said cardioids, respectively.

9. A method according to claim 1, further comprising:
   a. performing an x-mode determination by the Target of the direction from the Target to the DF, based on transmission from the DF and reception at the Target; and
   b. comparing the results obtained by the procedure of claim 1 with said direction as determined by the Target, to cross-verify the results.

10. A method according to claim 1, wherein the antenna at the DF is an omni-directional antenna.

11. A method according to claim 1, for use in a security system, wherein an activation and/or deactivation of the security system is conducted by positioning the DF in a pre-defined relative direction from at least one Target of the security system.

12. A method according to claim 11, wherein a positioning of the DF in a pre-defined orientation is also performed.

13. A method according to claim 11, further comprising performance of a cross verification procedure.

14. A method according to claim 1, for use in a security system, wherein at least one DF and at least one Target are used, and activation of the security system triggers a creation of a relative direction or location schematic map reference in such manner that any deviation of a device in the system from said reference map triggers a pre-defined action.

15. A method of claim 14, further comprising a cross verification procedure.

16. A method according to claim 1, wherein the DF is an TOT device.

17. A method of claim 16, wherein said DF controls, operates or exchanges data with at least one Target device, based on a pre-defined relative direction between the DF and the Target.

18. A method according to claim 17, wherein the DF uses sensors to monitor parameters relating to a user of the DF and activates or reconfigures the operation of Target appliances based on a combination of the relative location between the DF and the Target, and the sensors' data.

19. A method according to claim 17, further comprising performance of a cross verification procedure.

20. A method according to claim 1, wherein said DF is incorporated within a vehicle and said Target is incorporated within one or more traffic related objects commonly available near traffic routes.

21. A method according to claim 1, wherein said antennas are dipole-type antennas.

22. A method according to claim 1, wherein said DF and said Targets are incorporated within a garment.

23. A method according to claim 22, wherein said antennas of the DF or Target have the form of conductive wires that are threaded into the fabric of the garment.

24. A method of use as in claim 23, wherein a pressure sensor is coupled to each pair of antennas from the antenna array in order to sense pressure that may be applied to the said antenna pair.

25. A method of use as in claim 23, wherein a Tilt sensor is coupled to each pair of antennas from the antenna array, in order to sense a diversion of the antennas pair with respect to the horizontal.

* * * * *